(12) United States Patent
Eguchi

(10) Patent No.: US 8,264,780 B2
(45) Date of Patent: Sep. 11, 2012

(54) HIGH ZOOM-RATIO ZOOM LENS SYSTEM

(75) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 54 days.

(21) Appl. No.: 13/038,581

(22) Filed: Mar. 2, 2011

(65) Prior Publication Data

US 2011/0216424 A1    Sep. 8, 2011

(30) Foreign Application Priority Data

Mar. 5, 2010  (JP) ................. 2010-049157

(51) Int. Cl.
*G02B 15/14* (2006.01)

(52) U.S. Cl. ...................... 359/687; 359/683

(58) Field of Classification Search .................. 359/683, 359/687, 676
See application file for complete search history.

(56) References Cited

U.S. PATENT DOCUMENTS

| | | | |
|---|---|---|---|
| 2004/0223233 A1* | 11/2004 | Horiuchi | 359/687 |
| 2005/0243437 A1 | 11/2005 | Hozumi et al. | |
| 2006/0262422 A1 | 11/2006 | Ohashi | |
| 2008/0100923 A1 | 5/2008 | Morooka | |

FOREIGN PATENT DOCUMENTS

| | | |
|---|---|---|
| JP | 2006-23529 | 1/2006 |
| JP | 2006-308957 | 11/2006 |
| JP | 2008-112013 | 5/2008 |

OTHER PUBLICATIONS

U.S. Appl. No. 13/038,601 to Masaru Eguchi, which was filed Mar. 2, 2011.

* cited by examiner

*Primary Examiner* — Scott J Sugarman
(74) *Attorney, Agent, or Firm* — Greenblum & Bernstein P.L.C.

(57) ABSTRACT

A high zoom-ratio zoom lens system includes a positive first lens group, a negative second lens group, a positive third lens group, and a positive fourth lens group, in that order from the object side. Upon zooming from the short to long focal length extremities, at least the first through third lens groups are moved along the optical axis direction, wherein an amount of movement of the first lens group is greater than that of the third lens group. The following conditions (1), (2) and (3) are satisfied:

$$0.9 < FT/F1 < 2 \qquad (1),$$

$$3 < F1/FW < 7 \qquad (2), \text{ and}$$

$$-8 < F1/F2 < -5 \qquad (3),$$

wherein FT and FW designate the entire focal length of the zoom lens system at the long and short focal length extremities, respectively; and F1 and F2 designate the focal length of the first and second lens groups, respectively.

11 Claims, 43 Drawing Sheets

HIGH ZOOM-RATIO ZOOM LENS SYSTEM

BACKGROUND OF THE INVENTION

1. Field of the Invention

The present invention relates to a high zoom-ratio zoom lens system that is suitable as an imaging optical system, mainly for use with an image sensor, which includes a wide-angle range of 70 degrees or greater.

2. Description of Related Art

In recent years, in the field of compact digital cameras, the demand for high zoom-ratio zoom lens systems that include a wide-angle range has increased. On the other hand, miniaturization of the pixel pitch has increased, so that a high resolution is demanded in the optical system. It is common to employ, in imaging lenses for use in mainly compact digital cameras, a retractable-barrel mechanism that uses a so-called multi-stage barrel that reduces the air-distance between lens groups at a fully-retracted (accommodated) state in order to achieve a slimmer (i.e., shorter in the optical axis direction) camera body. In addition to reducing the thickness of each lens group in a lens system that is suitable for such a retractable-barrel mechanism, it is also necessary for the frontmost lens to be small in diameter, and furthermore, for this lens system to be designed with consideration of the mechanical restrictions in regard to the overall length thereof.

As examples of a zoom lens system for use in a high zoom-ratio compact digital camera, zoom lens system such as those disclosed in Japanese Unexamined Patent Publication Nos. 2006-23529 and 2006-308957 are known in the art, in which a relatively small number of lens elements are utilized and further miniaturization is achieved.

However, the zoom lens system that is disclosed in the above-mentioned Japanese Unexamined Patent Publication No. 2006-23529 has a zoom ratio of approximately 5:1, and an angle-of-view of approximately 61 degrees at the short focal length extremity (wide-angle extremity), which are both insufficient. Furthermore, although the zoom lens system that is disclosed in the above-mentioned Japanese Unexamined Patent Publication No. 2006-308957 achieves a wide angle-of-view of approximately 78 degrees at the short focal length extremity (wide-angle extremity), the zoom ratio is approximately 4:1 through 7:1, which is unsatisfactory.

The zoom lens system that is disclosed in Japanese Unexamined Patent Publication No. 2008-112013 is an example of a zoom lens system which is relatively compact and achieves a wide angle-of-view and a high zoom ratio, however, astigmatism and chromatic aberration are great and cannot be corrected to acceptable levels for a zoom lens system that can cope with high pixelization.

SUMMARY OF THE INVENTION

The present invention provides a high zoom-ratio zoom lens system that has a zoom ratio of approximately 8:1 through 12:1, has an angle-of-view of 70 degrees or greater at the short focal length extremity, the frontmost lens thereof has a small diameter, has a short overall length at the short focal length extremity, and is suitable for a retractable zoom-lens camera.

According to an aspect of the present invention, a high zoom-ratio zoom lens system is provided, including a positive first lens group, a negative second lens group, a positive third lens group, and a positive fourth lens group, in that order from the object side. Upon zooming from the short focal length extremity to the long focal length extremity, at least the first through third lens groups are moved along the optical axis direction, wherein an amount of movement of the first lens group along the optical axis direction is greater than that of the third lens group. The following conditions (1), (2) and (3) are satisfied:

$$0.9 < FT/F1 < 2 \tag{1},$$

$$3 < F1/FW < 7 \tag{2, and}$$

$$-8 < F1/F2 < -5 \tag{3},$$

wherein FT designates the entire focal length of the zoom lens system at the long focal length extremity, F1 designates the focal length of the first lens group, FW designates the entire focal length of the zoom lens system at the short focal length extremity, and F2 designates the focal length of the second lens group.

It is desirable for the following condition (4) to be satisfied:

$$2.5 < M2T/M2W < 6 \tag{4},$$

wherein M2T designates the magnification of the second lens group with respect to an object at infinity at the long focal length extremity, and M2W designates the magnification of the second lens group with respect to an object at infinity at the short focal length extremity.

It is desirable for a lens element that is provided closest to the object side within the first lens group to be a negative lens element that satisfies the following condition (5):

$$1.9 < n1 \tag{5},$$

wherein n1 designates the refractive index at the d-line of the negative lens element that is provided closest to the object side within the first lens group.

It is desirable for the following condition (6) to be satisfied:

$$v3Pa > 64 \tag{6},$$

wherein v3Pa designates the average Abbe number with respect to the d-line of the positive lens elements that are provided within the third lens group.

It is desirable for the following condition (7) to be satisfied:

$$0.3 < n3Na - n3Pa \tag{7},$$

wherein n3Na designates the average refractive index at the d-line of the negative lens elements that are provided within the third lens group, and n3Pa designates the average refractive index at the d-line of the positive lens elements that are provided within the third lens group.

It is desirable for the third lens group to include a positive lens element, a positive lens element and a negative lens element, in that order from the object side. It is desirable for the positive lens element on the image side and the negative lens element within the third lens group to be bonded together to constitute a cemented lens.

It is desirable for the third lens group to include a positive lens element, a positive lens element, a negative lens element and a negative lens element, in that order from the object side. It is desirable for the positive lens element on the image side and the negative lens element on the object side, within the third lens group, to be bonded together to constitute a cemented lens.

It is desirable for the first lens group to include a negative lens element and a positive lens element, in that order from the object side, wherein the following condition (8) is satisfied:

$$v1N < 23 \tag{8, wherein}$$

v1N designates the Abbe number with respect to the d-line of the negative lens element that is provided closest to the object side within the first lens group.

It is desirable for the fourth lens group to include a resin single lens element having a convex surface on the object side with at least the convex surface on the object side being formed as an aspherical surface that is formed so as to have an increasingly greater radius of curvature, compared to the paraxial convex spherical surface thereof, at an increasing distance toward the periphery thereof.

According to the present invention, a high zoom-ratio zoom lens system that has a zoom ratio of approximately 8:1 through 12:1, has an angle-of-view of 70 degrees or greater at the short focal length extremity, the frontmost lens thereof has a small diameter, has a short overall length at the short focal length extremity, and is suitable for a retractable-barrel camera is achieved.

The present disclosure relates to subject matter contained in Japanese Patent Application No. 2010-49157 (filed on Mar. 5, 2010) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 43:
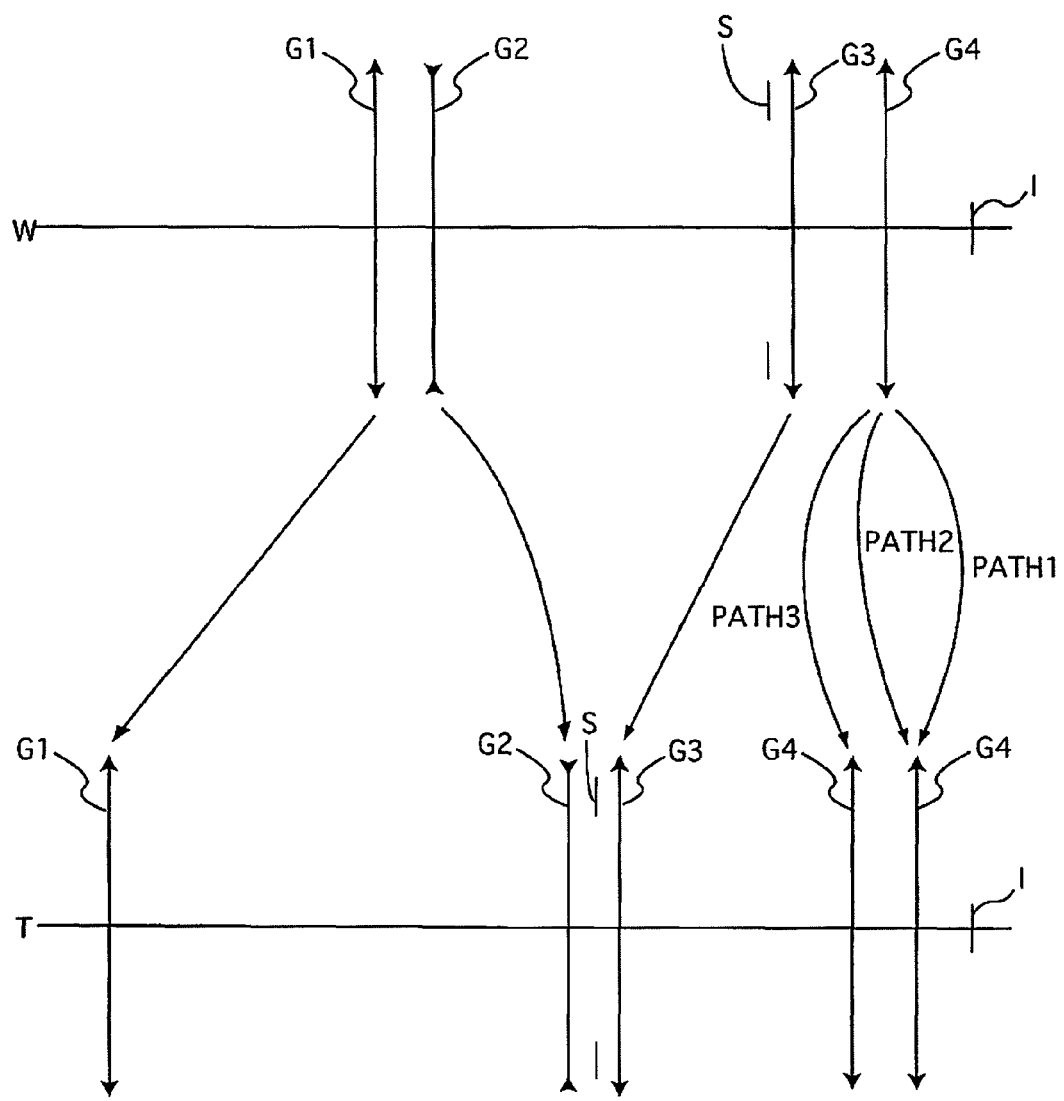
FIG. 43 shows a zoom path of the zoom lens system according to the present invention.

The high zoom-ratio zoom lens system according to the present invention includes, as shown in the zoom path diagram of FIG. 43, a positive first lens group G1, a negative second lens group G2, a positive third lens group G3 and a positive fourth lens group G4, in that order from the object side. A diaphragm S is provided in between the second lens group G2 and the third lens group G3, and moves integrally with the third lens group G3 during zooming. "I" designates the image plane.

Upon zooming from the short focal length extremity (W) to the long focal length extremity (T), at least the first through third lens groups G1 through G3 move along the optical axis so that the distance between the first lens group G1 and the second lens group G2 increases, the distance between the second lens group G2 and the third lens group G3 decreases, and the distance between the third lens group G3 and the fourth lens group G4 increases.

More specifically, upon zooming from the short focal length extremity to the long focal length extremity, the first lens group G1 moves monotonically toward the object side, the second lens group G2 moves monotonically toward the image side while plotting a convex moving path toward the image side, and the third lens group G3 moves monotonically toward the object side. Furthermore, upon zooming from the short focal length extremity to the long focal length extremity, the fourth lens group G4 moves according to one of three paths, i.e.: a first path in which the fourth lens group G4 first moves toward the image side and thereafter moves toward the object side so as to be positioned closer to the image side at the long focal length extremity than at the short focal length extremity (path 1, numerical embodiments 1 and 2); a second path in which the fourth lens group G4 first moves toward the object side and thereafter moves toward the image side so as to be positioned closer to the image side at the long focal length extremity than at the short focal length extremity (path 2, numerical embodiments 3 through 6); or a third path in which the fourth lens group G4 first moves toward the object side and thereafter moves toward the image side so as to be positioned closer to the object side at the long focal length extremity than at the short focal length extremity (path 3, numerical embodiment 7). It should be noted that the fourth lens group G4 can alternatively move in a manner so that upon first moving toward the object side and thereafter moving toward the image side (or vice versa), the fourth lens group G4 returns to the same (original) position in the optical axis direction at the long focal length extremity as that of the short focal length extremity.

The amount of movement in the optical axis direction of the first lens group G1 which monotonically moves toward the object side is greater than that of the third lens group G3 which also monotonically moves toward the object side.

In the first through third, fifth and seventh numerical embodiments, the first lens group G1 is configured of a negative lens element 10 and a positive lens element 11, in that order from the object side. The negative lens element 10 is a negative meniscus lens element having a convex surface on the object side. The positive lens element 11 is either a biconvex positive lens element (first through third and seventh numerical embodiments) or a positive meniscus lens element having a convex surface on the object side (fifth numerical embodiment).

In the fourth and sixth numerical embodiments, the first lens group G1 is configured of a negative lens element 10, a positive lens element 11 and a positive lens element 12, in that order from the object side. The negative lens element 10 is a negative meniscus lens element having a convex surface on the object side. The positive lens element 11 is a positive meniscus lens element having a convex surface on the object side. The positive lens element 12 is a planoconvex positive lens element having a convex surface on the object side (fourth numerical embodiment) or a biconvex positive lens element (sixth numerical embodiment).

In each of the first through seventh embodiments, the second lens group G2 is configured of a negative lens element 20, a negative lens element 21 and a positive lens element 22, in that order from the object side.

The negative lens element 20 is either a biconcave negative lens element (first and sixth numerical embodiments), a negative meniscus lens element having a convex surface on the object side (second, fifth and seventh numerical embodiments), or a planoconcave lens element having a concave surface on the image side (third and fourth numerical embodiments). The negative lens element 20 can either employ a spherical surface(s) (first through fourth, sixth and seventh numerical embodiments) or have an aspherical surface on each side thereof (fifth numerical embodiment).

The negative lens element 21 is either a negative meniscus lens element having a convex surface on the object side (first through sixth numerical embodiments) or a biconcave negative lens element (seventh numerical embodiment).

The positive lens element 22 is a positive meniscus lens element having a convex surface on the object side, and has an aspherical surface on each side thereof.

In each of the first through third, fifth and seventh numerical embodiments, the third lens group G3 is configured of a positive lens element 30 and a cemented lens 33 formed from a positive lens element 31 and a negative lens element 32, in that order from the object side. The positive lens element 30 is a biconvex positive lens element and has an aspherical surface on each side thereof. The positive lens element 31 is a positive meniscus lens element having a convex surface on the object side. The negative lens element 32 is a negative meniscus lens element having a convex surface on the object side.

In the fourth and sixth numerical embodiments, the third lens group G3 is configured of a positive lens element 30, a cemented lens 33 formed from a positive lens element 31 and a negative lens element 32, and a negative lens element 34, in that order from the object side. The positive lens element 30 is a biconvex positive lens element and has an aspherical surface on each side thereof. The positive lens element 31 is a biconvex positive lens element. The negative lens element 32 is a negative meniscus lens element having a convex surface on the image side. The negative lens element 34 is a negative meniscus lens element having a convex surface on the object side.

In each of the first through seventh numerical embodiments, the fourth lens group G4 is configured of one positive lens element 40. The positive lens element 40 is formed from resin, is provided with a convex surface on the object side, and has an aspherical surface on at least the object side thereof. The convex aspherical surface on the object side of the positive lens element 40 is formed so as to have an increasingly greater radius of curvature, compared to the paraxial convex spherical surface, at an increasing distance toward the periphery thereof.

In the first through fifth and seventh numerical embodiments, the positive lens element 40 is a biconvex positive lens element having an aspherical surface on each side thereof.

In the sixth numerical embodiment, the positive lens element 40 is a positive meniscus lens element having a convex surface on the object side, and has an aspherical surface on each side thereof.

In order to further miniaturize a camera in which a retractable zoom lens system employing a multi-stage retractable barrel is installed, it is important to reduce the diameter of the first lens group (G1) that is positioned closest to the object side and to decrease the overall length of the zoom lens system. Furthermore, a small thickness (in the optical axis direction) is also demanded for each lens group. It is also necessary to simplify the mechanical structure for moving the lens groups during zooming. If the number of lens groups are decreased, the mechanical structure therefor is simplified, however, it becomes difficult to achieve a high zoom-ratio zoom lens system. Generally, when the number of lens elements in a zoom lens system is reduced in order to achieve further miniaturization and/or to reduce the thickness of the lens groups, it becomes increasingly difficult to correct aberrations. In order to favorably correct various aberrations over the entire zooming range while achieving miniaturization, an appropriate refractive-power distribution for each lens group and an appropriate lens arrangement are necessary.

The high zoom-ratio zoom lens system according to the present invention is a positive-lead zoom lens system configured of a positive lens group, a negative lens group, a positive lens group and a positive lens group, in that order from the object side, and has the advantage of being able to achieve a higher zoom ratio than that of a negative-lead zoom lens system that are often used in compact digital cameras. However, in the case of a positive-lead zoom lens system, if attempts are made to achieve a higher zoom ratio, the overall length of the zoom lens system increases, and if attempts are made to achieve a wider angle-of-view, the diameter of the frontmost lens group (first lens group) easily increases; accordingly, it has been a problem to achieve miniaturization of the zoom lens system in order to install such a zoom lens system into a compact digital camera. To solve this problem, in the present invention, by moving the first lens group G1 of the zoom lens system by a large amount, upon zooming from the short focal length extremity to the long focal length extremity, the degree of freedom in movement of the second lens group G2 and the third lens group G3 is increased, and the burden of zooming can be appropriately determined for each lens group. For example, if the first lens group were a fixed (i.e., immovable along the optical axis direction) lens group, an increased burden of zooming would be applied to the second lens group, resulting in the diameter of the first lens group (frontmost lens group) easily increasing.

Condition (1) specifies the ratio of the focal length of the entire zoom lens system at the long focal length extremity to the focal length of the first lens group G1. Hence, condition (1) achieves a high zoom-ratio zoom lens system that is suitable for use in a compact digital camera.

If the upper limit of condition (1) is exceeded, although advantageous for decreasing the overall length of the zoom lens system at the long focal length extremity, the angle-of-view at the short focal length extremity becomes undesirably narrow.

If the lower limit of condition (1) is exceeded, the refractive power of the first lens group G1 becomes weak, so that if attempts are made to achieve a high zoom ratio, the amount of movement (along the optical axis) of the first lens group G1 during zooming becomes excessively great, so that the overall length of the zoom lens system at the long focal length extremity becomes large.

Condition (2) specifies the ratio of the focal length of the first lens group G1 to the focal length of the entire zoom lens system at the short focal length extremity. Hence, condition (2) is for achieving a high zoom-ratio zoom lens system that is suitable for use in a compact digital camera.

If the upper limit of condition (2) is exceeded, the amount of movement of the first lens group G1 during zooming becomes too great, so that the overall length of the zoom lens system becomes undesirably large at the long focal length extremity. Moreover, if the overall length of the zoom lens system at the short focal length extremity is decreased in order to suppress (decrease) the overall length of the zoom lens system at the long focal length extremity, it becomes difficult to correct abaxial aberrations due to an increase in the angle-of-view.

If the lower limit of condition (2) is exceeded, the amount of movement of the first lens group G1 (during zooming) decreases, which reduces the movement freedom of the second lens group G2 and the third lens group G3. Furthermore, in order to increase the zoom ratio, it becomes necessary to increase the amount of movement of the second lens group G2, so that when a wide angle-of-view is achieved, the outer diameter of the first lens group G1 becomes undesirably large. Nevertheless, if the outer diameter of the first lens group G1 is forcedly made smaller, it becomes necessary to increase the refractive power of each lens group, so that aberration correction over the entire zoom range becomes difficult, and it becomes difficult for the zoom lens system to cope with a high resolution.

Condition (3) specifies the ratio of the focal length of the first lens group G1 to the focal length of the second lens group G2. Hence, condition (3) achieves a high zoom-ratio zoom lens system that is suitable for use in a compact digital camera.

If the upper limit of condition (3) is exceeded, the refractive power of the second lens group G2 becomes weak with respect to the refractive power of the first lens group G1, which is advantageous for reducing the overall length of the zoom lens system at the long focal length extremity, however, it becomes difficult to achieve a wide angle-of-view of 70 degrees or more.

If the lower limit of condition (1) is exceeded, the refractive power of the second lens group G2 becomes too strong with respect to the refractive power of the first lens group G1, so that the diameter of the first lens group G1 becomes too large, and the overall length of the zoom lens system at the long focal length extremity increases. In order to reduce the overall length of the zoom lens system with the lower limit of condition (3) exceeded, it becomes necessary to strengthen (increase) the refractive power of each lens group and to reduce the movement amounts during zooming of each lens group; however, it becomes difficult to correct aberrations over the entire zooming range.

By satisfying conditions (1) through (3), the diameter of the first lens group G1 can be prevented from being enlarged, and the overall length of the zoom lens system at the long focal length extremity can be reduced.

Condition (4) specifies the ratio of the magnification of the second lens group G2 at the long focal length extremity with respect to an object at infinity to the magnification of the second lens group G2 at the short focal length extremity with respect to an object at infinity. Condition (4) achieves miniaturization of the zoom lens system and enables favorable sharing of the zooming function between the second lens group G2 and the third lens group G3.

If the upper limit of condition (4) is exceeded, the burden of zooming on the second lens group G2 becomes excessively large, the amount of movement of the second lens group G2 during zooming increases, and an increase in fluctuation of the f-number occurs, which are undesirable.

If the lower limit of condition (4) is exceeded, since the zooming function of the second lens group G2 decreases, it becomes difficult to provide a high zoom-ratio over the entire zooming range of the zoom lens system.

As shown in each of the first through seventh numerical embodiments, the lens element that is provided closest to the object side within the first lens group G1 is a negative lens element (10). In view of this arrangement, condition (5) specifies the refractive index at the d-line of the above-mentioned negative lens element (10) that is provided closest to the object side within the first lens group G1 in order to reduce the diameter of the first lens group G1.

If the lower limit of condition (5) is exceeded, the radius of curvature of the surface on the image side of the above-mentioned negative lens element (10) (that is provided closest to the object side within the first lens group G1) decreases, so that the peripheral edge portion of this negative lens element (10) becomes thicker, and hence, the light-ray height at the surface on the object side of this negative lens element (10) increases, and in turn increases the diameter of the first lens group G1.

Condition (6) specifies the average Abbe number with respect to the d-line of the positive lens elements (30, 31) that are provided within the third lens group G3 in order to correct chromatic aberration at the third lens group G3, and in turn reducing chromatic aberration over the entire high zoom-ratio zoom lens system.

If the lower limit of condition (6) is exceeded, correction of axial chromatic aberration from the short focal length extremity to the long focal length extremity become insufficient, which is undesirable.

Furthermore, it is desirable for the positive lens elements (30, 31) that are provided within the third lens group G3 to be formed from an anomalous dispersion glass material that has a partial dispersion ratio satisfying Pg_F<0.54.

Condition (7) specifies the difference between the average refractive index at the d-line of the negative lens elements (32, 34) that are provided within the third lens group G3 and the average refractive index at the d-line of the positive lens element (30, 31) that are provided within the third lens group G3. In order to suppress (reduce) the overall length of the high zoom-ratio zoom lens system, it is necessary to strengthen the refractive power of each lens group; however, this tends to cause the sign of the Petzval sum (which is an indicator for field curvature) to be negative. Condition (7) is for restricting the sign of the Petzval sum to become negative. If the lower limit of condition (7) is exceeded, the Petzval sum becomes negative, positive field curvature occurs, and the flatness of the imaging plane is lost.

As shown in each of the first through seventh numerical embodiments, the first lens group G1 is configured of a negative lens element (10) and a positive lens element, in that order from the object side. In view of this arrangement, condition (8) specifies the Abbe number with respect to the d-line of the negative lens element (10) that is provided closest to the object side within the first lens group G1, and relates to the correction of chromatic aberration in the first lens group G1.

If the upper limit of condition (8) is exceeded, correction of the chromatic aberration in the first lens group G1 becomes insufficient, so that it becomes difficult to reduce the chromatic aberration over the entire zooming range of the zoom lens system.

By constructing the third lens group G3 so as to be configured of three lens elements, i.e., a positive lens element, a positive lens element and a negative lens element, in that order from the object side, a zoom lens system that is suitable for use in a compact digital camera can be achieved in which various aberrations can be favorably corrected while being able to reduce the thickness (length along the optical axis) of the third lens group G3 and have a reduced length (in the optical axis direction) when in a fully-retracted state (accommodation state).

On the other hand, by constructing the third lens group G3 so as to be configured of four lens elements, i.e., a positive lens element, a positive lens element, a negative lens element and a negative lens element, in that order from the object side, although the thickness of the third lens group G3 is sacrificed (by being thicker), aberrations can be favorably corrected.

By constructing the fourth lens group G4 from a resin single lens element having a convex surface on the object side with at least the convex surface on the object side being formed as an aspherical surface which is formed so as to have an increasingly greater radius of curvature, compared to the paraxial convex spherical surface, at an increasing distance toward the periphery thereof, the fourth lens group G4 can function as a focusing lens group and changes in the field curvature when focusing at a close distance which easily occur at the long focal length extremity can be reduced. Furthermore, by forming the fourth lens group G4 from a light-weight aspherical resin lens element, a more rapid auto-focusing operation can be performed.

EMBODIMENTS

Specific numerical embodiments will be herein discussed. The following numerical embodiments are applied to a zoom lens system used in a compact digital camera. In the aberration diagrams and the tables, the d-line, g-line and C-line show aberrations at their respective wave-lengths, S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and v d designates the Abbe number with respect to the d-line. The values for the f-number, the focal length, the half angle-of-view, the image height, the backfocus, the overall length of the lens system, and the distance between lenses (which changes during zooming and according to the overall length of the lens system) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Embodiment 1

Figure 1:
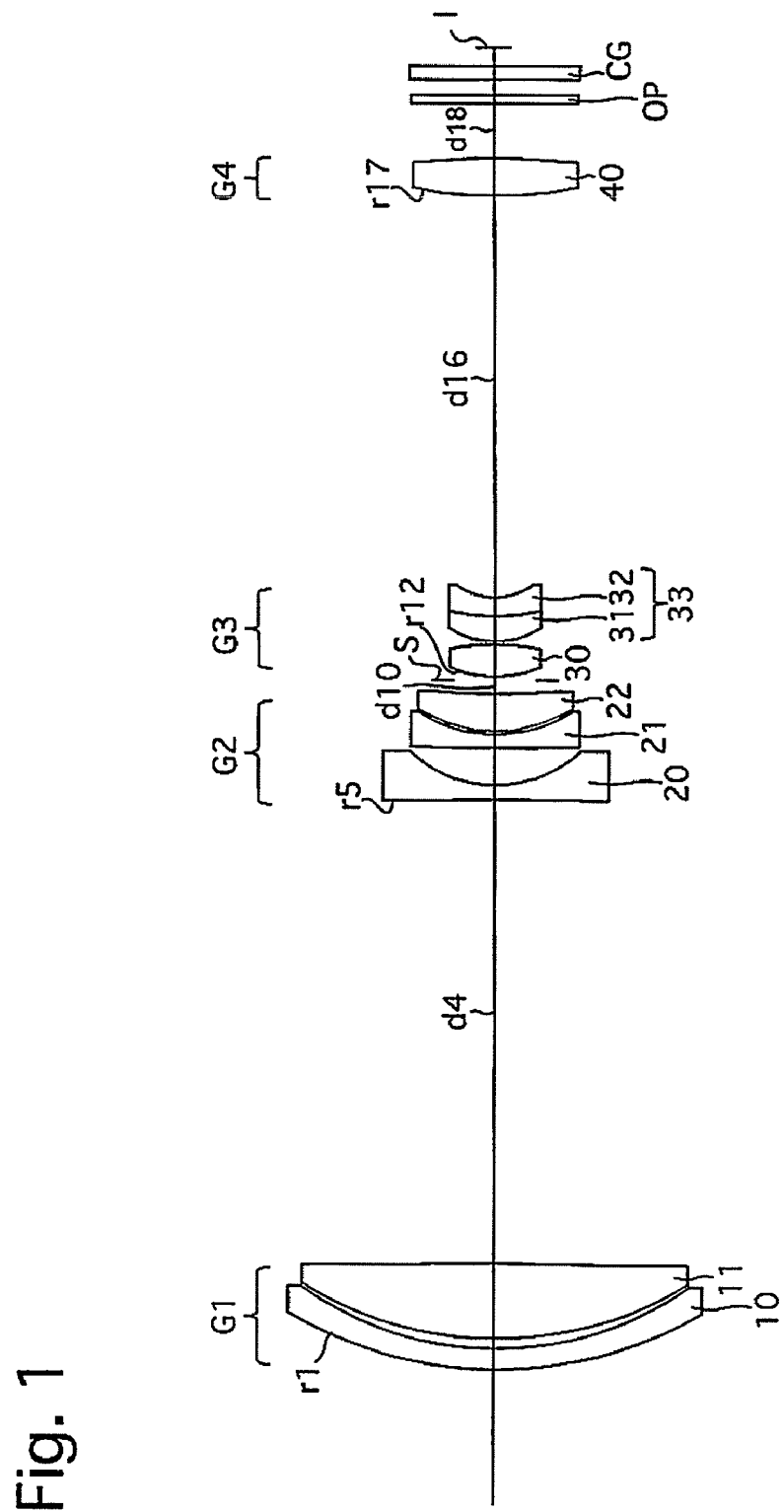
FIG. 1 shows a lens arrangement of a first numerical embodiment of the high zoom-ratio zoom lens system, according to the present invention, at the long focal length extremity when focused on an object at infinity.
Figure 2:
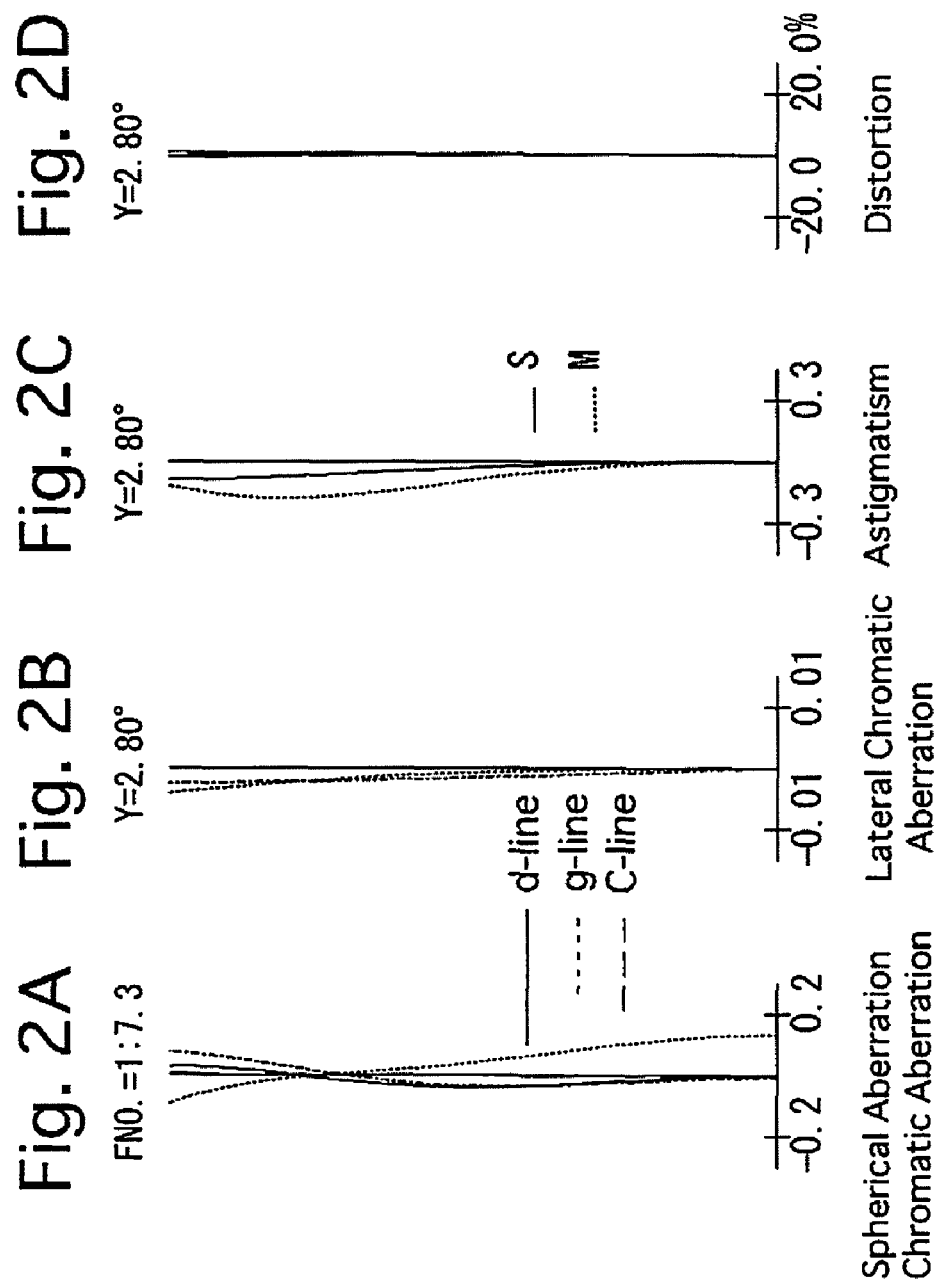
FIGS. 2A, 2B, 2C and 2D show various aberrations that occurred in the lens arrangement shown in FIG. 1.
Figure 3:
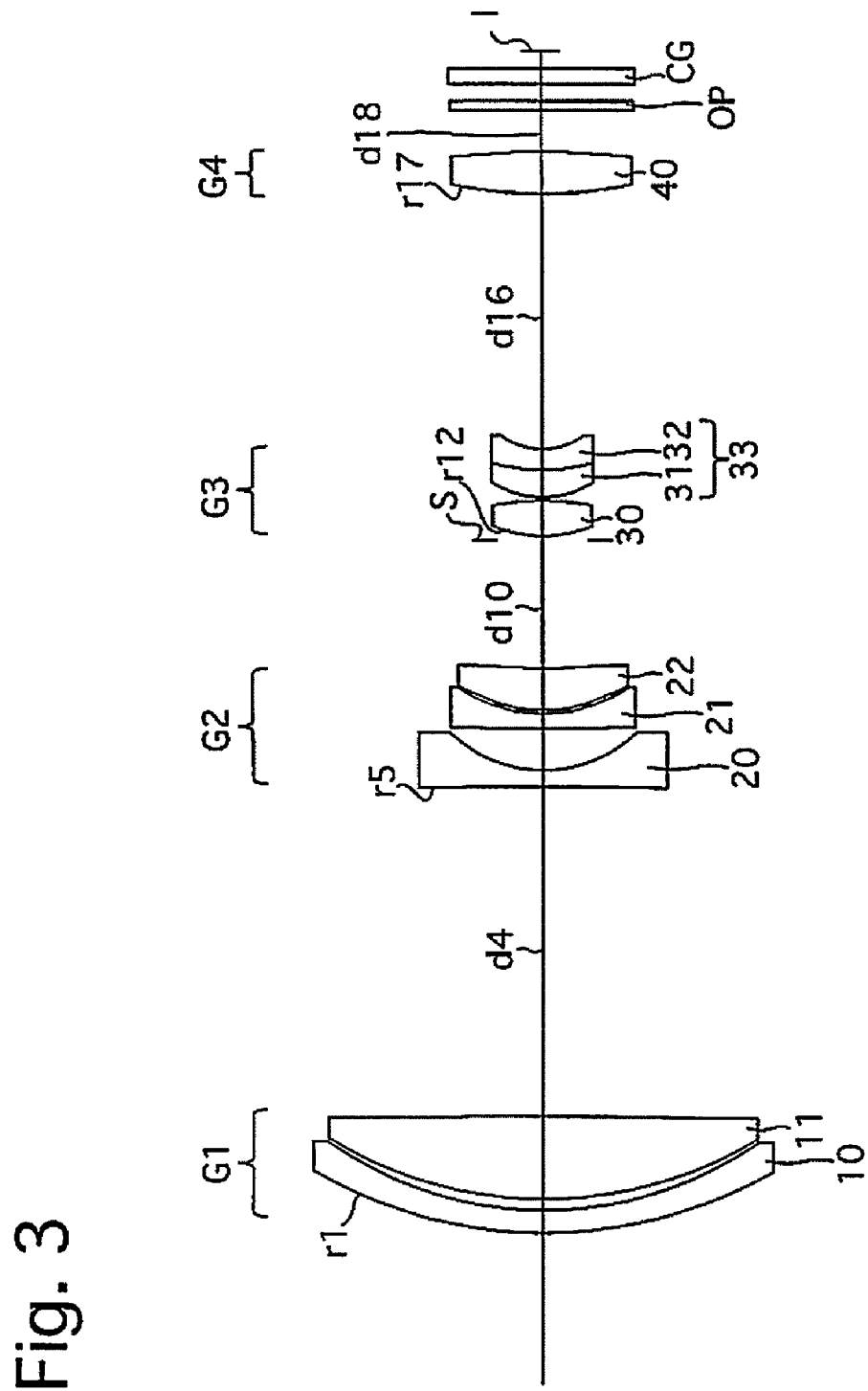
FIG. 3 shows a lens arrangement of the first numerical embodiment of the high zoom-ratio zoom lens system at an intermediate focal length when focused on an object at infinity.
Figure 4:
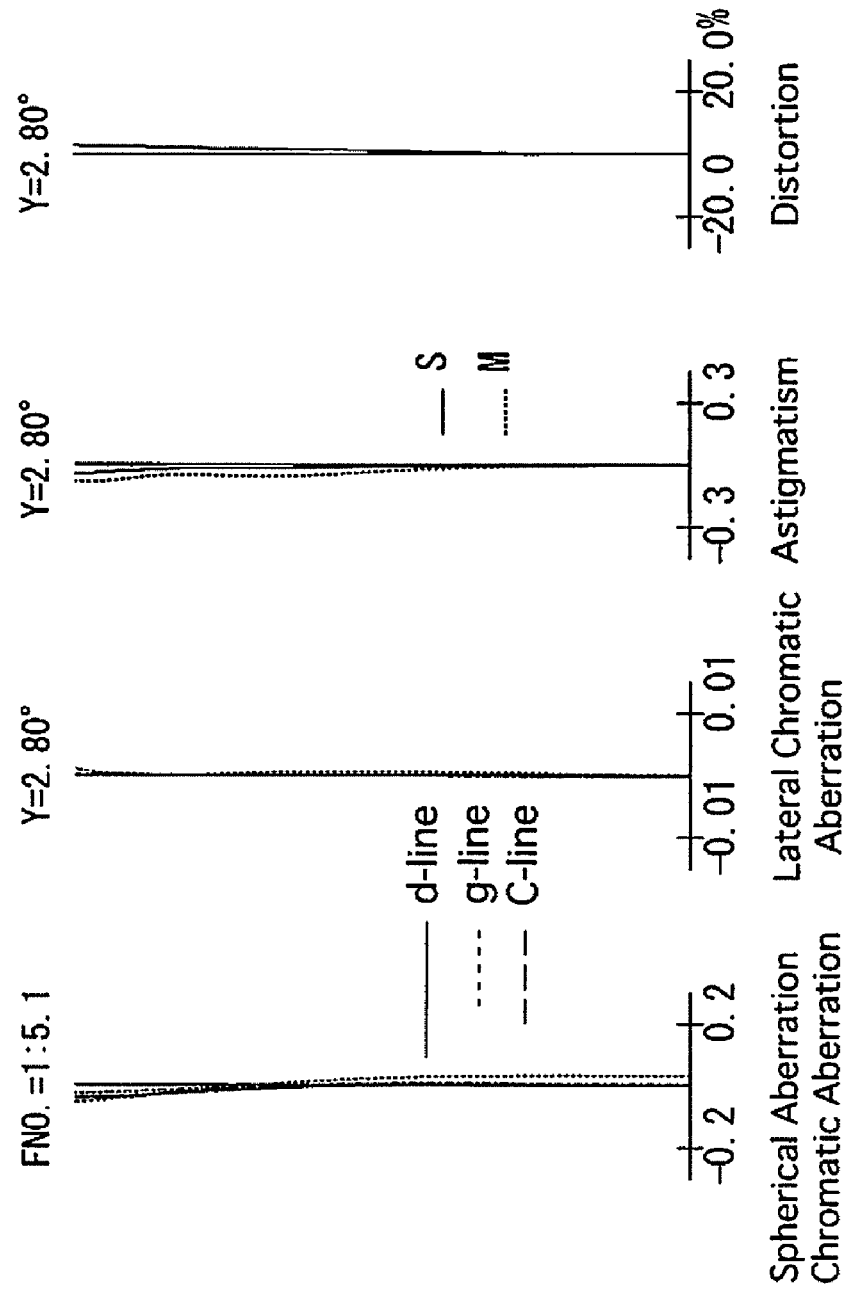
FIGS. 4A, 4B, 4C and 4D show various aberrations that occurred in the lens arrangement shown in FIG. 3.
Figure 5:
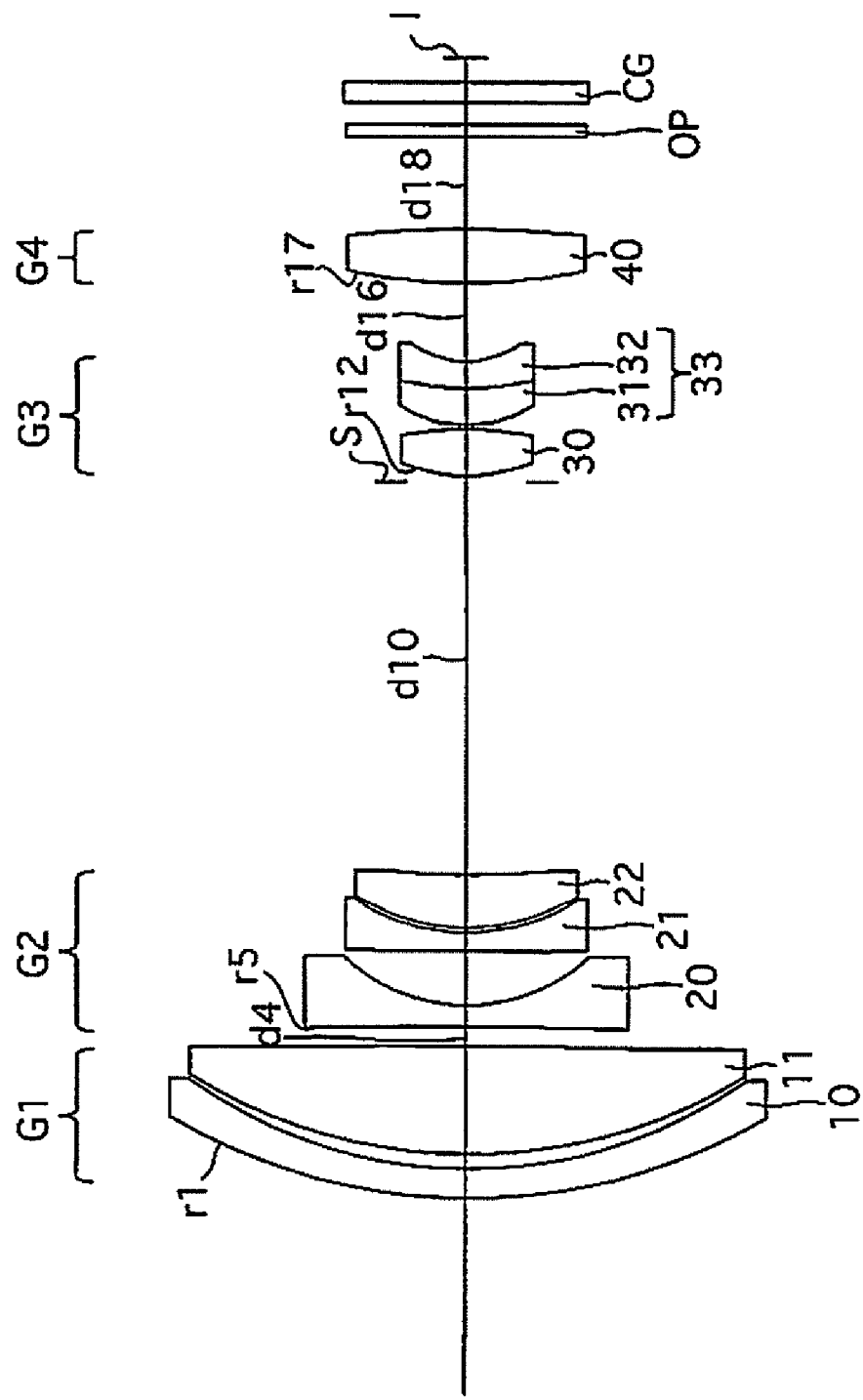
FIG. 5 shows a lens arrangement of the first numerical embodiment of the high zoom-ratio zoom lens system at the short focal length extremity when focused on an object at infinity.
Figure 6:
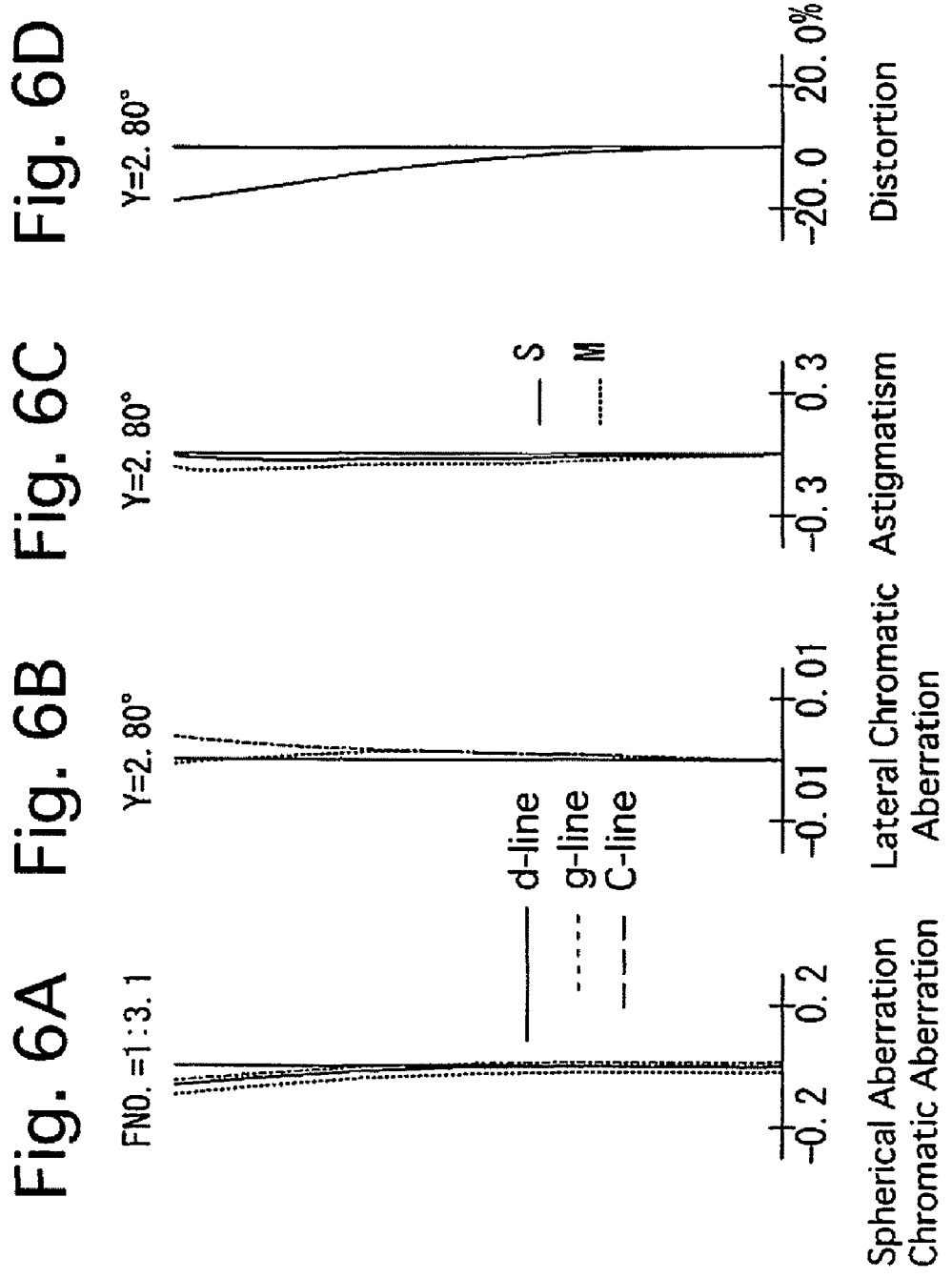
FIGS. 6A, 6B, 6C and 6D show various aberrations that occurred in the lens arrangement shown in FIG. 5.

FIGS. 1 through 6D and Tables 1 through 4 illustrate a first numerical embodiment of a high zoom-ratio zoom lens system according to the present invention. FIG. 1 shows a lens arrangement of the first numerical embodiment of the high zoom-ratio zoom lens system at the long focal length extremity when focused on an object at infinity. FIGS. 2A, 2B, 2C and 2D show various aberrations that occurred in the lens arrangement shown in FIG. 1. FIG. 3 shows a lens arrangement of the first numerical embodiment of the high zoom-ratio zoom lens system at an intermediate focal length when focused on an object at infinity. FIGS. 4A, 4B, 4C and 4D show various aberrations that occurred in the lens arrangement shown in FIG. 3. FIG. 5 shows a lens arrangement of the first numerical embodiment of the high zoom-ratio zoom lens system at the short focal length extremity when focused on an object at infinity. FIGS. 6A, 6B, 6C and 6D show various aberrations that occurred in the lens arrangement shown in FIG. 5. Table 1 shows the lens surface data, Table 2 shows various zoom lens system data, Table 3 shows the aspherical surface data, and Table 4 shows the lens group data.

The high zoom-ratio zoom lens system of the first numerical embodiment is configured of a positive first lens group G1, a negative second lens group G2, a positive third lens group G3 and a positive fourth lens group G4, in that order from the object side.

The first lens group G1 (surface Nos. 1 through 4) is configured of a negative meniscus lens element 10 having a convex surface on the object side, and a biconvex positive lens element 11, in that order from the object side.

The second lens group G2 (surface Nos. 5 through 10) is configured of a biconcave negative lens element 20, a negative meniscus lens element 21 having a convex surface on the object side, and a positive meniscus lens element 22 having a convex surface on the object side, in that order from the object side. The positive meniscus lens element 22 has an aspherical surface formed on each side thereof.

The third lens group G3 (surface Nos. 12 through 16) is configured of a biconvex positive lens element 30 and a cemented lens 33 that is formed from a positive meniscus lens element 31 having a convex surface on the object side and a negative meniscus lens element 32 having a convex surface on the object side, in that order from the object side. The biconvex positive lens element 30 has an aspherical surface formed on each side thereof. A diaphragm S (surface No. 11) which is provided between the second lens group G2 and the third lens group G3 moves integrally with the third lens group G3 during zooming.

The fourth lens group G4 (surface Nos. 17 and 18) is configured of a single biconvex positive lens element 40. The biconvex positive lens element 40 is formed from resin and has an aspherical surface on each side thereof. The aspherical surface on the object side of the positive lens element 40 is formed so as to have an increasingly greater radius of curvature, compared to the paraxial convex spherical surface, at an increasing distance away from the optical axis and toward the periphery of the positive lens element 40. An optical filter OP (surface Nos. 19 and 20) and a cover glass CG (surface Nos. 21 and 22) are provided behind the fourth lens group G4 (biconvex positive lens element 40), i.e., between the fourth lens group G4 and the imaging plane I.

TABLE 1

LENS SURFACE DATA

| Surf. No. | r | d | N(d) | vd |
|---|---|---|---|---|
| 1 | 15.396 | 0.750 | 1.92286 | 20.9 |
| 2 | 12.536 | 0.380 | | |
| 3 | 13.919 | 2.743 | 1.59282 | 68.6 |
| 4 | −485.244 | d4 | | |
| 5 | −272.420 | 0.550 | 1.83481 | 42.7 |
| 6 | 4.632 | 1.377 | | |
| 7 | 94.355 | 0.500 | 1.75500 | 52.3 |
| 8 | 5.257 | 0.100 | | |
| 9* | 4.828 | 1.389 | 1.82115 | 24.1 |
| 10* | 19.861 | d10 | | |
| 11 (Diaphragm) | ∞ | 0.150 | | |
| 12* | 4.152 | 1.188 | 1.49700 | 81.6 |
| 13* | −7.828 | 0.100 | | |
| 14 | 3.084 | 0.929 | 1.48749 | 70.4 |
| 15 | 6.818 | 0.699 | 1.90366 | 31.3 |
| 16 | 2.384 | d16 | | |
| 17* | 18.000 | 1.383 | 1.54358 | 55.7 |
| 18* | −20.999 | d18 | | |
| 19 | ∞ | 0.300 | 1.51680 | 64.2 |
| 20 | ∞ | 0.560 | | |
| 21 | ∞ | 0.500 | 1.51680 | 64.2 |
| 22 | ∞ | — | | |

The asterisk (*) designates an aspherical surface which is rotationally symmetrical with respect to the optical axis.

TABLE 2

ZOOM LENS SYSTEM DATA
Zoom Ratio 12.00

| | Short Focal Length Extremity | Intermediate Focal Length | Long Focal Length Extremity |
|---|---|---|---|
| FNO. | 3.1 | 5.1 | 7.3 |
| f | 3.67 | 14.21 | 43.99 |
| W | 42.8 | 10.9 | 3.6 |
| Y | 2.80 | 2.80 | 2.80 |
| fB | 0.59 | 0.59 | 0.59 |
| L | 29.09 | 39.23 | 48.50 |
| d4 | 0.500 | 10.955 | 17.063 |
| d10 | 10.046 | 4.242 | 0.500 |
| d16 | 2.000 | 8.466 | 14.751 |
| d18 | 2.354 | 1.375 | 2.000 |

TABLE 3

ASPHERICAL SURFACE DATA (aspherical surface coefficients not indicated are zero (0.00)):

| Surf. No. | K | A4 | A6 | A8 | A10 |
|---|---|---|---|---|---|
| 9 | 0.000 | $-0.1221 \times 10^{-2}$ | $0.1181 \times 10^{-4}$ | $-0.1633 \times 10^{-5}$ | $-0.1160 \times 10^{-5}$ |
| 10 | 0.000 | $-0.1298 \times 10^{-2}$ | $0.1286 \times 10^{-3}$ | $-0.2066 \times 10^{-4}$ | |
| 12 | −1.000 | $-0.9300 \times 10^{-3}$ | $0.1325 \times 10^{-3}$ | $0.2237 \times 10^{-4}$ | |
| 13 | 0.000 | $0.6020 \times 10^{-3}$ | $0.1132 \times 10^{-3}$ | $0.2562 \times 10^{-4}$ | |
| 17 | 0.000 | $0.1076 \times 10^{-2}$ | $-0.5826 \times 10^{-4}$ | $0.4196 \times 10^{-5}$ | $-0.2137 \times 10^{-6}$ |
| 18 | 0.000 | $0.1437 \times 10^{-2}$ | $-0.1688 \times 10^{-3}$ | $0.1458 \times 10^{-4}$ | $-0.5809 \times 10^{-6}$ |

TABLE 4

LENS GROUP DATA

| Lens Group | 1$^{st}$ Surf. | Focal Length |
|---|---|---|
| 1 | 1 | 32.29 |
| 2 | 5 | −5.20 |
| 3 | 12 | 6.74 |
| 4 | 17 | 18.06 |

Embodiment 2

Figure 7:
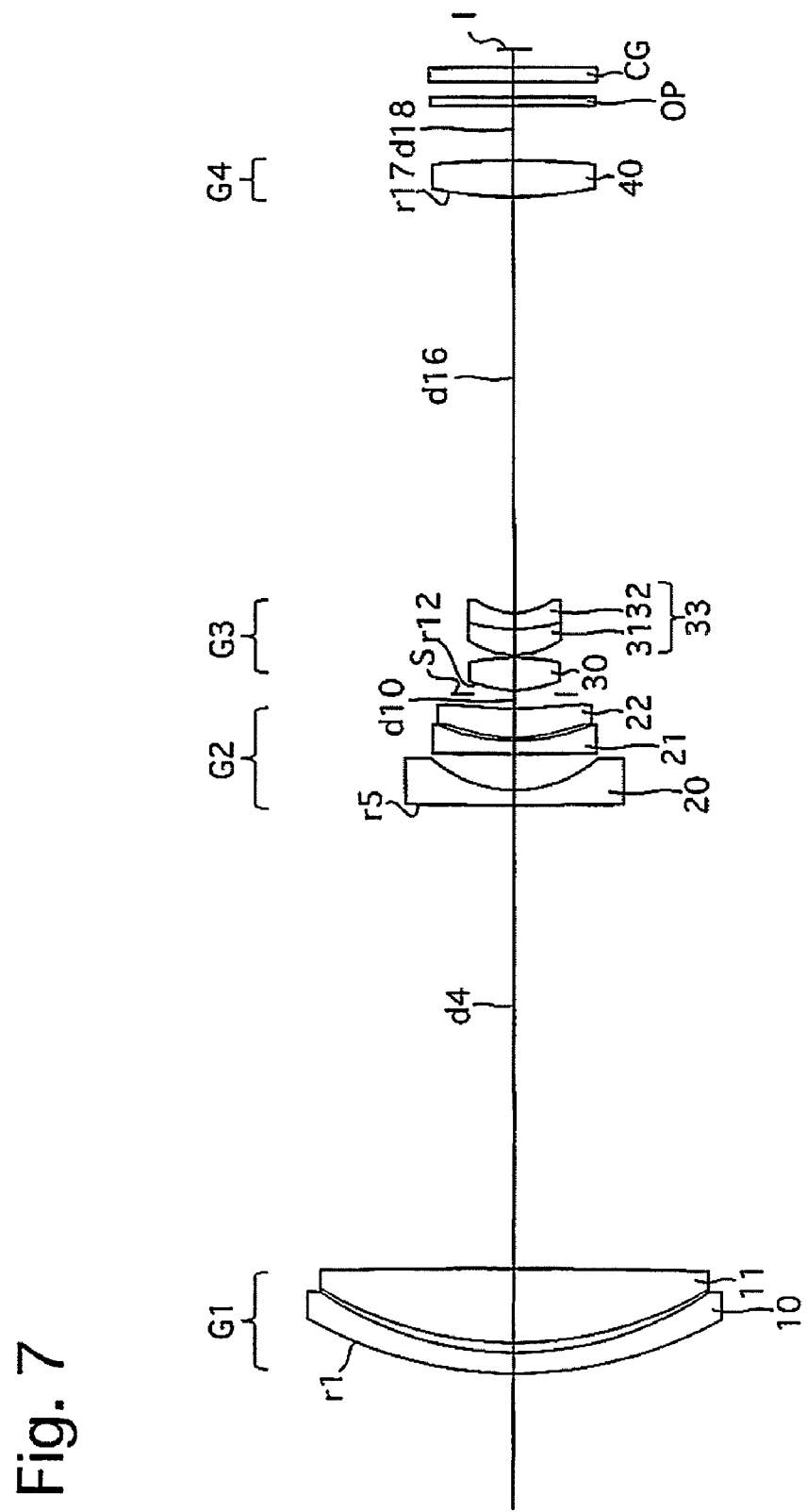
FIG. 7 shows a lens arrangement of a second numerical embodiment of the high zoom-ratio zoom lens system, according to the present invention, at the long focal length extremity when focused on an object at infinity.
Figure 8:
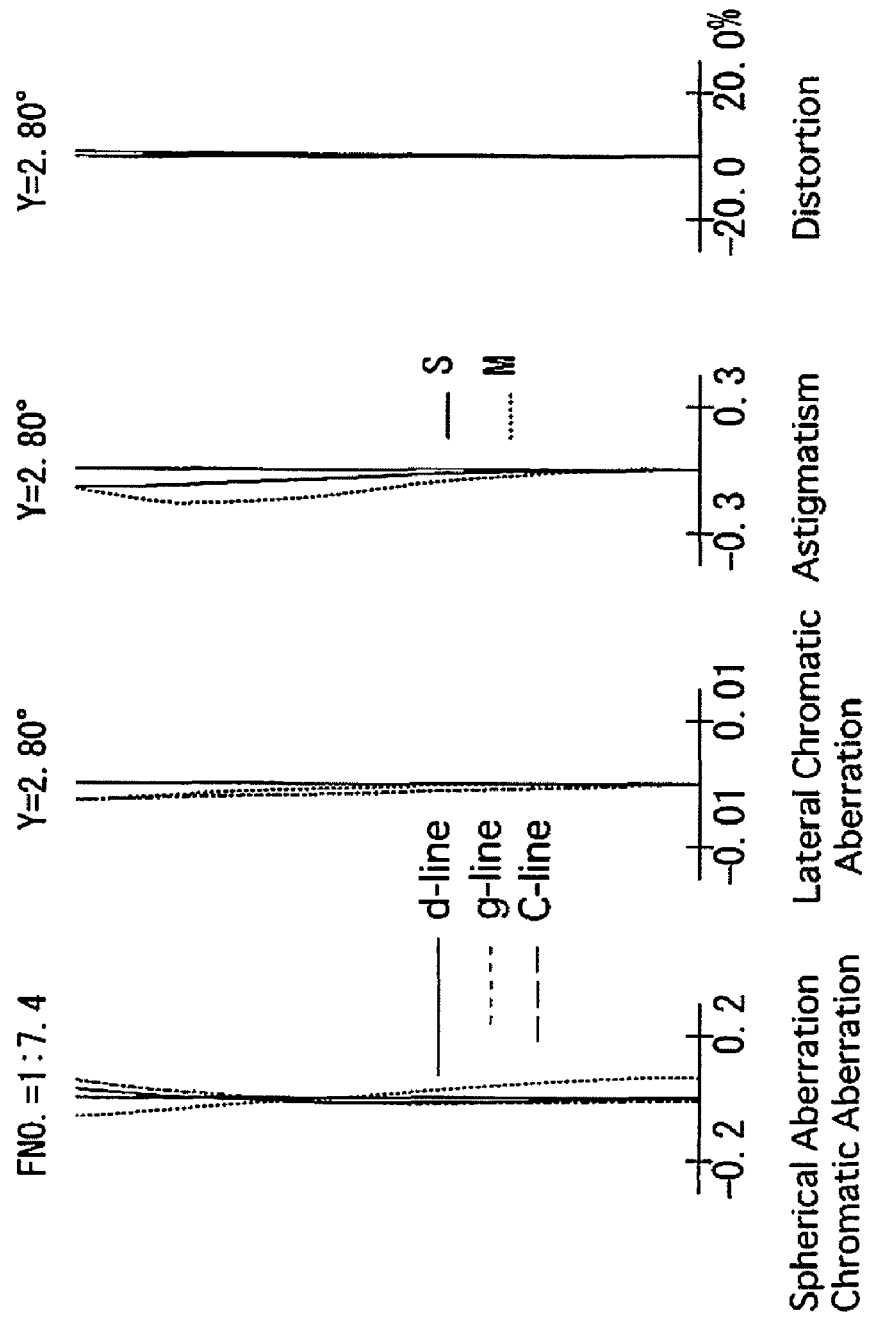
FIGS. 8A, 8B, 8C and 8D show various aberrations that occurred in the lens arrangement shown in FIG. 7.
Figure 9:
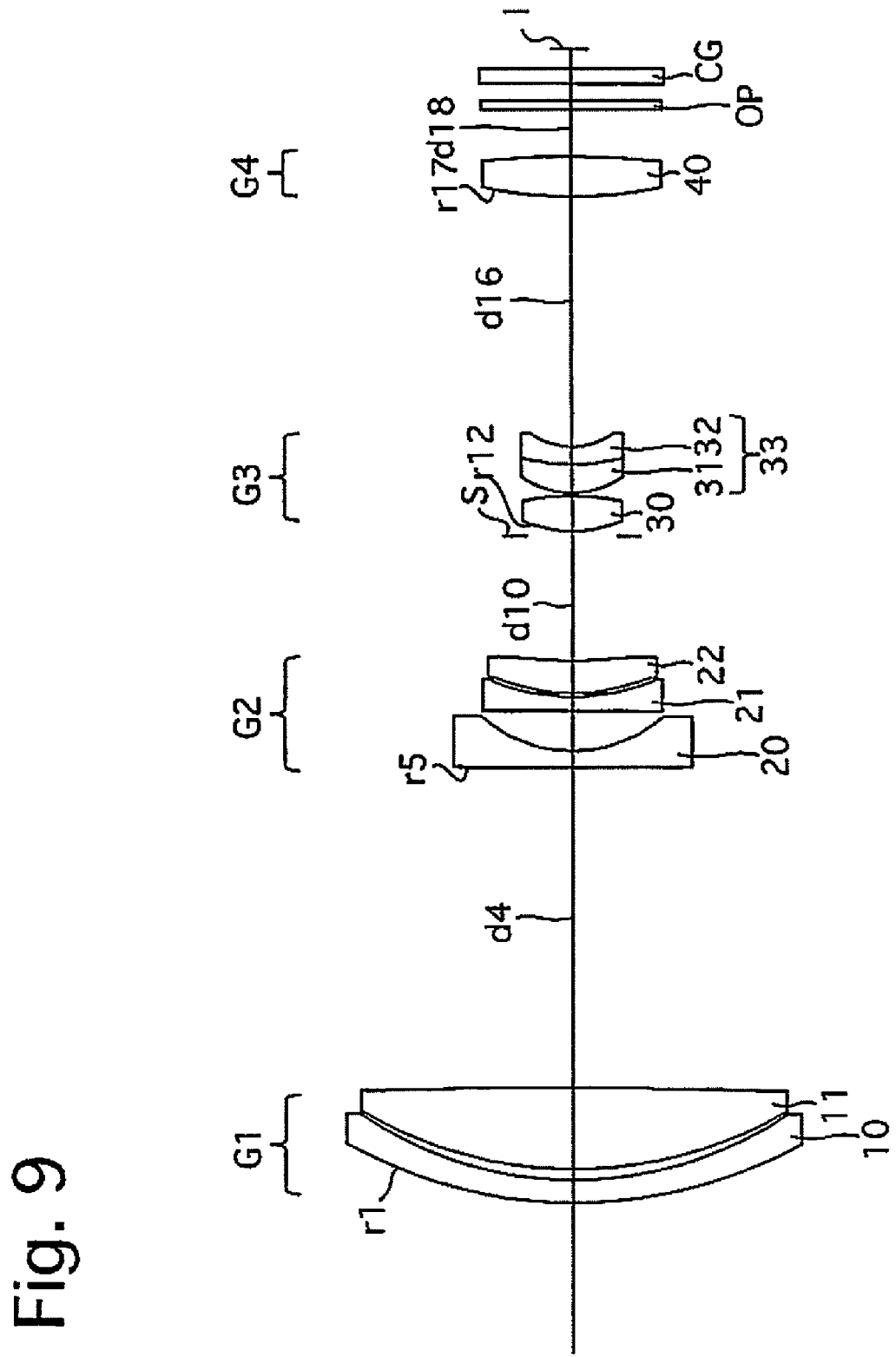
FIG. 9 shows a lens arrangement of the second numerical embodiment of the high zoom-ratio zoom lens system at an intermediate focal length when focused on an object at infinity.
Figure 10:
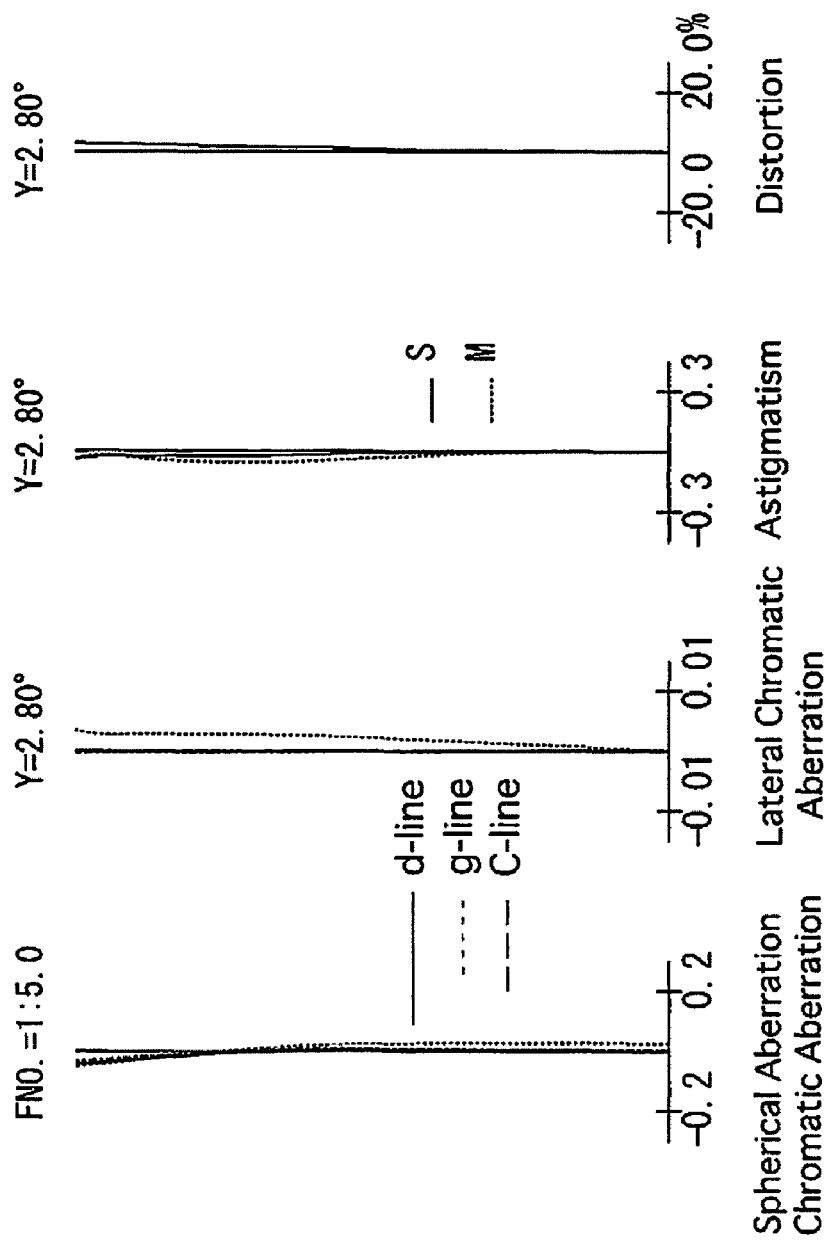
FIGS. 10A, 10B, 10C and 10D show various aberrations that occurred in the lens arrangement shown in FIG. 9.
Figure 11:
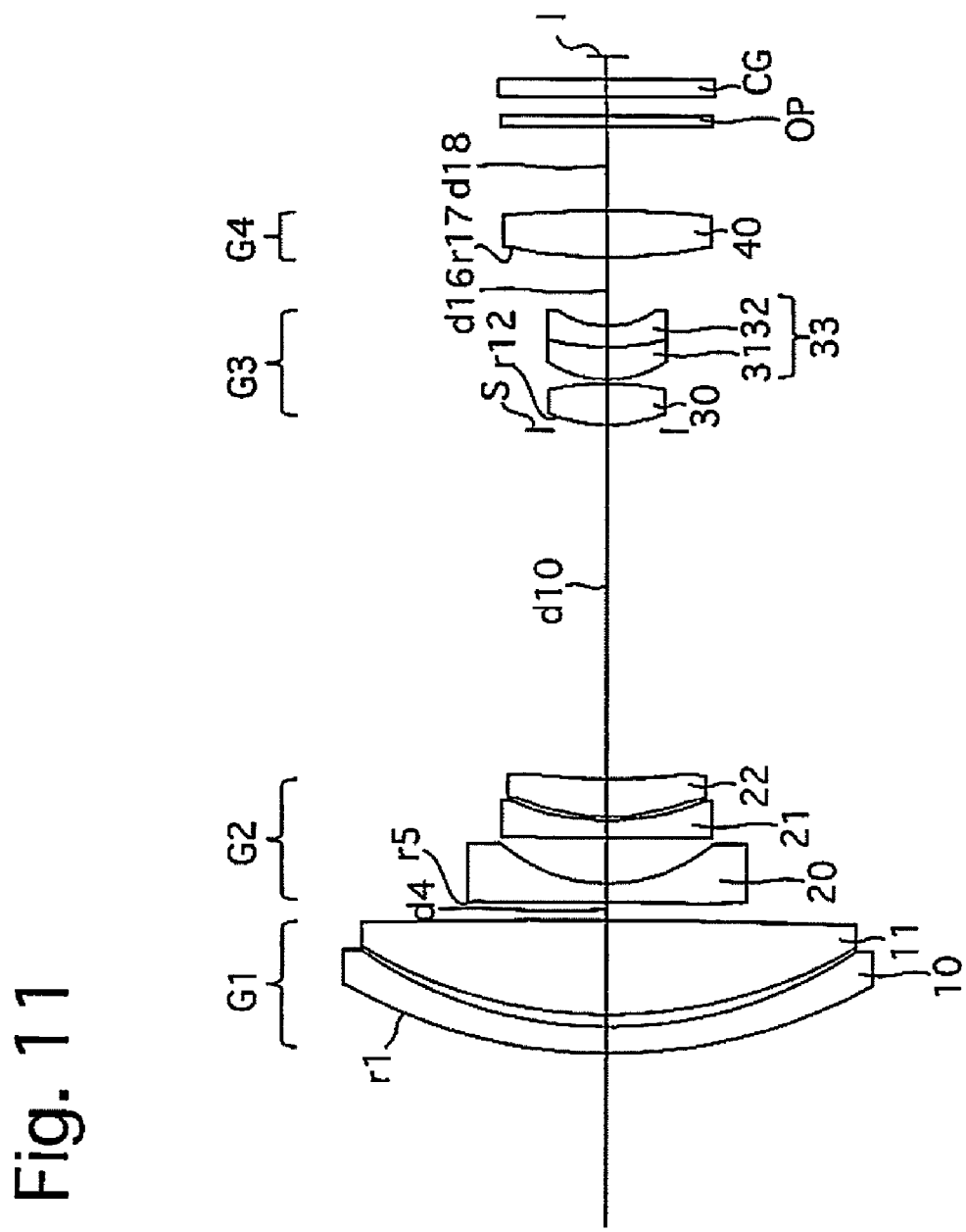
FIG. 11 shows a lens arrangement of the second numerical embodiment of the high zoom-ratio zoom lens system at the short focal length extremity when focused on an object at infinity.
Figure 12:
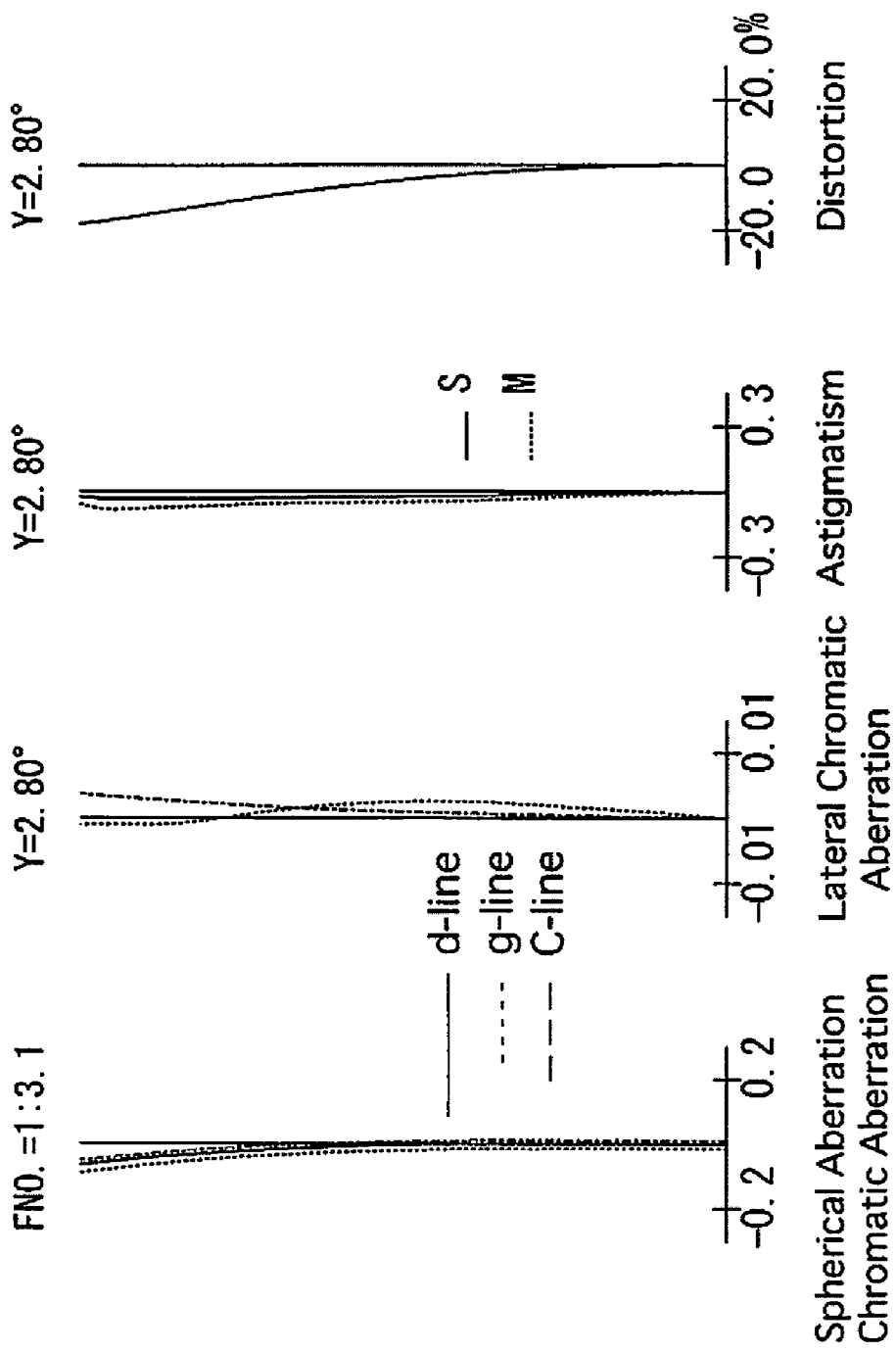
FIGS. 12A, 12B, 12C and 12D show various aberrations that occurred in the lens arrangement shown in FIG. 11.

FIGS. 7 through 12D and Tables 5 through 8 show the second numerical embodiment of the high zoom-ratio zoom lens system according to the present invention. FIG. 7 shows a lens arrangement of the second numerical embodiment of the high zoom-ratio zoom lens system, according to the present invention, at the long focal length extremity when focused on an object at infinity. FIGS. 8A, 8B, 8C and 8D show various aberrations that occurred in the lens arrangement shown in FIG. 7. FIG. 9 shows a lens arrangement of the second numerical embodiment of the high zoom-ratio zoom lens system at an intermediate focal length when focused on an object at infinity. FIGS. 10A, 10B, 10C and 10D show various aberrations that occurred in the lens arrangement shown in FIG. 9. FIG. 11 shows a lens arrangement of the second numerical embodiment of the high zoom-ratio zoom lens system at the short focal length extremity when focused on an object at infinity. FIGS. 12A, 12B, 12C and 12D show various aberrations that occurred in the lens arrangement shown in FIG. 11. Table 5 shows the lens surface data, Table 6 shows various zoom lens system data, Table 7 shows the aspherical surface data, and Table 8 shows the lens group data.

The lens arrangement of the second numerical embodiment is the same as that of the first numerical embodiment except for the negative lens element 20 of the second lens group G2 being a negative meniscus lens element having a convex surface on the object side.

TABLE 5

LENS SURFACE DATA

| Surf. No. | r | d | N(d) | vd |
|---|---|---|---|---|
| 1 | 15.901 | 0.750 | 1.92286 | 20.9 |
| 2 | 12.867 | 0.361 | | |
| 3 | 14.232 | 2.728 | 1.59282 | 68.6 |
| 4 | −311.365 | d4 | | |
| 5 | 430.453 | 0.550 | 1.88300 | 40.8 |
| 6 | 4.710 | 1.333 | | |
| 7 | 270.476 | 0.500 | 1.77250 | 49.6 |
| 8 | 7.306 | 0.100 | | |
| 9* | 5.818 | 1.087 | 2.00272 | 19.3 |

TABLE 5-continued

LENS SURFACE DATA

| Surf. No. | r | d | N(d) | vd |
|---|---|---|---|---|
| 10* | 13.828 | d10 | | |
| 11 (Diaphragm) | ∞ | 0.150 | | |
| 12* | 4.197 | 1.191 | 1.49700 | 81.6 |
| 13* | −7.468 | 0.100 | | |
| 14 | 2.985 | 0.960 | 1.48749 | 70.4 |
| 15 | 7.070 | 0.587 | 1.90366 | 31.3 |
| 16 | 2.391 | d16 | | |
| 17* | 18.000 | 1.330 | 1.54358 | 55.7 |
| 18* | −24.256 | d18 | | |
| 19 | ∞ | 0.300 | 1.51680 | 64.2 |
| 20 | ∞ | 0.560 | | |
| 21 | ∞ | 0.500 | 1.51680 | 64.2 |
| 22 | ∞ | — | | |

The asterisk (*) designates an aspherical surface which is rotationally symmetrical with respect to the optical axis.

TABLE 6

ZOOM LENS SYSTEM DATA

Zoom Ratio 12.00

| | Short Focal Length Extremity | Intermediate Focal Length | Long Focal Length Extremity |
|---|---|---|---|
| FNO. | 3.1 | 5.0 | 7.4 |
| f | 3.74 | 14.21 | 44.84 |
| W | 42.4 | 10.9 | 3.5 |
| Y | 2.80 | 2.80 | 2.80 |
| fB | 0.59 | 0.59 | 0.59 |
| L | 28.65 | 38.54 | 48.50 |
| d4 | 0.500 | 10.704 | 17.034 |
| d10 | 10.046 | 4.190 | 0.526 |
| d16 | 2.000 | 8.395 | 15.262 |
| d18 | 2.425 | 1.572 | 2.000 |

TABLE 7

ASPHERICAL SURFACE DATA (aspherical surface coefficients not indicated are zero (0.00)):

| Surf. No. | K | A4 | A6 | A8 | A10 |
|---|---|---|---|---|---|
| 9 | 0.000 | $-0.1470 \times 10^{-2}$ | $-0.1167 \times 10^{-3}$ | $0.1338 \times 10^{-6}$ | $-0.9258 \times 10^{-6}$ |
| 10 | 0.000 | $-0.1511 \times 10^{-2}$ | $-0.5296 \times 10^{-4}$ | $-0.1013 \times 10^{-4}$ | |
| 12 | $-1.000$ | $-0.1005 \times 10^{-2}$ | $0.1015 \times 10^{-3}$ | $0.3102 \times 10^{-4}$ | |
| 13 | 0.000 | $0.6637 \times 10^{-3}$ | $0.8106 \times 10^{-4}$ | $0.3400 \times 10^{-4}$ | |
| 17 | 0.000 | $0.1173 \times 10^{-2}$ | $-0.9534 \times 10^{-4}$ | $0.7747 \times 10^{-5}$ | $-0.4776 \times 10^{-6}$ |
| 18 | 0.000 | $0.1473 \times 10^{-2}$ | $-0.1931 \times 10^{-3}$ | $0.1751 \times 10^{-4}$ | $-0.8394 \times 10^{-6}$ |

TABLE 8

LENS GROUP DATA

| Lens Group | $1^{st}$ Surf. | Focal Length |
|---|---|---|
| 1 | 1 | 32.67 |
| 2 | 5 | $-5.27$ |
| 3 | 12 | 6.69 |
| 4 | 17 | 19.22 |

Embodiment 3

Figure 13:
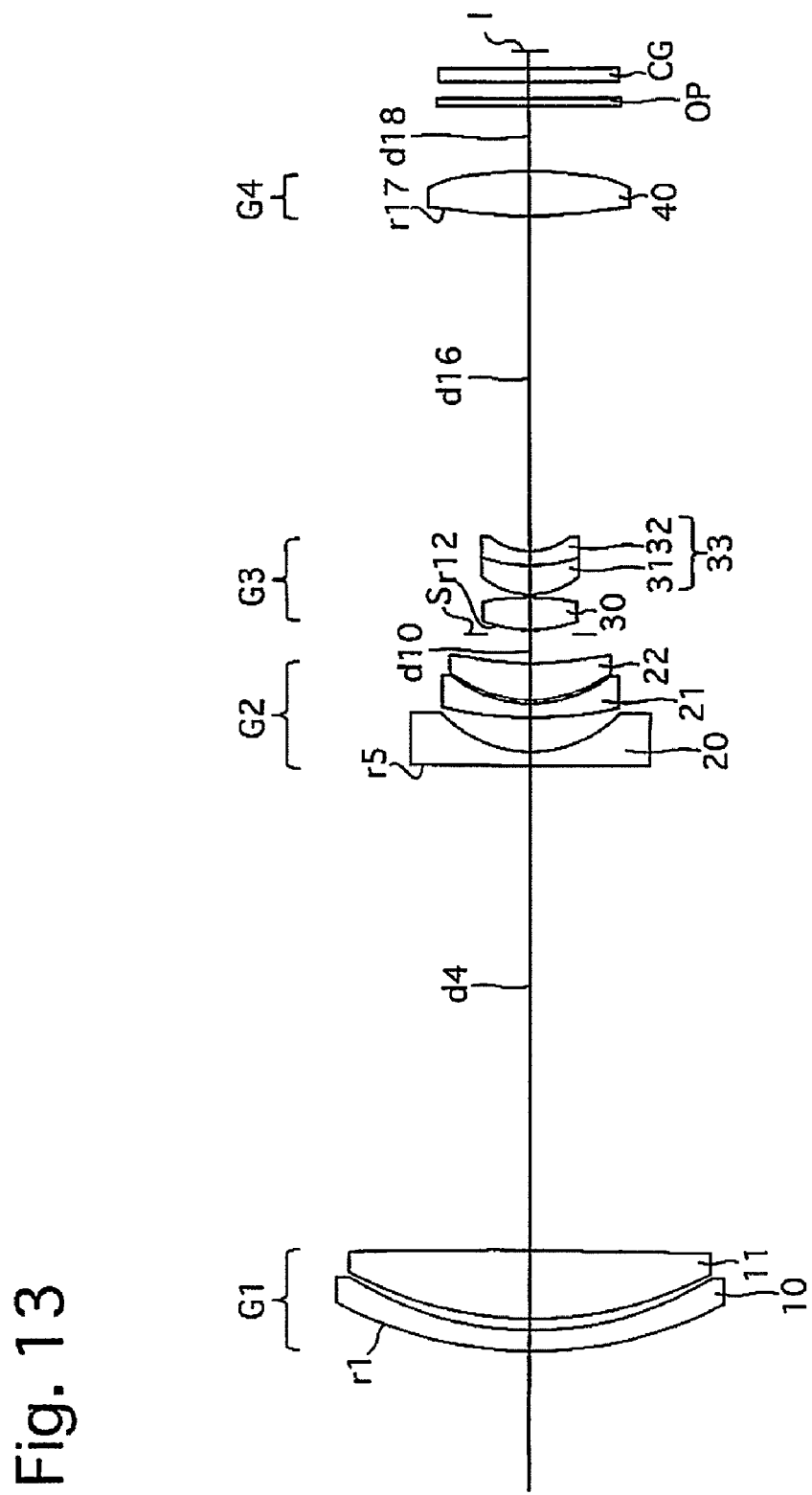
FIG. 13 shows a lens arrangement of a third numerical embodiment of the high zoom-ratio zoom lens system, according to the present invention, at the long focal length extremity when focused on an object at infinity.
Figure 14:
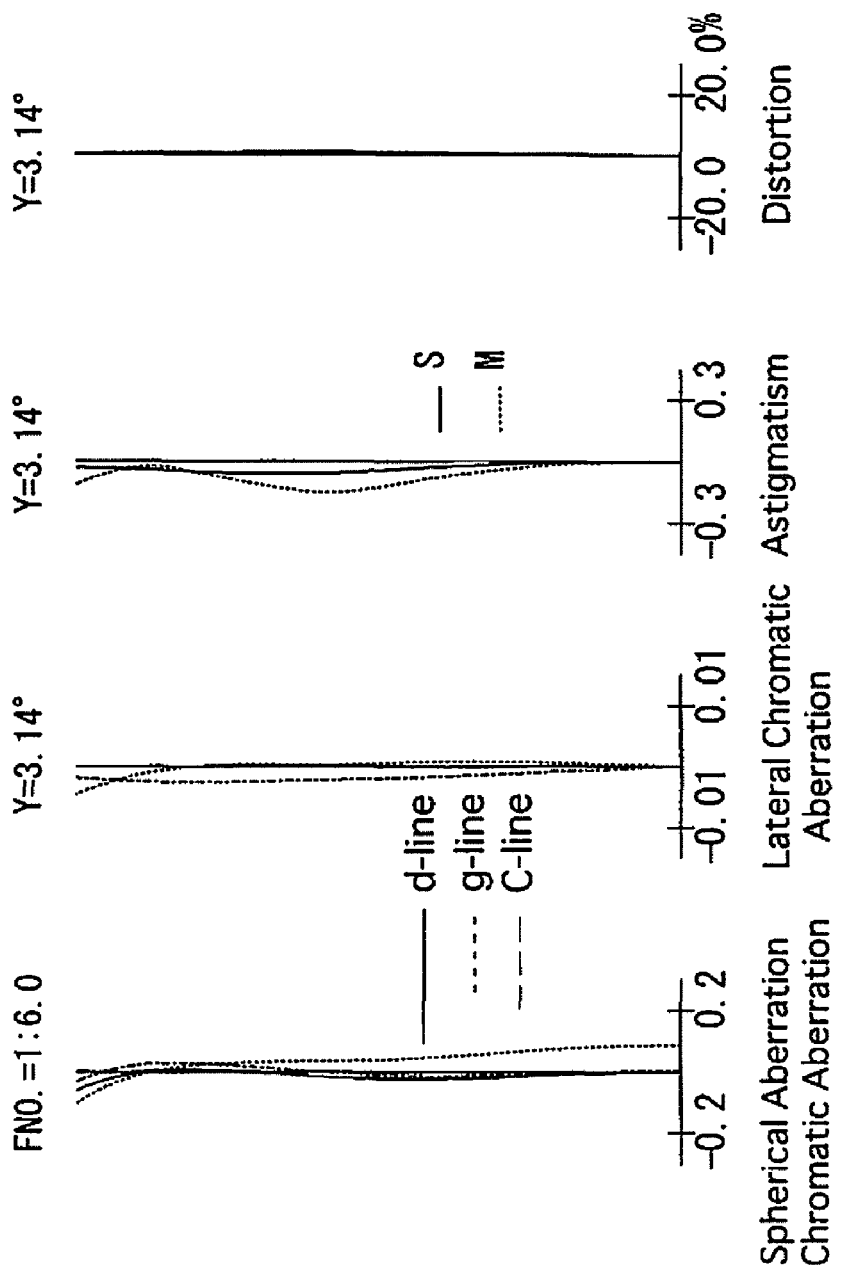
FIGS. 14A, 14B, 14C and 14D show various aberrations that occurred in the lens arrangement shown in FIG. 13.
Figure 15:
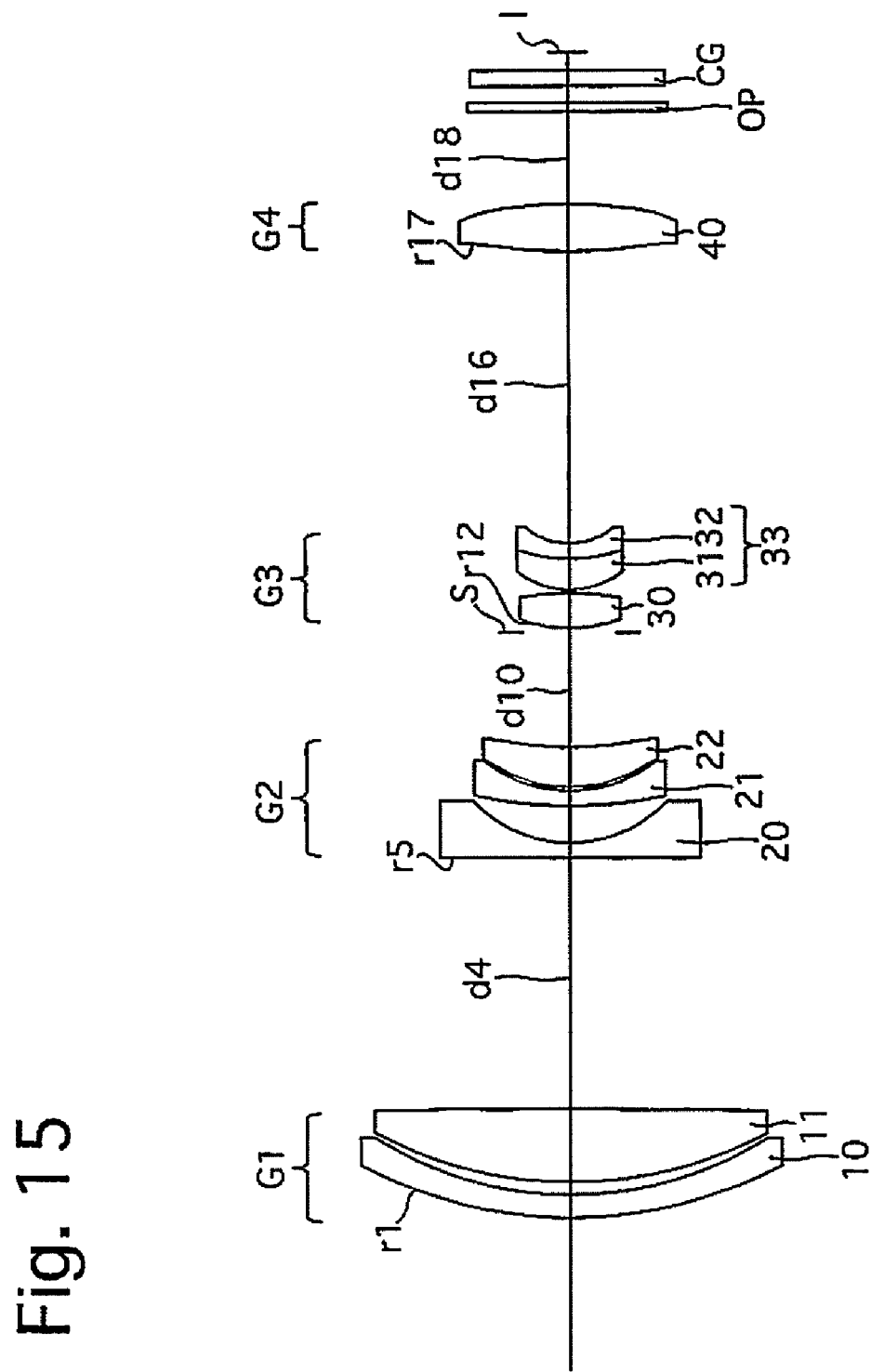
FIG. 15 shows a lens arrangement of the third numerical embodiment of the high zoom-ratio zoom lens system at an intermediate focal length when focused on an object at infinity.
Figure 16:
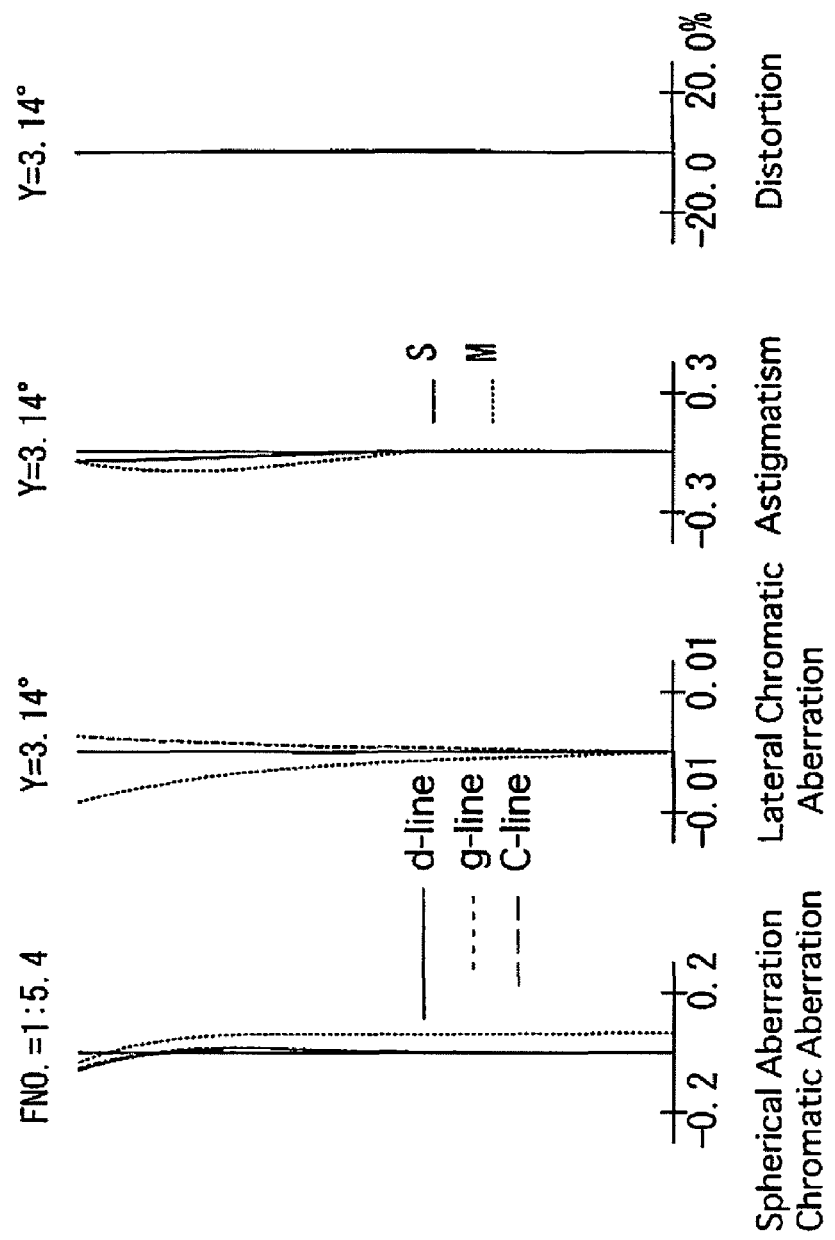
FIGS. 16A, 16B, 16C and 16D show various aberrations that occurred in the lens arrangement shown in FIG. 15.
Figure 17:
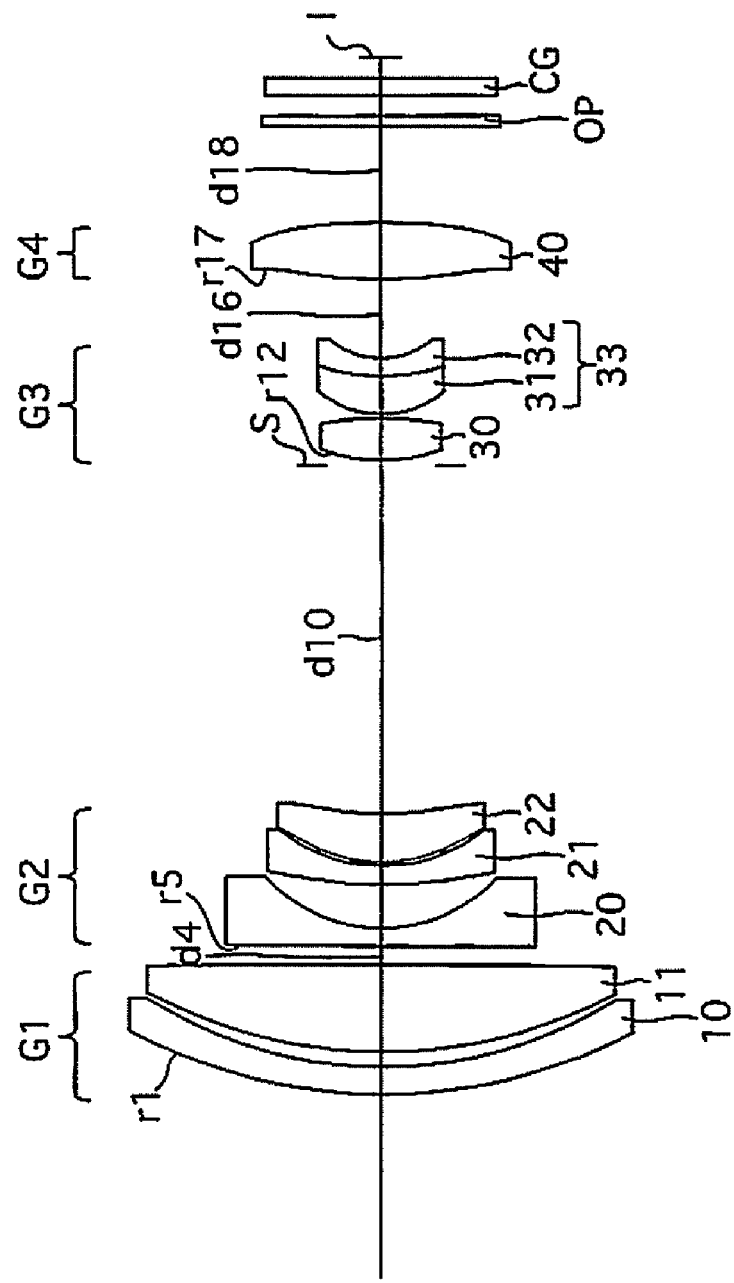
FIG. 17 shows a lens arrangement of the third numerical embodiment of the high zoom-ratio zoom lens system at the short focal length extremity when focused on an object at infinity.
Figure 18:
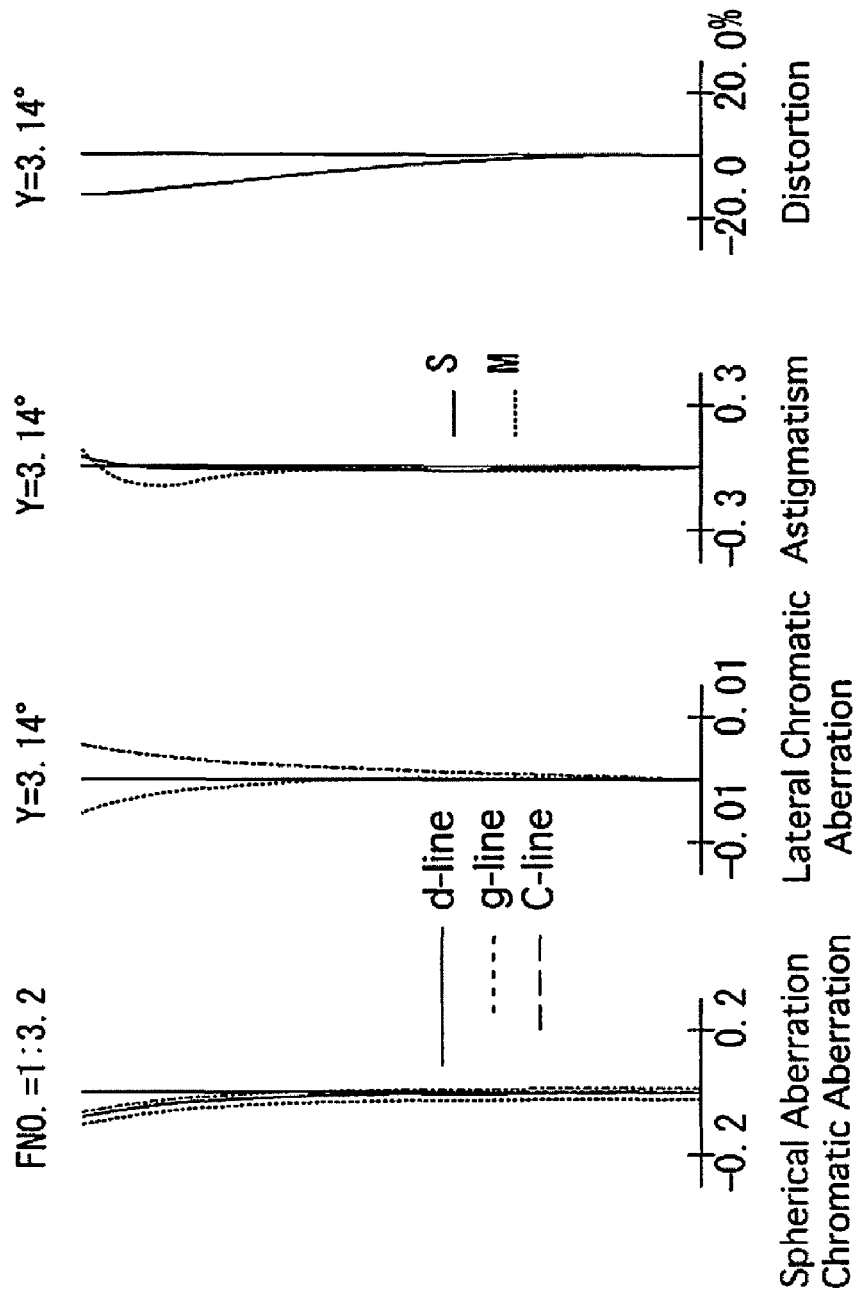
FIGS. 18A, 18B, 18C and 18D show various aberrations that occurred in the lens arrangement shown in FIG. 17.

FIGS. 13 through 18D and Tables 9 through 12 show a third numerical embodiment of the high zoom-ratio zoom lens system according to the present invention. FIG. 13 shows a lens arrangement of the third numerical embodiment of the high zoom-ratio zoom lens system, according to the present invention, at the long focal length extremity when focused on an object at infinity. FIGS. 14A, 14B, 14C and 14D show various aberrations that occurred in the lens arrangement shown in FIG. 13. FIG. 15 shows a lens arrangement of the third numerical embodiment of the high zoom-ratio zoom lens system at an intermediate focal length when focused on an object at infinity. FIGS. 16A, 16B, 16C and 16D show various aberrations that occurred in the lens arrangement shown in FIG. 15. FIG. 17 shows a lens arrangement of the third numerical embodiment of the high zoom-ratio zoom lens system at the short focal length extremity when focused on an object at infinity. FIGS. 18A, 18B, 18C and 18D show various aberrations that occurred in the lens arrangement shown in FIG. 17. Table 9 shows the lens surface data, Table 10 shows various zoom lens system data, Table 11 shows the aspherical surface data, and Table 12 shows the lens group data.

The lens arrangement of the third numerical embodiment is the same as that of the first numerical embodiment except for the negative lens element 20 of the second lens group G2 being a planoconcave negative lens element having a concave surface on the image side.

TABLE 9

LENS SURFACE DATA

| Surf. No. | r | d | N(d) | vd |
|---|---|---|---|---|
| 1 | 15.184 | 0.750 | 1.92286 | 20.9 |
| 2 | 12.402 | 0.418 | | |
| 3 | 14.142 | 2.407 | 1.59282 | 68.6 |
| 4 | $-256.686$ | d4 | | |
| 5 | ∞ | 0.500 | 1.80420 | 46.5 |
| 6 | 4.448 | 1.217 | | |
| 7 | 14.565 | 0.500 | 1.72916 | 54.7 |
| 8 | 4.660 | 0.100 | | |
| 9* | 4.316 | 1.328 | 1.82115 | 24.1 |
| 10* | 9.493 | d10 | | |
| 11 (Diaphragm) | ∞ | 0.150 | | |
| 12* | 4.723 | 1.164 | 1.49700 | 81.6 |
| 13* | $-8.136$ | 0.100 | | |
| 14 | 2.734 | 1.041 | 1.48749 | 70.4 |
| 15 | 5.493 | 0.500 | 1.90366 | 31.3 |
| 16 | 2.261 | d16 | | |
| 17* | 18.000 | 1.561 | 1.54358 | 55.7 |
| 18* | $-14.509$ | d18 | | |
| 19 | ∞ | 0.300 | 1.51680 | 64.2 |
| 20 | ∞ | 0.560 | | |
| 21 | ∞ | 0.500 | 1.51680 | 64.2 |
| 22 | ∞ | — | | |

The asterisk (*) designates an aspherical surface which is rotationally symmetrical with respect to the optical axis.

TABLE 10

ZOOM LENS SYSTEM DATA

Zoom Ratio 9.60

| | Short Focal Length Extremity | Intermediate Focal Length | Long Focal Length Extremity |
|---|---|---|---|
| FNO. | 3.2 | 5.4 | 6.0 |
| f | 4.00 | 14.20 | 38.40 |
| W | 42.0 | 12.5 | 4.7 |
| Y | 3.14 | 3.14 | 3.14 |
| fB | 0.59 | 0.59 | 0.59 |
| L | 28.59 | 38.34 | 46.30 |
| d4 | 0.500 | 8.269 | 17.328 |
| d10 | 9.585 | 3.785 | 1.050 |
| d16 | 2.205 | 9.608 | 11.936 |
| d18 | 2.614 | 2.997 | 2.300 |

TABLE 11

ASPHERICAL SURFACE DATA (aspherical surface coefficients not indicated are zero (0.00)):

| Surf. No. | K | A4 | A6 | A8 | A10 |
|---|---|---|---|---|---|
| 9 | 0.000 | $-0.1061 \times 10^{-2}$ | $-0.1085 \times 10^{-3}$ | $0.8721 \times 10^{-5}$ | $-0.1398 \times 10^{-5}$ |
| 10 | 0.000 | $-0.1595 \times 10^{-2}$ | $0.3691 \times 10^{-4}$ | $-0.1425 \times 10^{-4}$ | |
| 12 | -1.000 | $-0.7460 \times 10^{-3}$ | $-0.5929 \times 10^{-4}$ | $0.6668 \times 10^{-4}$ | |
| 13 | 0.000 | $0.6823 \times 10^{-3}$ | $-0.4934 \times 10^{-4}$ | $0.6107 \times 10^{-4}$ | |
| 17 | 0.000 | $0.7206 \times 10^{-3}$ | $0.9302 \times 10^{-5}$ | $-0.1479 \times 10^{-4}$ | $0.5324 \times 10^{-6}$ |
| 18 | 0.000 | $0.1046 \times 10^{-2}$ | $-0.8290 \times 10^{-4}$ | $-0.8479 \times 10^{-5}$ | $0.3582 \times 10^{-6}$ |

TABLE 12

LENS GROUP DATA

| Lens Group | 1st Surf. | Focal Length |
|---|---|---|
| 1 | 1 | 31.82 |
| 2 | 5 | -5.35 |
| 3 | 12 | 7.03 |
| 4 | 17 | 15.03 |

Embodiment 4

Figure 19:
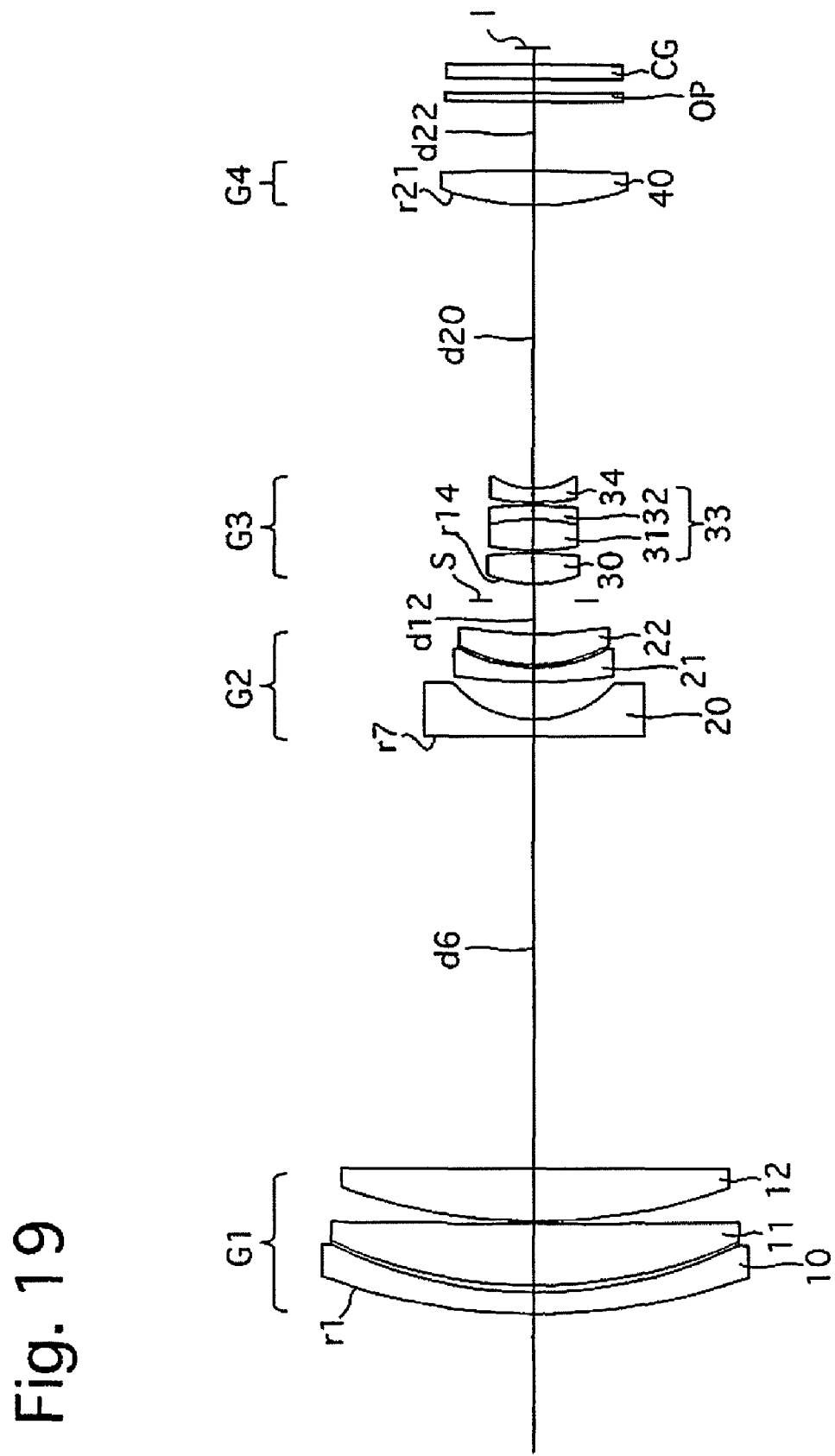
FIG. 19 shows a lens arrangement of a fourth numerical embodiment of the high zoom-ratio zoom lens system, according to the present invention, at the long focal length extremity when focused on an object at infinity.
Figure 20:
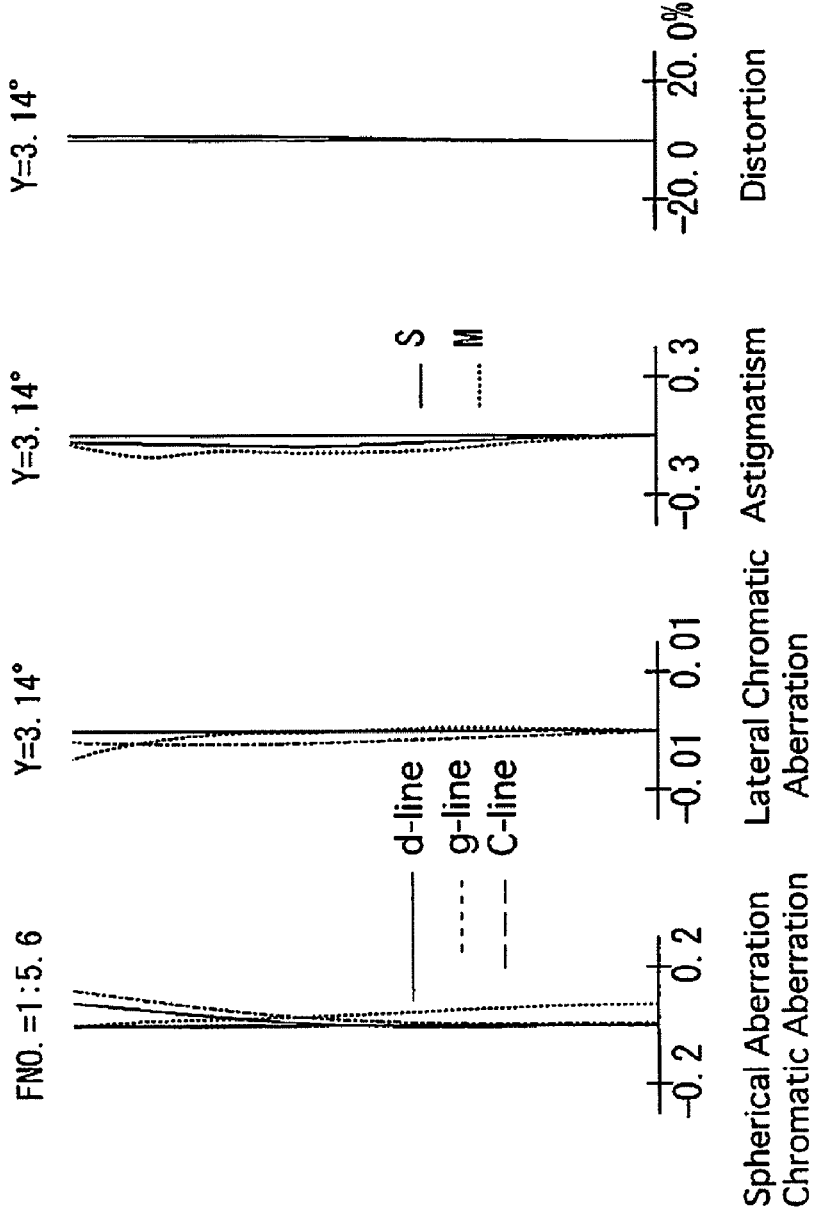
FIGS. 20A, 20B, 20C and 20D show various aberrations that occurred in the lens arrangement shown in FIG. 19.
Figure 21:
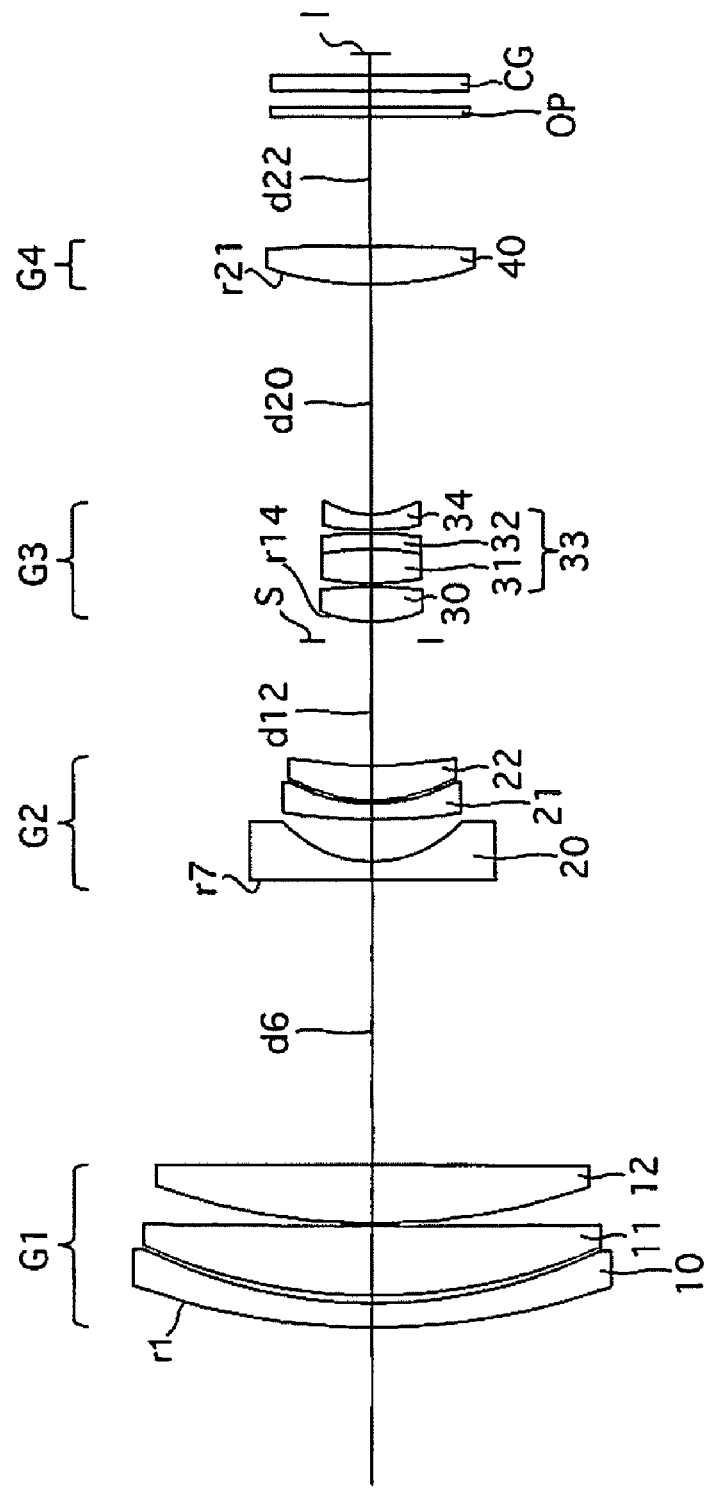
FIG. 21 shows a lens arrangement of the fourth numerical embodiment of the high zoom-ratio zoom lens system at an intermediate focal length when focused on an object at infinity.
Figure 22:
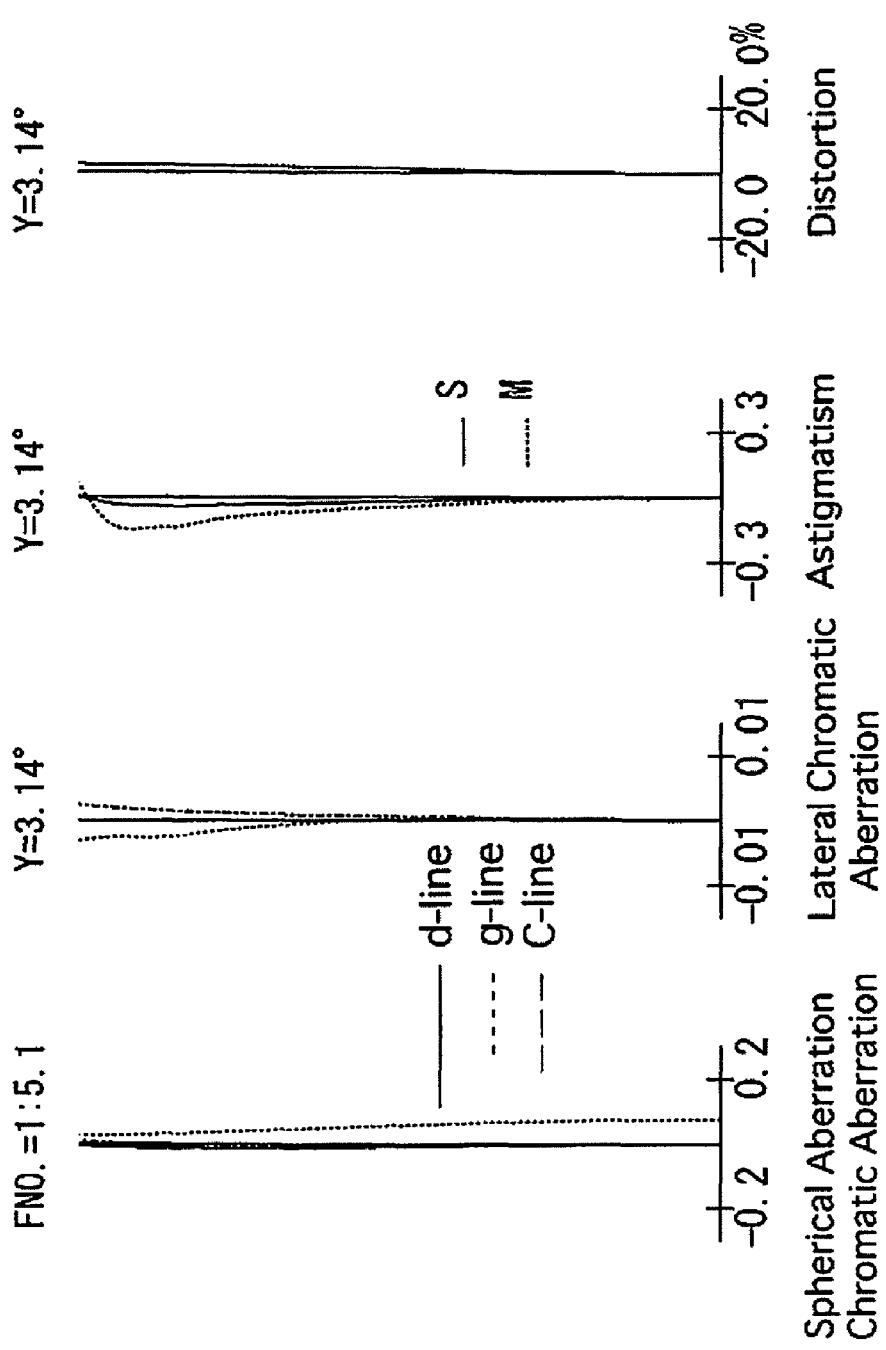
FIGS. 22A, 22B, 22C and 22D show various aberrations that occurred in the lens arrangement shown in FIG. 21.
Figure 23:
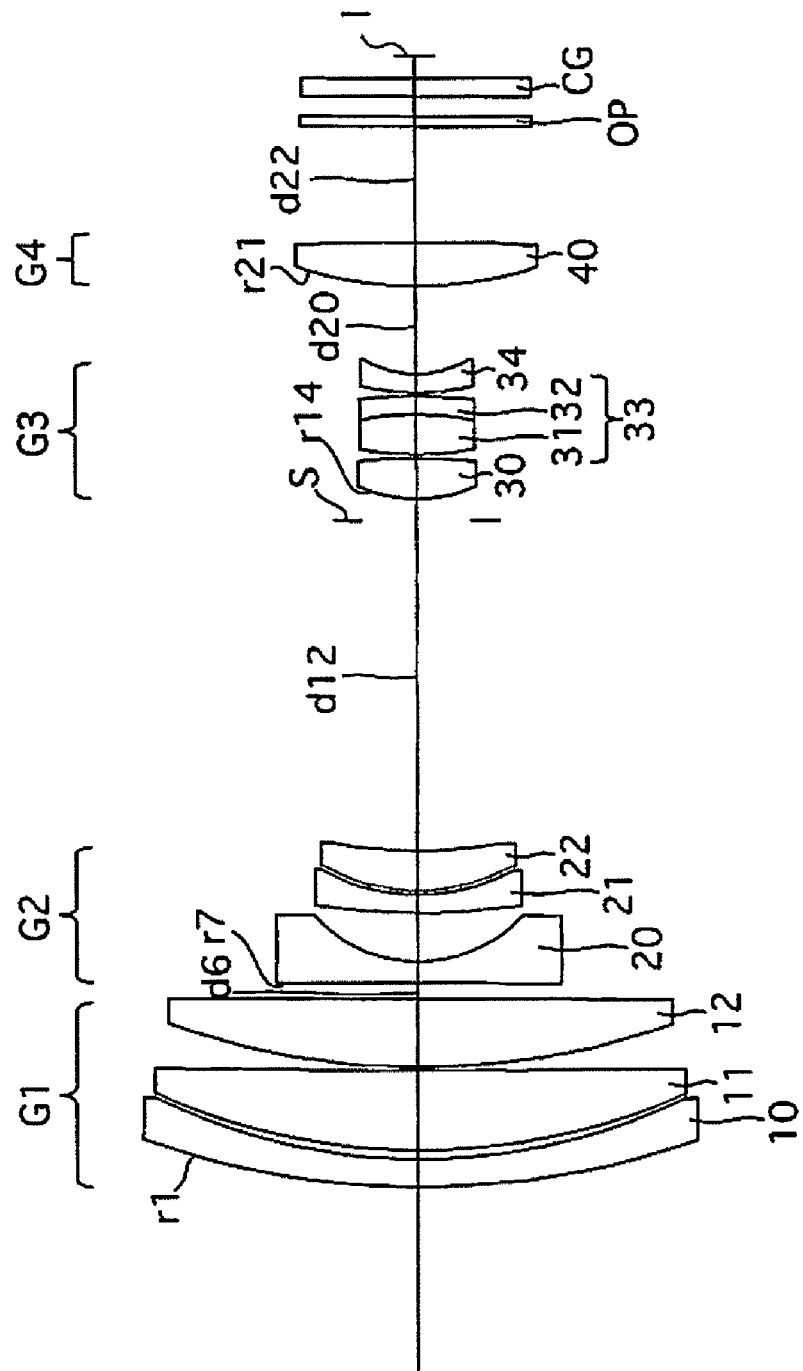
FIG. 23 shows a lens arrangement of the fourth numerical embodiment of the high zoom-ratio zoom lens system at the short focal length extremity when focused on an object at infinity.
Figure 24:
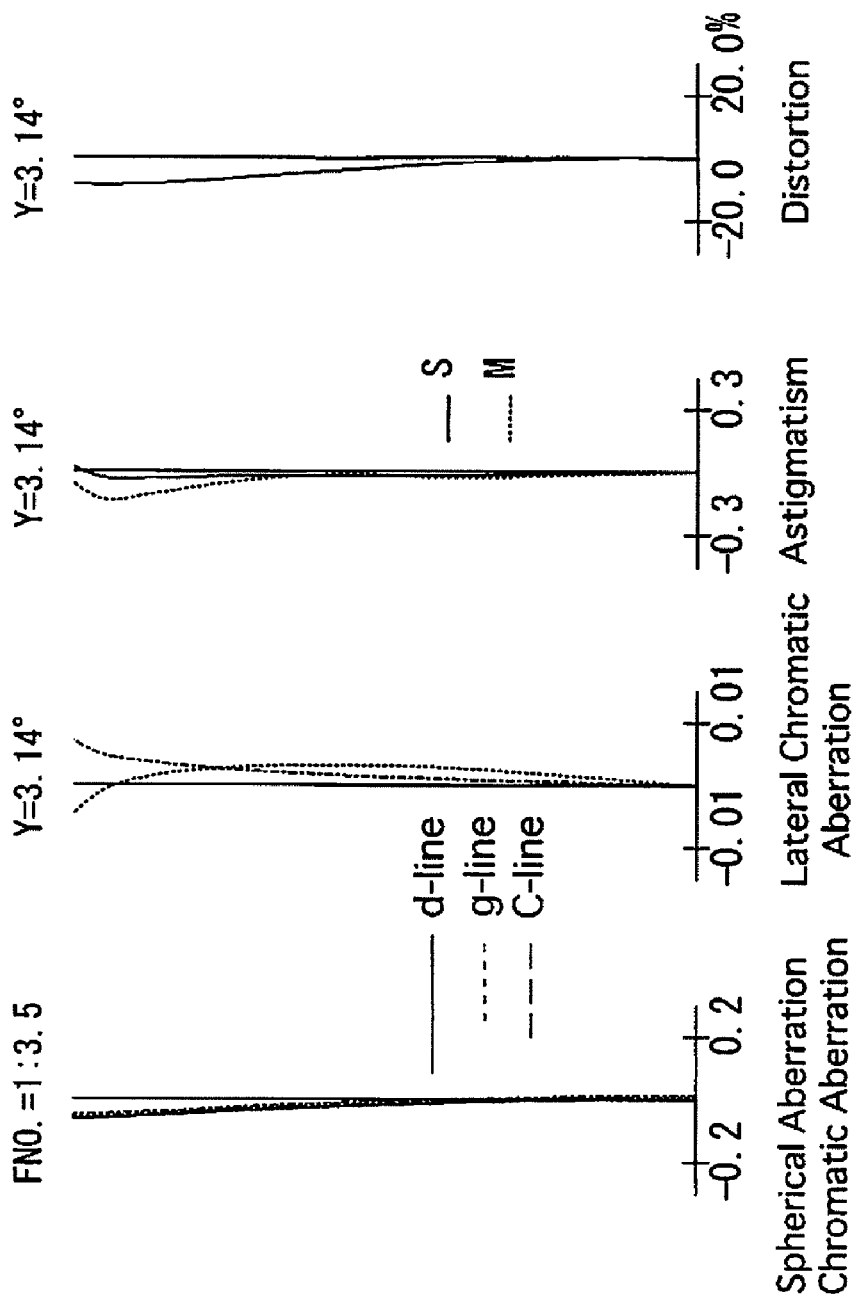
FIGS. 24A, 24B, 24C and 24D show various aberrations that occurred in the lens arrangement shown in FIG. 23.

FIGS. 19 through 24D and Tables 13 through 16 show a fourth numerical embodiment of the high zoom-ratio zoom lens system according to the present invention. FIG. 19 shows a lens arrangement of the fourth numerical embodiment of the high zoom-ratio zoom lens system, according to the present invention, at the long focal length extremity when focused on an object at infinity. FIGS. 20A, 20B, 20C and 20D show various aberrations that occurred in the lens arrangement shown in FIG. 19. FIG. 21 shows a lens arrangement of the fourth numerical embodiment of the high zoom-ratio zoom lens system at an intermediate focal length when focused on an object at infinity. FIGS. 22A, 22B, 22C and 22D show various aberrations that occurred in the lens arrangement shown in FIG. 21. FIG. 23 shows a lens arrangement of the fourth numerical embodiment of the high zoom-ratio zoom lens system at the short focal length extremity when focused on an object at infinity. FIGS. 24A, 24B, 24C and 24D show various aberrations that occurred in the lens arrangement shown in FIG. 23. Table 13 shows the lens surface data, Table 14 shows various zoom lens system data, Table 15 shows the aspherical surface data, and Table 16 shows the lens group data.

The lens arrangement of the fourth numerical embodiment differs from the first numerical embodiment in regard to the first lens group G1 being configured of a negative lens element (10), a positive lens element (11) and a positive lens element (12), in that order from the object side, and the third lens group G3 being configured of a positive lens element (30), a positive lens element (31), a negative lens element (32) and a negative lens element (34), in that order from the object side.

The first lens group G1 (surface Nos. 1 through 6) is configured of a negative meniscus lens element 10 having a convex surface on the object side, a positive meniscus lens element 11 having a convex surface on the object side, and a planoconvex positive lens element 12 having a convex surface on the object side, in that order from the object side.

The second lens group G2 (surface Nos. 7 through 12) is configured of a planoconcave negative lens element 20 having a concave surface on the image side, a negative meniscus lens element 21 having a convex surface on the object side, and a positive meniscus lens element 22 having a convex surface on the object side, in that order from the object side. The positive meniscus lens element 22 has an aspherical surface formed on each side thereof.

The third lens group G3 (surface Nos. 14 through 20) is configured of a biconvex positive lens element 30, a cemented lens 33 that is formed from a biconvex positive lens element 31 and a negative meniscus lens element 32 having a convex surface on the image side, and a negative meniscus lens element 34 having a convex surface on the object side, in that order from the object side. The biconvex positive lens element 30 has an aspherical surface formed on each side thereof. A diaphragm S (surface No. 13) which is provided between the second lens group G2 and the third lens group G3 moves integrally with the third lens group G3 during zooming.

The fourth lens group G4 (surface Nos. 21 and 22) is configured of a single biconvex positive lens element 40. The biconvex positive lens element 40 has an aspherical surface on each side thereof. The aspherical convex surface on the object side of the positive lens element 40 is formed so as to have an increasingly greater radius of curvature, compared to the paraxial convex spherical surface, at an increasing distance away from the optical axis and toward the periphery of the positive lens element 40. An optical filter OP (surface Nos. 23 and 24) and a cover glass CG (surface Nos. 25 and 26) are provided behind the fourth lens group G4 (biconvex positive lens element 40), i.e., between the fourth lens group G4 and the imaging plane I.

TABLE 13

LENS SURFACE DATA

| Surf. No. | r | d | N(d) | vd |
|---|---|---|---|---|
| 1 | 23.156 | 0.750 | 2.00069 | 25.5 |
| 2 | 16.621 | 0.259 | | |
| 3 | 18.132 | 2.187 | 1.49700 | 81.6 |
| 4 | 459.802 | 0.080 | | |
| 5 | 20.880 | 1.884 | 1.59282 | 68.6 |
| 6 | ∞ | d6 | | |
| 7 | ∞ | 0.600 | 1.88300 | 40.8 |
| 8 | 3.944 | 1.339 | | |
| 9 | 19.490 | 0.500 | 1.77250 | 49.6 |
| 10 | 5.523 | 0.100 | | |
| 11* | 5.011 | 1.100 | 2.00178 | 19.3 |
| 12* | 10.672 | d12 | | |
| 13 (Diaphragm) | ∞ | 0.600 | | |
| 14* | 4.072 | 1.100 | 1.58313 | 59.5 |
| 15* | -13.582 | 0.100 | | |
| 16 | 7.999 | 1.100 | 1.48749 | 70.4 |
| 17 | -7.999 | 0.500 | 1.84666 | 23.8 |
| 18 | -14.230 | 0.100 | | |
| 19 | 7.466 | 0.500 | 1.90366 | 31.3 |
| 20 | 2.771 | d20 | | |
| 21* | 12.391 | 1.200 | 1.54358 | 55.7 |
| 22* | -54.696 | d22 | | |

TABLE 13-continued

LENS SURFACE DATA

| Surf. No. | r | d | N(d) | vd |
|---|---|---|---|---|
| 23 | ∞ | 0.300 | 1.51680 | 64.2 |
| 24 | ∞ | 0.510 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 14

ZOOM LENS SYSTEM DATA
Zoom Ratio 9.59

| | Short Focal Length Extremity | Intermediate Focal Length | Long Focal Length Extremity |
|---|---|---|---|
| FNO. | 3.5 | 5.1 | 5.6 |
| f | 4.00 | 14.20 | 38.40 |
| W | 40.6 | 12.2 | 4.6 |
| Y | 3.14 | 3.14 | 3.14 |
| fB | 0.59 | 0.59 | 0.59 |
| L | 30.91 | 40.33 | 45.00 |
| d6 | 0.400 | 9.037 | 15.370 |
| d12 | 9.065 | 3.985 | 1.200 |
| d20 | 2.400 | 7.296 | 10.081 |
| d22 | 3.143 | 4.109 | 2.450 |

TABLE 15

ASPHERICAL SURFACE DATA (aspherical surface coefficients not indicated are zero (0.00)):

| Surf. No. | K | A4 | A6 | A8 | A10 |
|---|---|---|---|---|---|
| 11 | 0.000 | $-0.8745 \times 10^{-3}$ | $-0.6090 \times 10^{-4}$ | $-0.7531 \times 10^{-5}$ | $0.7326 \times 10^{-7}$ |
| 12 | 0.000 | $-0.1493 \times 10^{-2}$ | $0.1354 \times 10^{-4}$ | $-0.2200 \times 10^{-4}$ | $0.1100 \times 10^{-5}$ |
| 14 | -1.000 | $-0.4342 \times 10^{-3}$ | $0.2040 \times 10^{-3}$ | $0.2100 \times 10^{-4}$ | |
| 15 | 0.000 | $0.9551 \times 10^{-3}$ | $0.2490 \times 10^{-3}$ | $0.1412 \times 10^{-4}$ | |
| 21 | 0.000 | $0.2832 \times 10^{-2}$ | $-0.4894 \times 10^{-3}$ | $0.2688 \times 10^{-4}$ | |
| 22 | 0.000 | $0.2765 \times 10^{-2}$ | $-0.5004 \times 10^{-3}$ | $0.1778 \times 10^{-4}$ | $0.6207 \times 10^{-6}$ |

TABLE 16

LENS GROUP DATA

| Lens Group | 1st Surf. | Focal Length |
|---|---|---|
| 1 | 1 | 26.61 |
| 2 | 7 | -4.58 |
| 3 | 14 | 7.09 |
| 4 | 21 | 18.70 |

Embodiment 5

Figure 25:
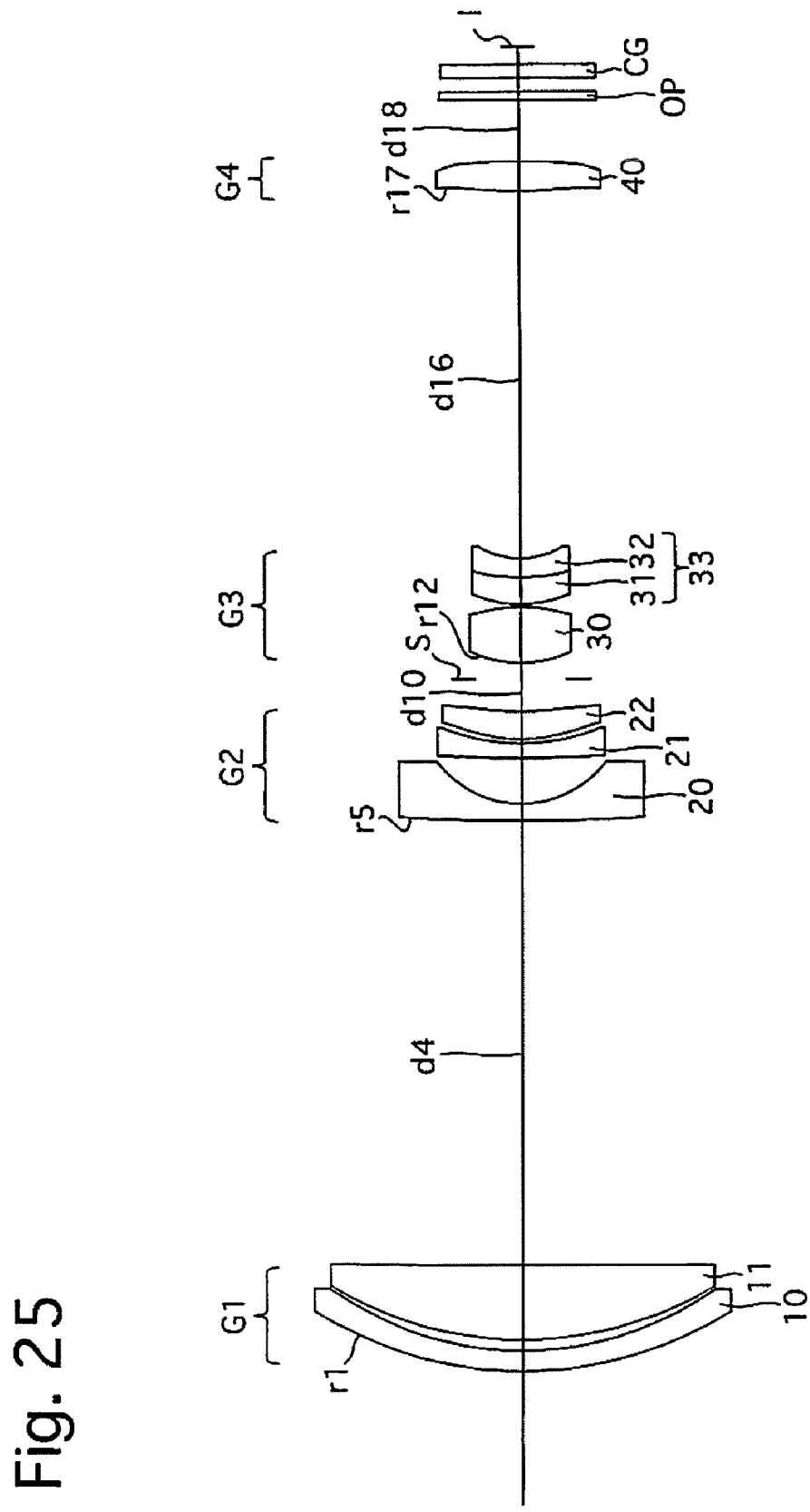
FIG. 25 shows a lens arrangement of a fifth numerical embodiment of the high zoom-ratio zoom lens system, according to the present invention, at the long focal length extremity when focused on an object at infinity.
Figure 26:
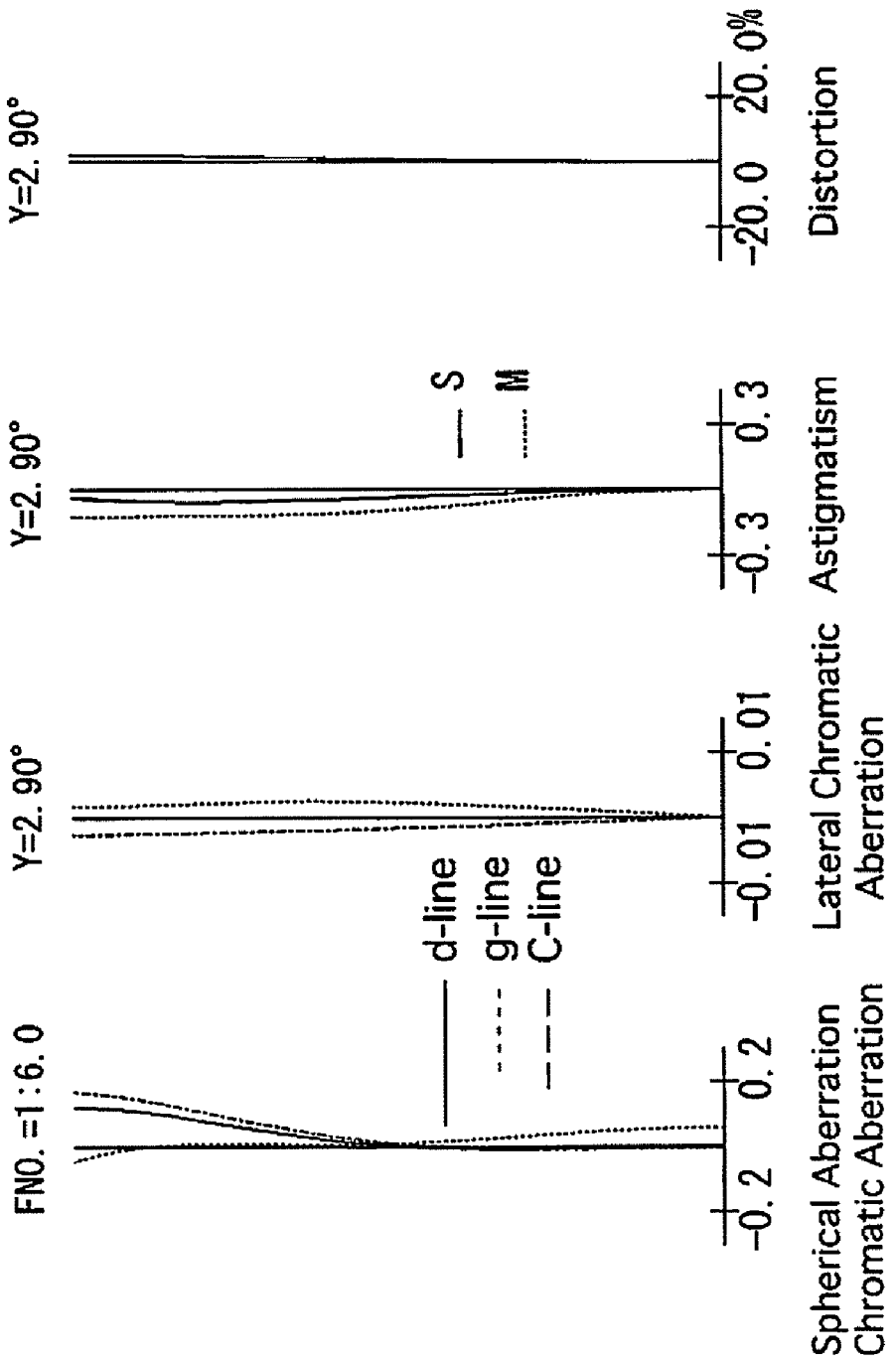
FIGS. 26A, 26B, 26C and 26D show various aberrations that occurred in the lens arrangement shown in FIG. 25.
Figure 27:
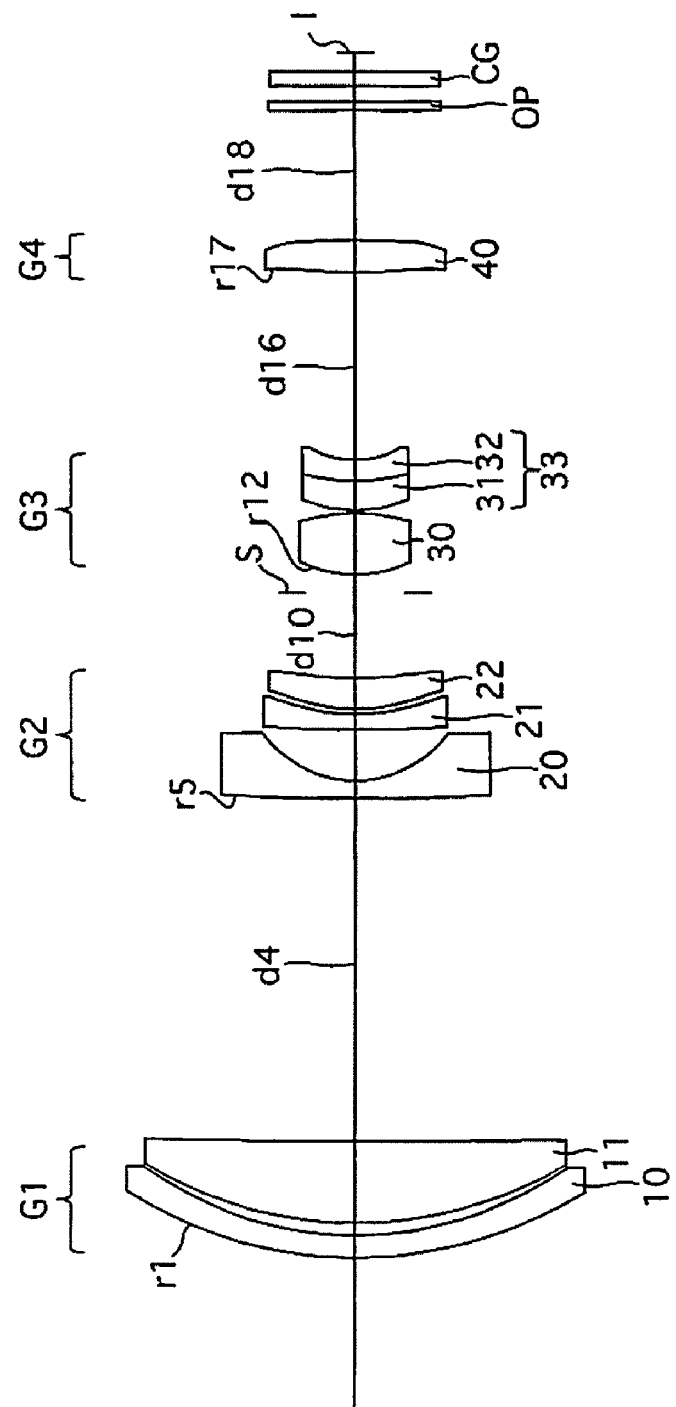
FIG. 27 shows a lens arrangement of the fifth numerical embodiment of the high zoom-ratio zoom lens system at an intermediate focal length when focused on an object at infinity.
Figure 28:
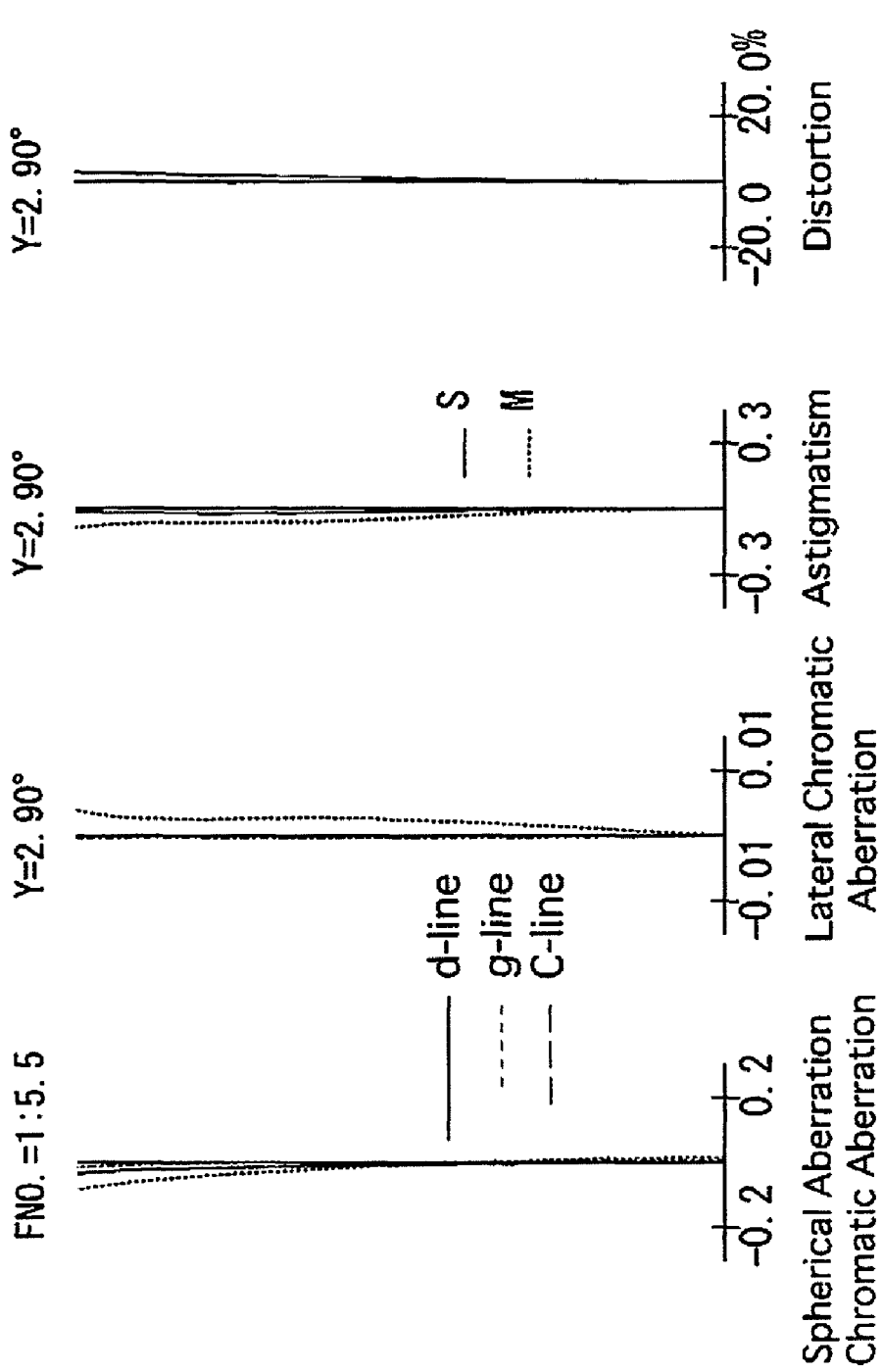
FIGS. 28A, 28B, 28C and 28D show various aberrations that occurred in the lens arrangement shown in FIG. 27.
Figure 29:
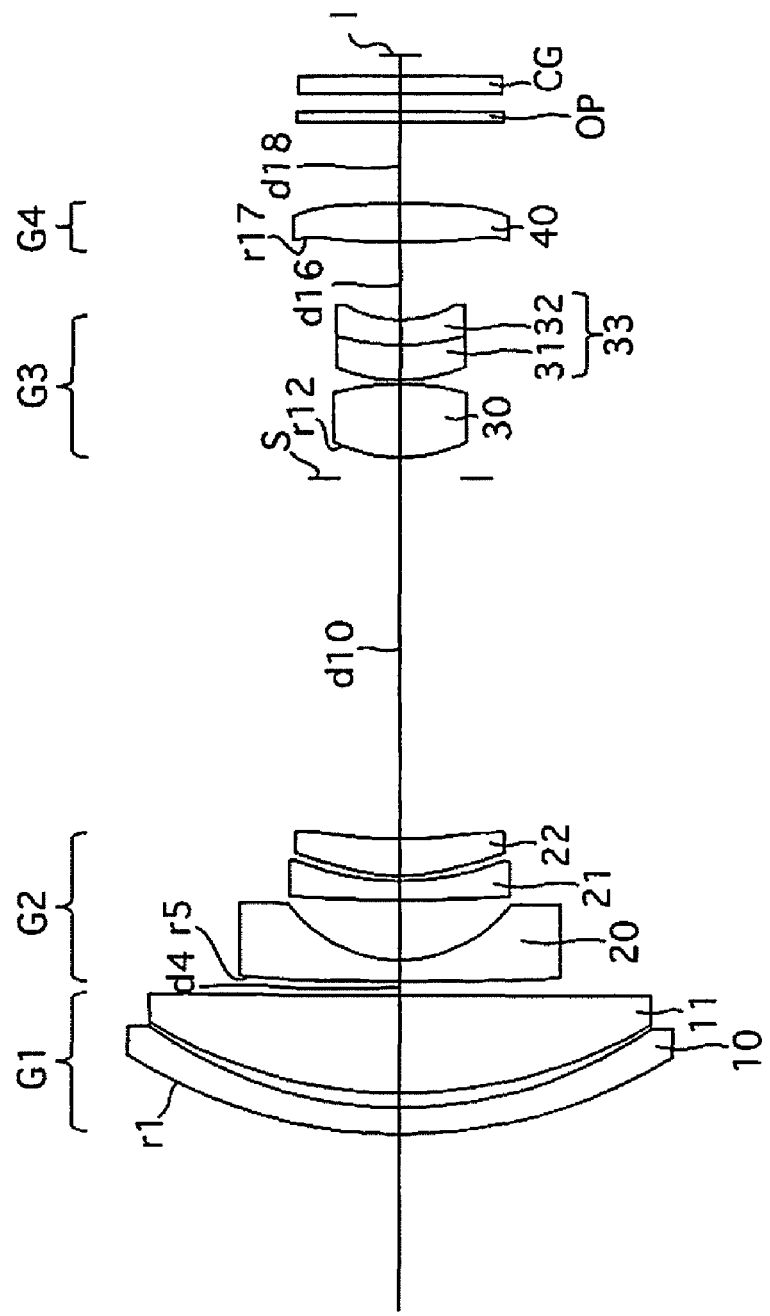
FIG. 29 shows a lens arrangement of the fifth numerical embodiment of the high zoom-ratio zoom lens system at the short focal length extremity when focused on an object at infinity.
Figure 30:
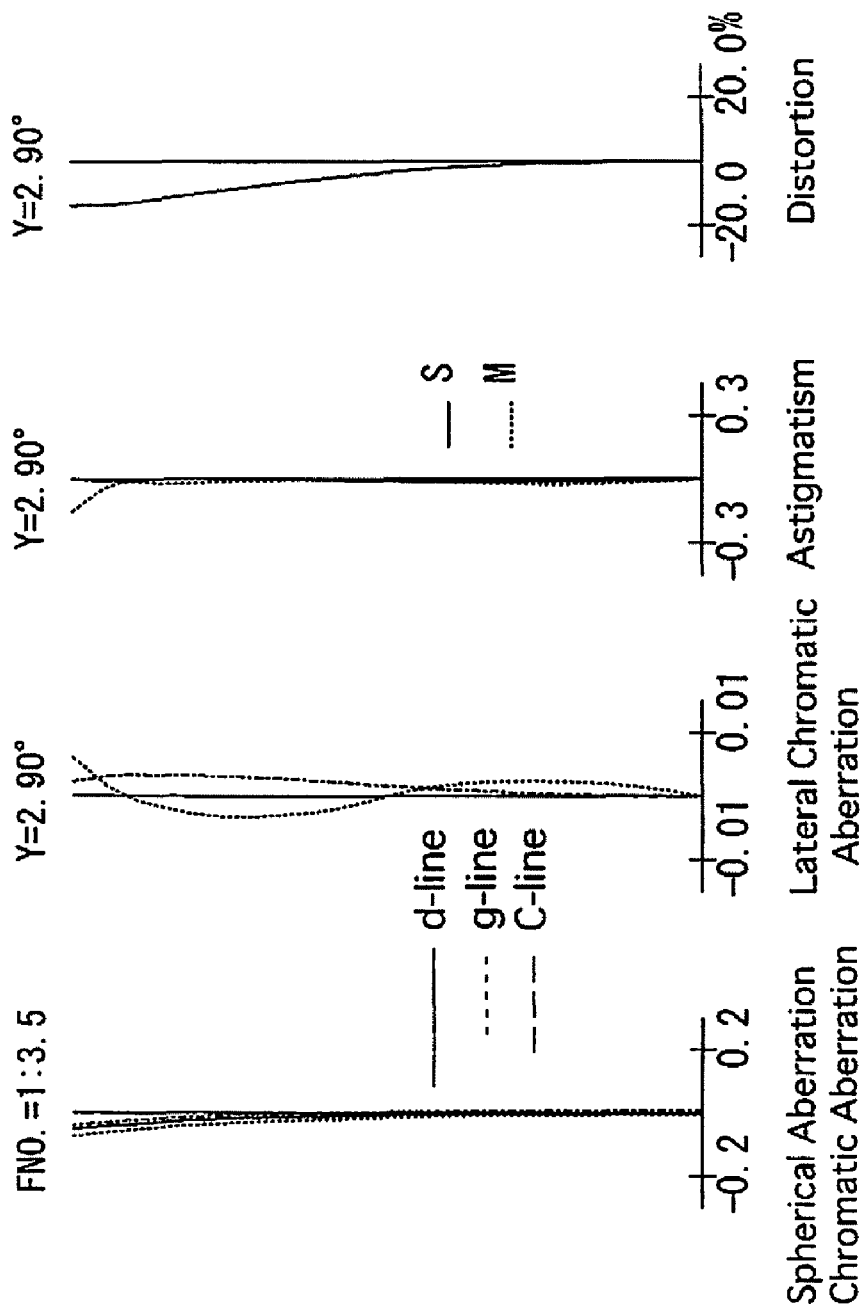
FIGS. 30A, 30B, 30C and 30D show various aberrations that occurred in the lens arrangement shown in FIG. 29.

FIGS. 25 through 30D and Tables 17 through 20 show a fifth numerical embodiment of the high zoom-ratio zoom lens system according to the present invention. FIG. 25 shows a lens arrangement of the fifth numerical embodiment of the high zoom-ratio zoom lens system, according to the present invention, at the long focal length extremity when focused on an object at infinity. FIGS. 26A, 26B, 26C and 26D show various aberrations that occurred in the lens arrangement shown in FIG. 25. FIG. 27 shows a lens arrangement of the fifth numerical embodiment of the high zoom-ratio zoom lens system at an intermediate focal length when focused on an object at infinity. FIGS. 28A, 28B, 28C and 28D show various aberrations that occurred in the lens arrangement shown in FIG. 27. FIG. 29 shows a lens arrangement of the fifth numerical embodiment of the high zoom-ratio zoom lens system at the short focal length extremity when focused on an object at infinity. FIGS. 30A, 30B, 30C and 30D show various aberrations that occurred in the lens arrangement shown in FIG. 29. Table 17 shows the lens surface data, Table 18 shows various zoom lens system data, Table 19 shows the aspherical surface data, and Table 20 shows the lens group data.

The lens arrangement of the fifth numerical embodiment is the same as that of the first numerical embodiment except for the following aspects:

(1) The positive lens element 11 of the first lens group G1 is a positive meniscus lens element having a convex surface on the object side.
(2) The negative lens element 20 of the second lens group G2 is a negative meniscus lens element having a convex surface on the object side, and has an aspherical surface on each side thereof.

TABLE 17

LENS SURFACE DATA

| Surf. No. | r | d | N(d) | vd |
|---|---|---|---|---|
| 1 | 14.818 | 0.750 | 2.00272 | 19.3 |
| 2 | 12.504 | 0.420 | | |
| 3 | 14.154 | 2.756 | 1.59282 | 68.6 |
| 4 | 781.549 | d4 | | |
| 5* | 266.177 | 0.600 | 1.88300 | 40.8 |
| 6* | 3.784 | 1.712 | | |
| 7 | 43.818 | 0.550 | 1.75500 | 52.3 |
| 8 | 7.990 | 0.150 | | |
| 9* | 5.432 | 1.041 | 2.00178 | 19.3 |
| 10* | 11.002 | d10 | | |
| 11 (Diaphragm) | ∞ | 0.600 | | |
| 12* | 4.125 | 2.079 | 1.49700 | 81.6 |
| 13* | -6.207 | 0.100 | | |
| 14 | 4.702 | 1.000 | 1.48749 | 70.4 |
| 15 | 7.332 | 0.700 | 2.00069 | 25.5 |
| 16 | 3.089 | d16 | | |
| 17* | 18.000 | 1.100 | 1.54358 | 55.7 |
| 18* | -29.899 | d18 | | |
| 19 | ∞ | 0.300 | 1.51680 | 64.2 |
| 20 | ∞ | 0.510 | | |
| 21 | ∞ | 0.500 | 1.51680 | 64.2 |
| 22 | ∞ | — | | |

The asterisk (*) designates an aspherical surface which is rotationally symmetrical with respect to the optical axis.

TABLE 18

ZOOM LENS SYSTEM DATA
Zoom Ratio 9.60

|  | Short Focal Length Extremity | Intermediate Focal Length | Long Focal Length Extremity |
|---|---|---|---|
| FNO. | 3.5 | 5.5 | 6.0 |
| F | 3.31 | 14.20 | 31.78 |
| W | 45.5 | 11.2 | 5.1 |
| Y | 2.90 | 2.90 | 2.90 |
| fB | 0.59 | 0.59 | 0.59 |
| L | 30.58 | 40.53 | 49.00 |
| d4 | 0.400 | 11.525 | 16.475 |
| d10 | 10.221 | 2.885 | 1.200 |
| d16 | 2.200 | 6.313 | 13.617 |
| d18 | 2.297 | 4.350 | 2.250 |

TABLE 19

ASPHERICAL SURFACE DATA (aspherical surface coefficients not indicated are zero (0.00)):

| Surf. No. | K | A4 | A6 | A8 | A10 |
|---|---|---|---|---|---|
| 5 | 0.000 | $0.3913 \times 10^{-3}$ | $-0.1116 \times 10^{-4}$ | $0.8551 \times 10^{-7}$ | |
| 6 | 0.000 | $-0.1306 \times 10^{-2}$ | $-0.4044 \times 10^{-4}$ | $0.4950 \times 10^{-6}$ | |
| 9 | 0.000 | $-0.2096 \times 10^{-2}$ | $-0.2774 \times 10^{-3}$ | $0.1833 \times 10^{-4}$ | $-0.1010 \times 10^{-6}$ |
| 10 | 0.000 | $-0.1623 \times 10^{-2}$ | $-0.1998 \times 10^{-3}$ | $0.1145 \times 10^{-4}$ | |
| 12 | -1.000 | $-0.9294 \times 10^{-3}$ | $0.3569 \times 10^{-4}$ | $0.1621 \times 10^{-4}$ | |
| 13 | 0.000 | $0.1680 \times 10^{-2}$ | $0.1407 \times 10^{-4}$ | $0.1713 \times 10^{-4}$ | |
| 17 | 0.000 | $-0.1354 \times 10^{-3}$ | $-0.8598 \times 10^{-4}$ | $-0.1947 \times 10^{-4}$ | $0.8376 \times 10^{-6}$ |
| 18 | 0.000 | $-0.2629 \times 10^{-3}$ | $-0.7381 \times 10^{-4}$ | $-0.2114 \times 10^{-4}$ | $0.9619 \times 10^{-6}$ |

TABLE 20

LENS GROUP DATA

| Lens Group | 1$^{st}$ Surf. | Focal Length |
|---|---|---|
| 1 | 1 | 33.54 |
| 2 | 5 | -4.86 |
| 3 | 12 | 6.80 |
| 4 | 17 | 20.84 |

Embodiment 6

Figure 31:
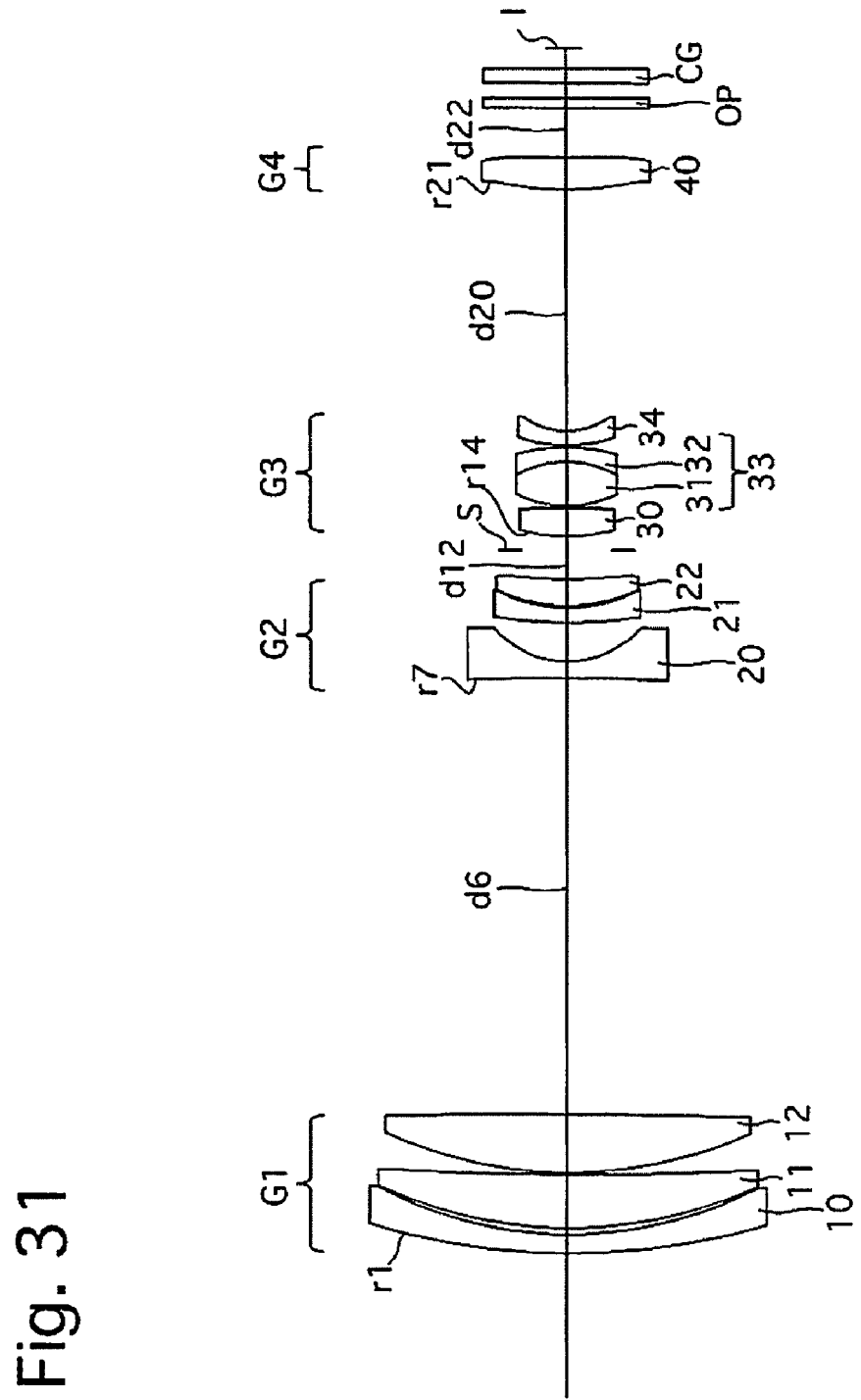
FIG. 31 shows a lens arrangement of a sixth numerical embodiment of the high zoom-ratio zoom lens system, according to the present invention, at the long focal length extremity when focused on an object at infinity.
Figure 32:
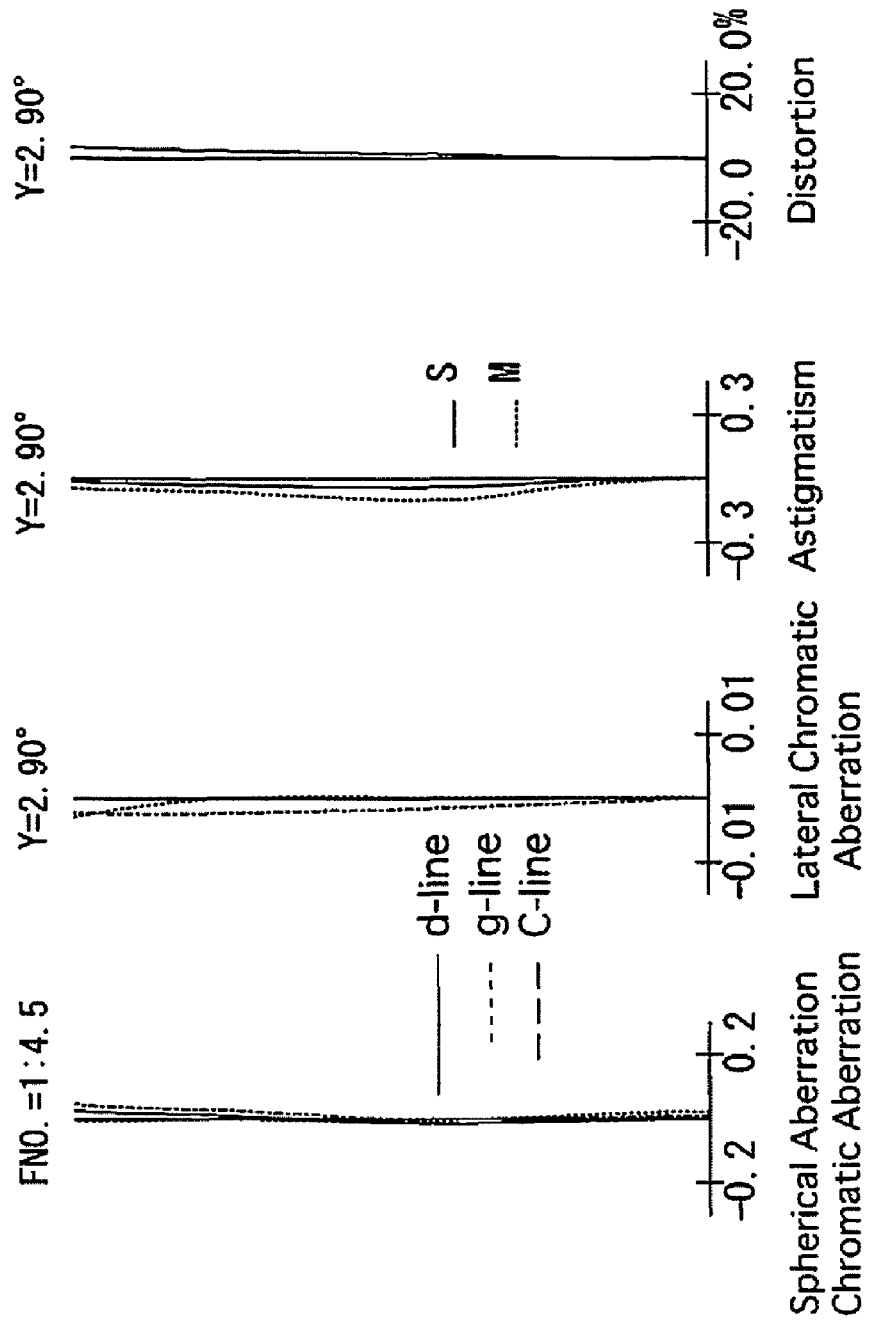
FIGS. 32A, 32B, 32C and 32D show various aberrations that occurred in the lens arrangement shown in FIG. 31.
Figure 33:
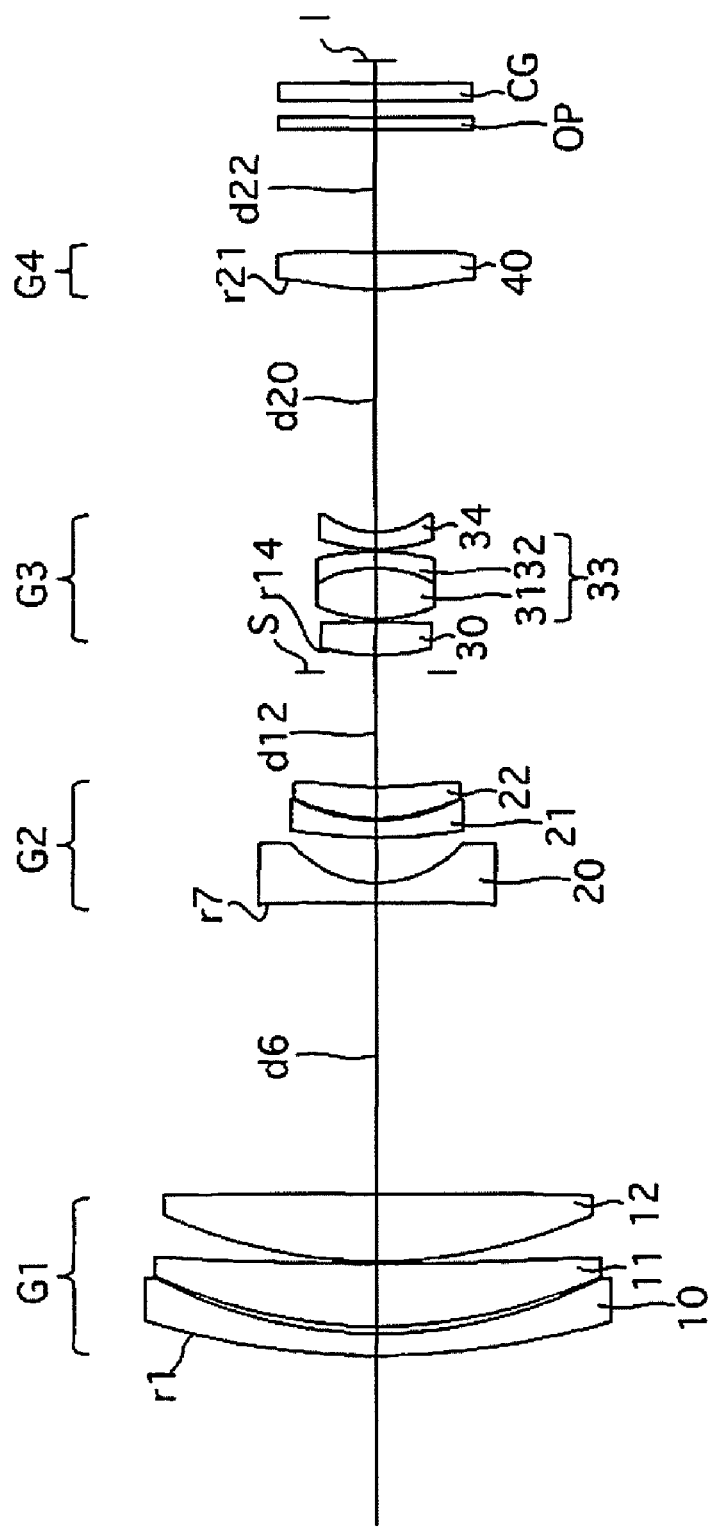
FIG. 33 shows a lens arrangement of the sixth numerical embodiment of the high zoom-ratio zoom lens system at an intermediate focal length when focused on an object at infinity.
Figure 34:
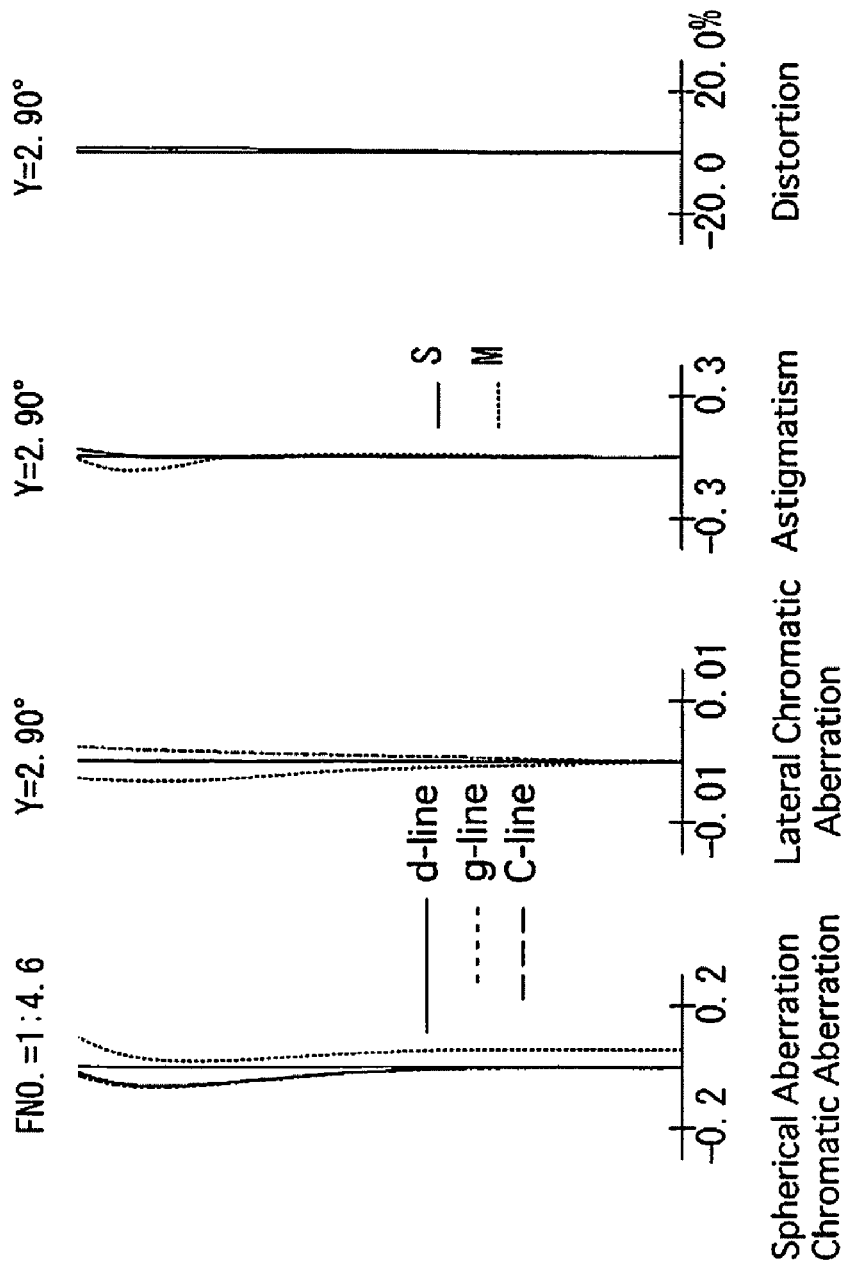
FIGS. 34A, 34B, 34C and 34D show various aberrations that occurred in the lens arrangement shown in FIG. 33.
Figure 35:
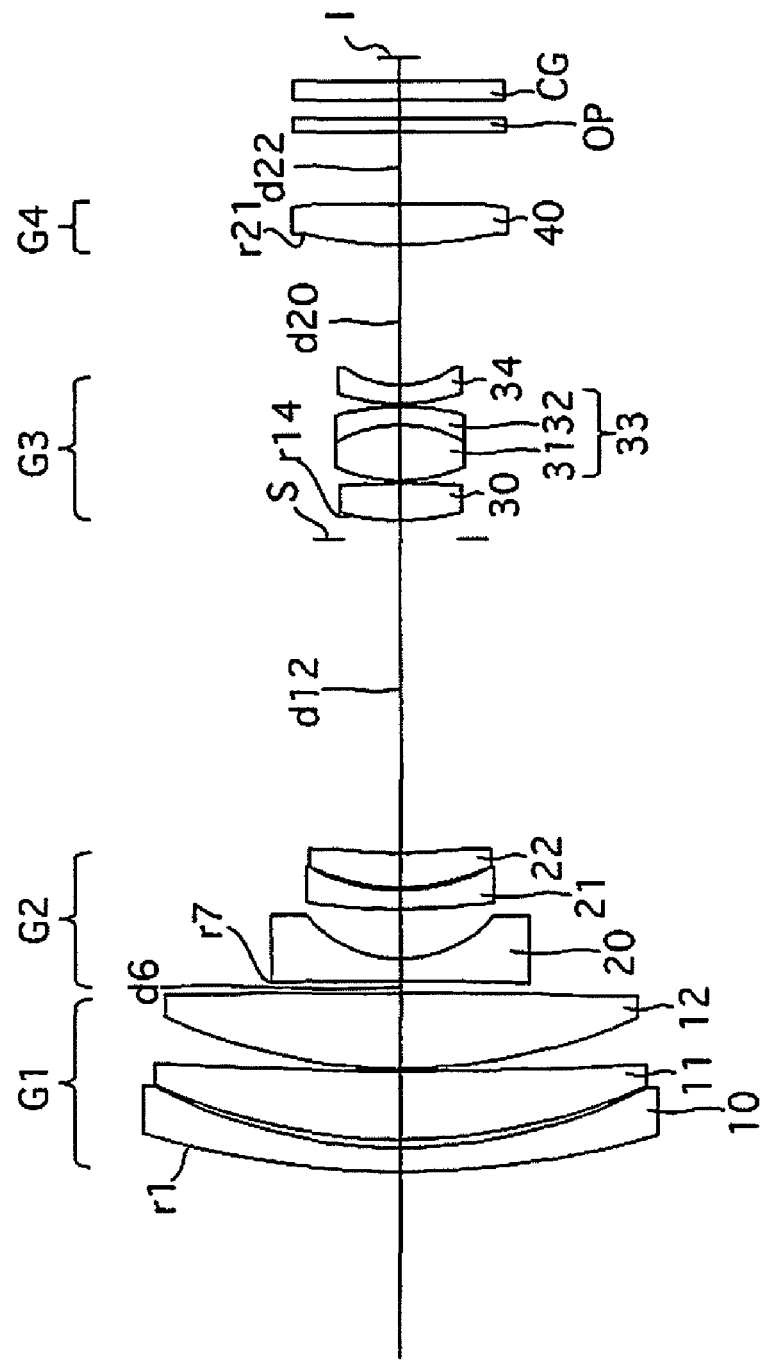
FIG. 35 shows a lens arrangement of the sixth numerical embodiment of the high zoom-ratio zoom lens system at the short focal length extremity when focused on an object at infinity.
Figure 36:
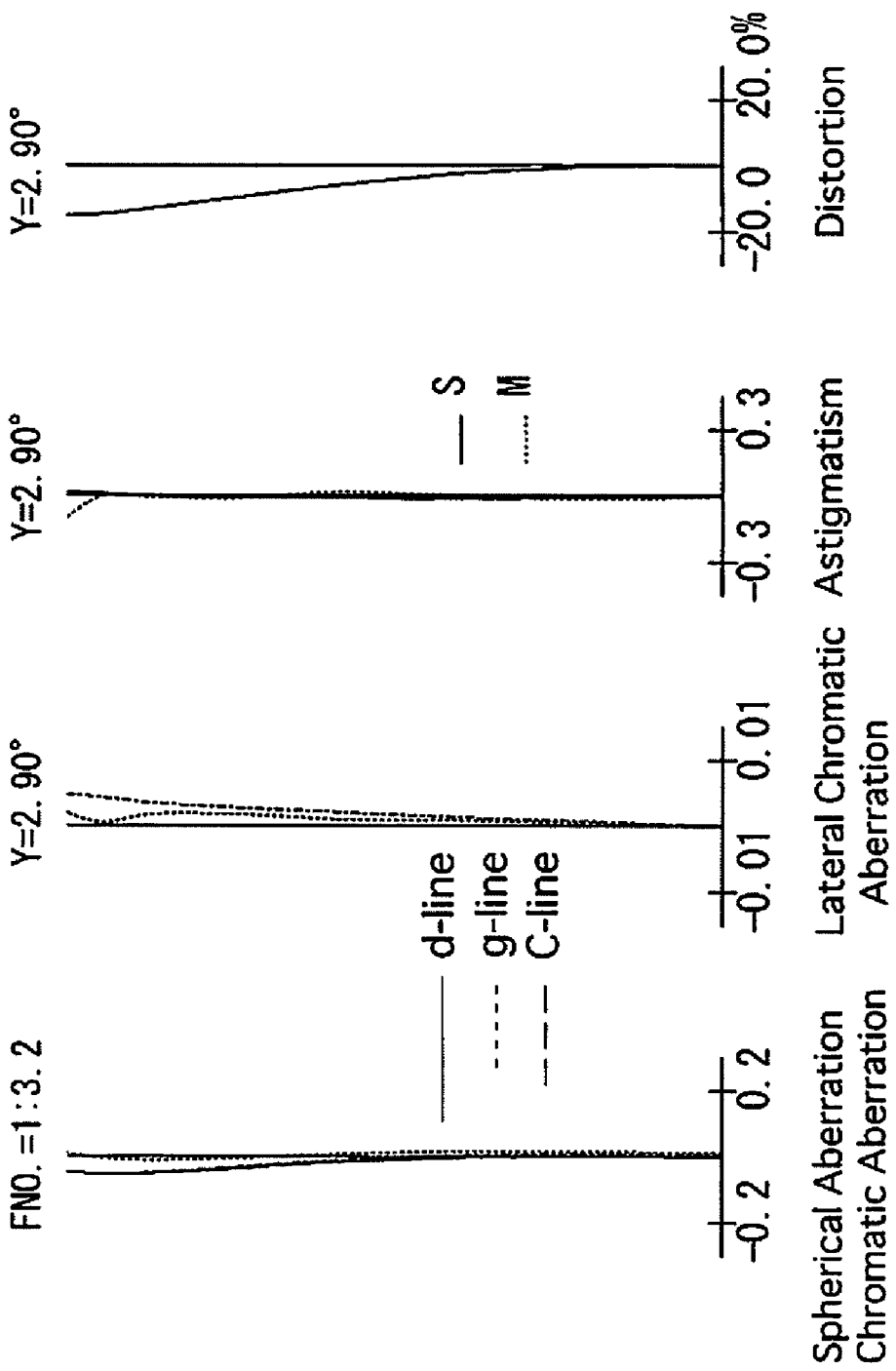
FIGS. 36A, 36B, 36C and 36D show various aberrations that occurred in the lens arrangement shown in FIG. 35.

FIGS. 31 through 36D and Tables 21 through 24 show a sixth numerical embodiment of the high zoom-ratio zoom lens system according to the present invention. FIG. 31 shows a lens arrangement of the sixth numerical embodiment of the high zoom-ratio zoom lens system, according to the present invention, at the long focal length extremity when focused on an object at infinity. FIGS. 32A, 32B, 32C and 32D show various aberrations that occurred in the lens arrangement shown in FIG. 31. FIG. 33 shows a lens arrangement of the sixth numerical embodiment of the high zoom-ratio zoom lens system at an intermediate focal length when focused on an object at infinity. FIGS. 34A, 34B, 34C and 34D show various aberrations that occurred in the lens arrangement shown in FIG. 33. FIG. 35 shows a lens arrangement of the sixth numerical embodiment of the high zoom-ratio zoom lens system at the short focal length extremity when focused on an object at infinity. FIGS. 36A, 36B, 36C and 36D show various aberrations that occurred in the lens arrangement shown in FIG. 35. Table 21 shows the lens surface data, Table 22 shows various zoom lens system data, Table 23 shows the aspherical surface data, and Table 24 shows the lens group data.

The lens arrangement of the sixth numerical embodiment is the same as that of the fourth numerical embodiment except for the following aspects:

(1) The positive lens element 12 of the first lens group G1 is a biconvex positive lens element.

(2) The negative lens element 20 of the second lens group G2 is a biconcave negative lens element.

(3) The positive lens element 40 of the fourth lens group G4 is a positive meniscus lens element having a convex surface on the object side, and has an aspherical surface on each side thereof.

TABLE 21

LENS SURFACE DATA

| Surf. No. | r | d | N(d) | vd |
|---|---|---|---|---|
| 1 | 24.553 | 0.650 | 1.90366 | 31.3 |
| 2 | 14.535 | 0.218 | | |
| 3 | 16.021 | 1.847 | 1.49700 | 81.6 |
| 4 | 112.700 | 0.070 | | |
| 5 | 15.654 | 2.012 | 1.59282 | 68.6 |
| 6 | -329.969 | d6 | | |
| 7 | -94.994 | 0.580 | 1.88300 | 40.8 |
| 8 | 3.482 | 1.345 | | |
| 9 | 18.025 | 0.500 | 1.77250 | 49.6 |
| 10 | 5.288 | 0.072 | | |
| 11* | 5.349 | 0.940 | 2.00178 | 19.3 |
| 12* | 14.448 | d12 | | |
| 13 (Diaphragm) | ∞ | 0.500 | | |
| 14* | 6.367 | 1.000 | 1.58989 | 66.8 |
| 15* | -29.985 | 0.072 | | |
| 16 | 4.266 | 1.520 | 1.48749 | 70.4 |
| 17 | -3.567 | 0.500 | 1.83400 | 37.3 |
| 18 | -6.677 | 0.070 | | |
| 19 | 5.292 | 0.500 | 1.90366 | 31.3 |
| 20 | 2.635 | d20 | | |
| 21* | 9.613 | 1.100 | 1.54358 | 55.7 |
| 22* | 46.130 | d22 | | |
| 23 | ∞ | 0.350 | 1.51680 | 64.2 |
| 24 | ∞ | 0.510 | | |
| 25 | ∞ | 0.500 | 1.51680 | 64.2 |
| 26 | ∞ | — | | |

The asterisk (*) designates an aspherical surface which is rotationally symmetrical with respect to the optical axis.

TABLE 22

ZOOM LENS SYSTEM DATA
Zoom Ratio 9.68

|  | Short Focal Length Extremity | Intermediate Focal Length | Long Focal Length Extremity |
|---|---|---|---|
| FNO. | 3.2 | 4.6 | 4.5 |
| f | 3.62 | 13.00 | 35.00 |
| W | 43.4 | 12.4 | 4.6 |
| Y | 2.90 | 2.90 | 2.90 |
| fB | 0.59 | 0.59 | 0.59 |
| L | 29.96 | 38.37 | 41.67 |
| d6 | 0.340 | 8.655 | 15.168 |
| d12 | 8.446 | 3.414 | 1.000 |
| d20 | 3.764 | 7.229 | 8.346 |
| d22 | 1.961 | 3.622 | 1.714 |

TABLE 23

ASPHERICAL SURFACE DATA (aspherical surface coefficients not indicated are zero (0.00)):

| Surf. No. | K | A4 | A6 | A8 | A10 |
|---|---|---|---|---|---|
| 11 | 0.000 | $-0.1986 \times 10^{-3}$ | $-0.1292 \times 10^{-3}$ | $0.2085 \times 10^{-4}$ | $-0.6747 \times 10^{-5}$ |
| 12 | 0.000 | $-0.1518 \times 10^{-2}$ | $0.1051 \times 10^{-3}$ | $-0.6093 \times 10^{-4}$ | |
| 14 | -1.000 | $-0.5127 \times 10^{-3}$ | $0.1721 \times 10^{-3}$ | $-0.1848 \times 10^{-4}$ | |
| 15 | 0.000 | $0.2027 \times 10^{-3}$ | $0.4308 \times 10^{-4}$ | $-0.1203 \times 10^{-4}$ | |
| 21 | 0.000 | $-0.9038 \times 10^{-3}$ | $-0.1318 \times 10^{-3}$ | $0.1302 \times 10^{-5}$ | |
| 22 | 0.000 | $-0.1126 \times 10^{-2}$ | $-0.2269 \times 10^{-3}$ | $0.6450 \times 10^{-5}$ | $-0.6082 \times 10^{-7}$ |

TABLE 24

LENS GROUP DATA

| Lens Group | 1st Surf. | Focal Length |
|---|---|---|
| 1 | 1 | 24.48 |
| 2 | 7 | -4.06 |
| 3 | 14 | 6.63 |
| 4 | 21 | 22.10 |

Embodiment 7

Figure 37:
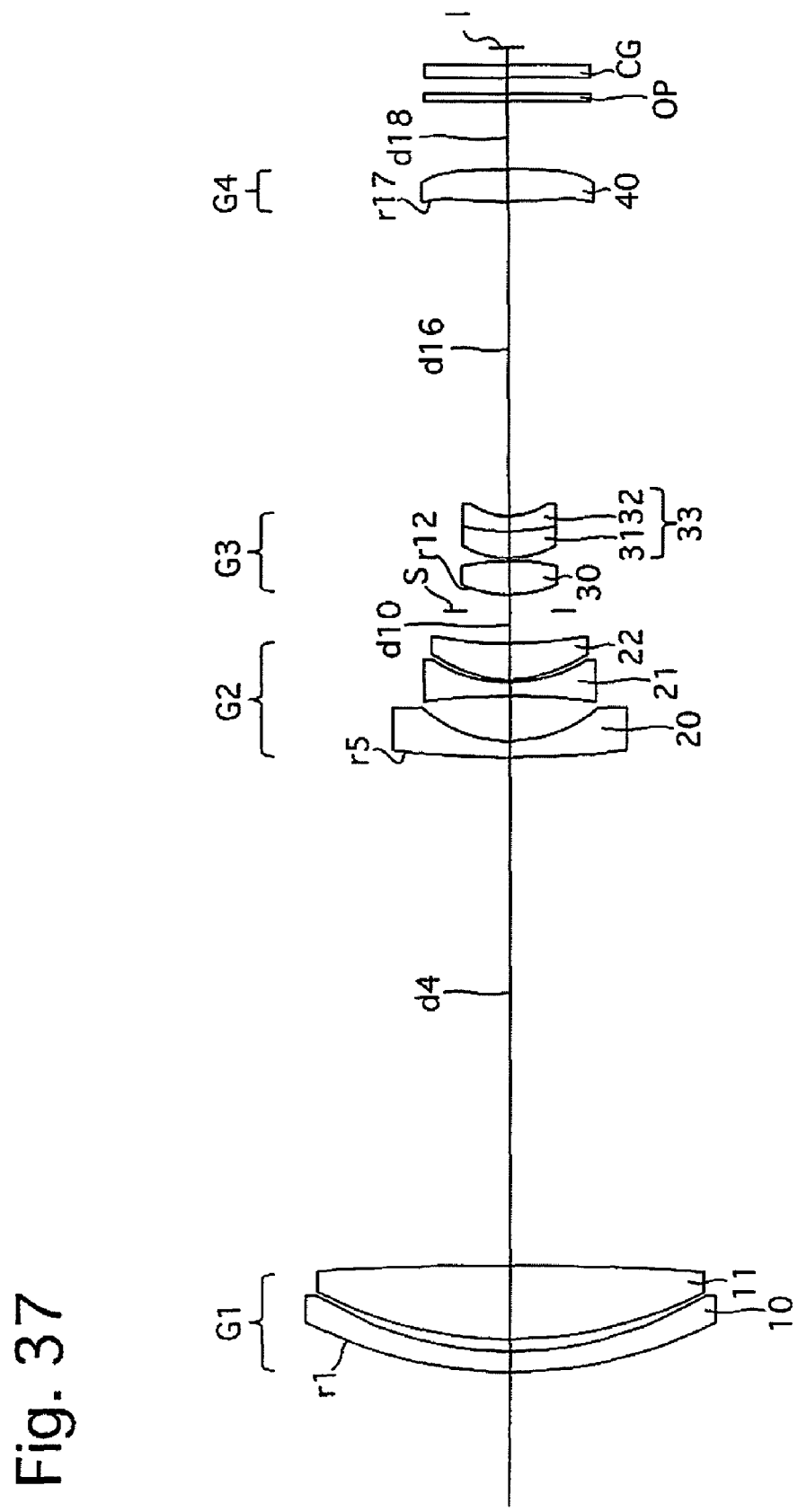
FIG. 37 shows a lens arrangement of a seventh numerical embodiment of the high zoom-ratio zoom lens system, according to the present invention, at the long focal length extremity when focused on an object at infinity.
Figure 38:
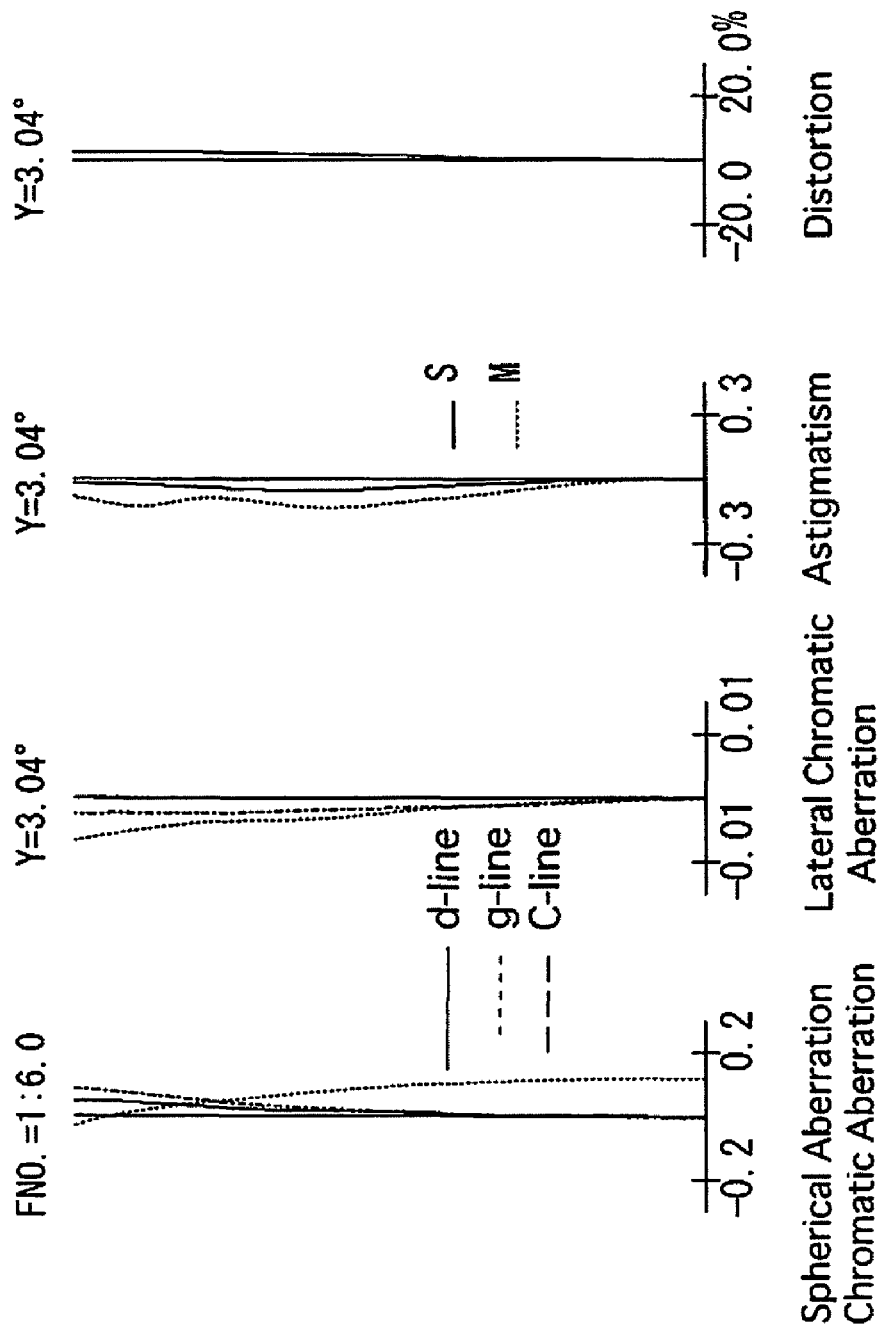
FIGS. 38A, 38B, 38C and 38D show various aberrations that occurred in the lens arrangement shown in FIG. 37.
Figure 39:
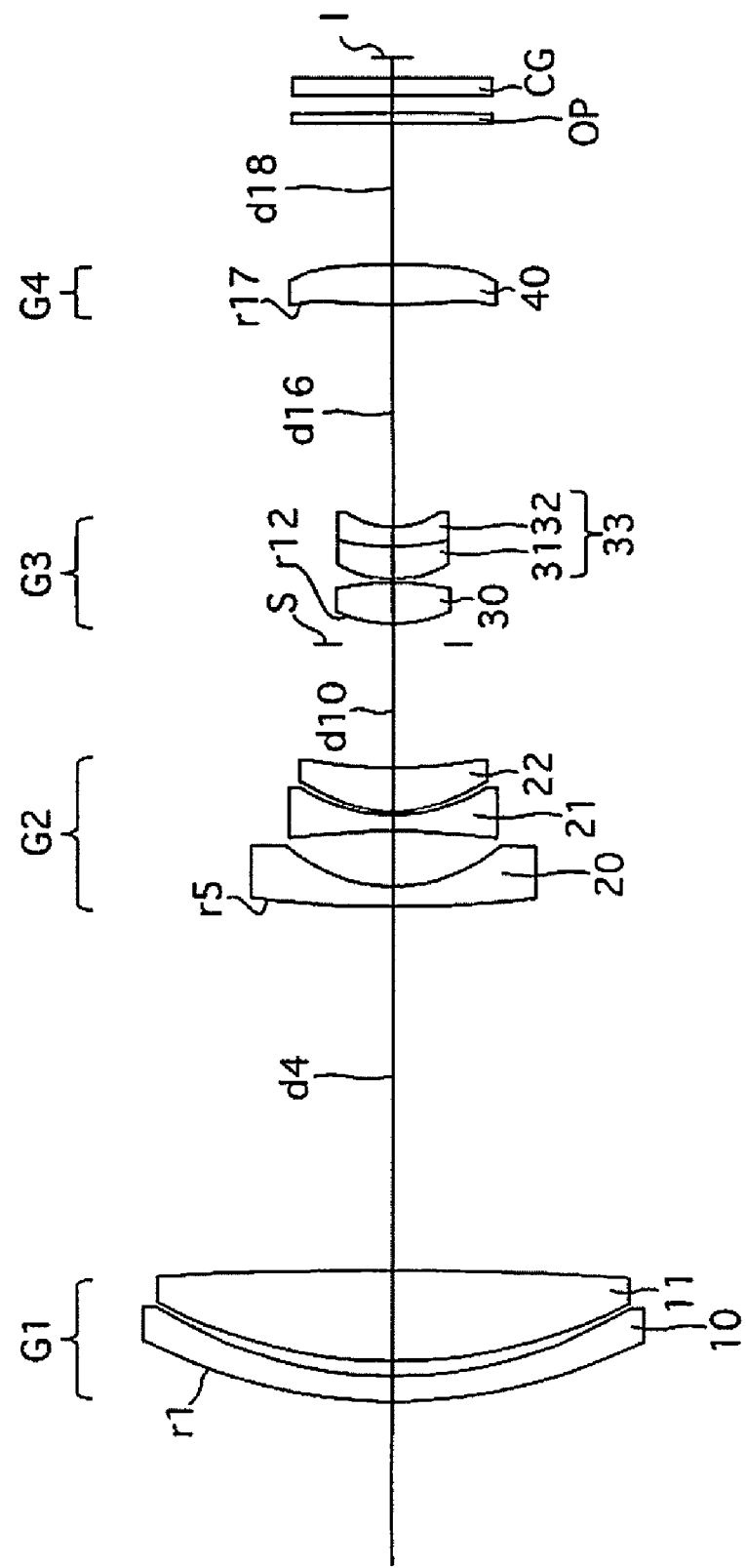
FIG. 39 shows a lens arrangement of the seventh numerical embodiment of the high zoom-ratio zoom lens system at an intermediate focal length when focused on an object at infinity.
Figure 40:
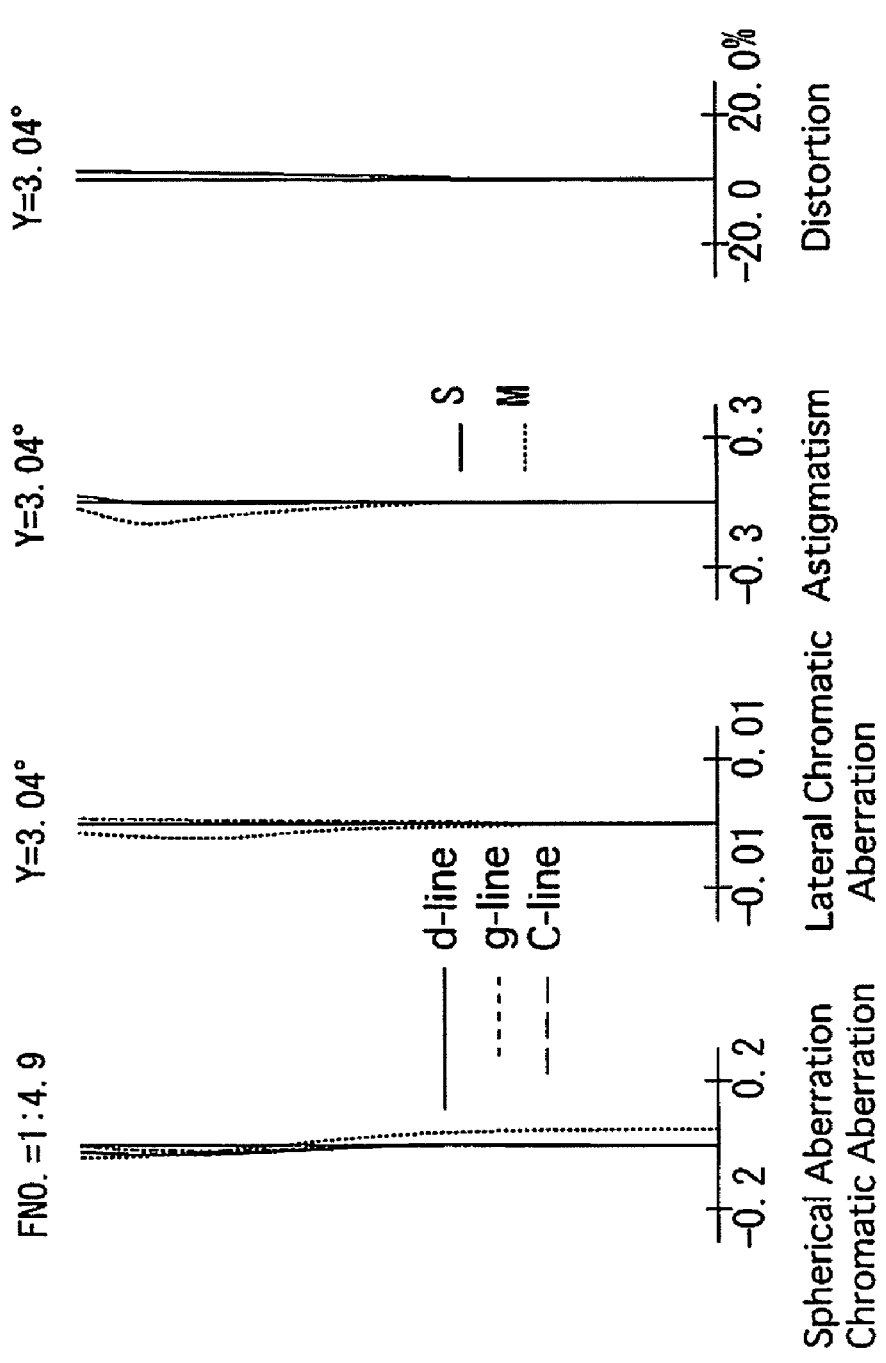
FIGS. 40A, 40B, 40C and 40D show various aberrations that occurred in the lens arrangement shown in FIG. 39.
Figure 41:
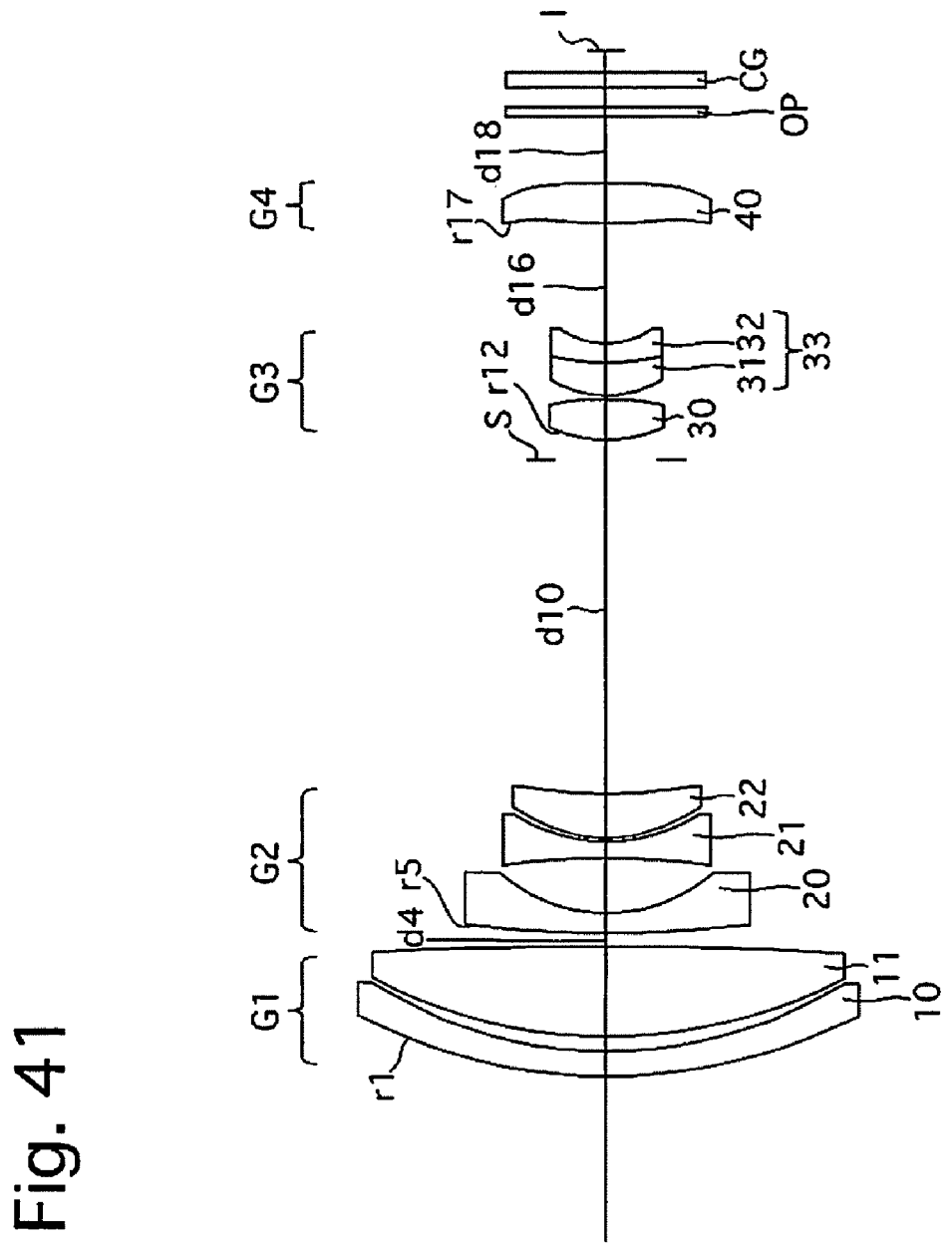
FIG. 41 shows a lens arrangement of the seventh numerical embodiment of the high zoom-ratio zoom lens system at the short focal length extremity when focused on an object at infinity.
Figure 42:
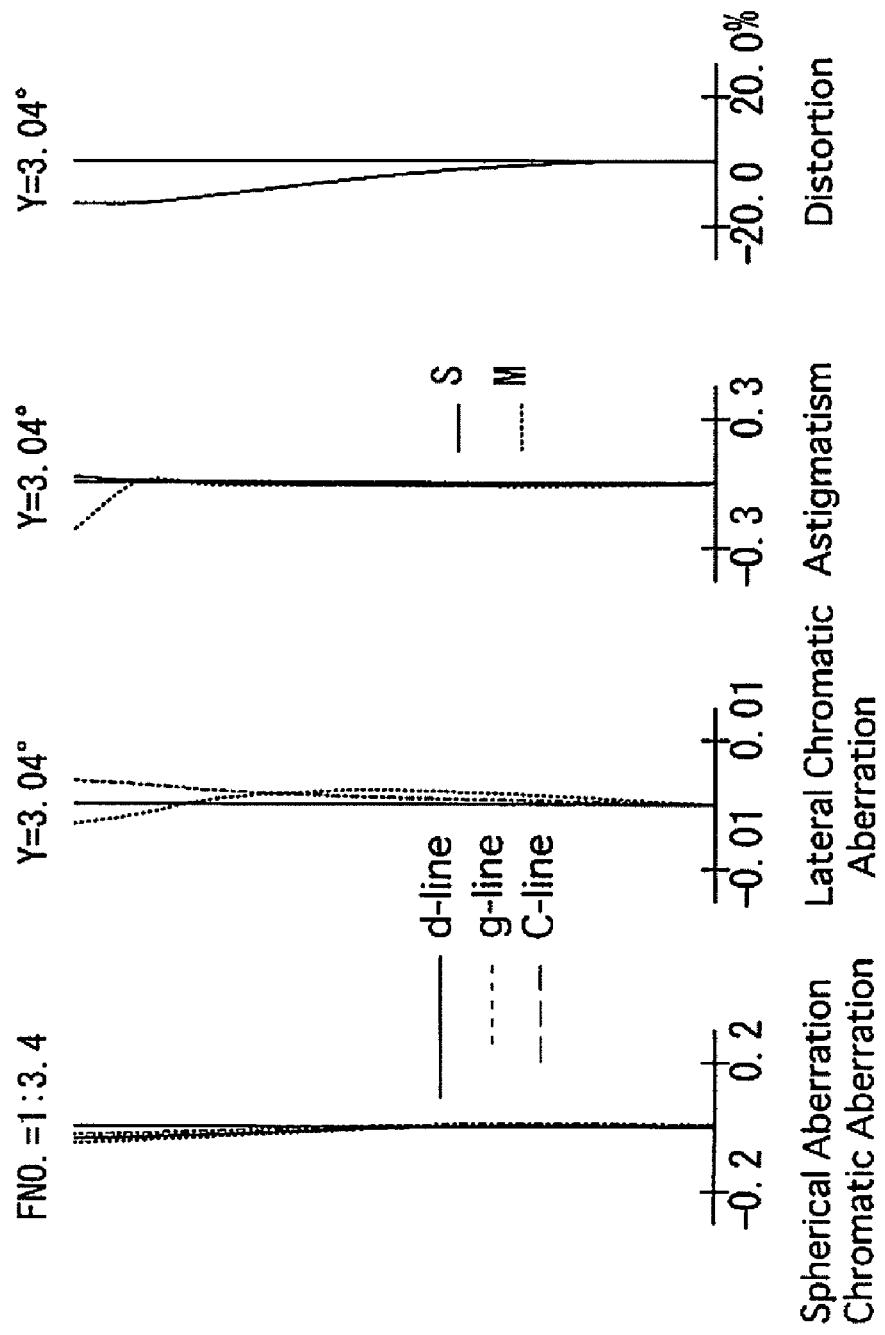
FIGS. 42A, 42B, 42C and 42D show various aberrations that occurred in the lens arrangement shown in FIG. 41.

FIGS. 37 through 42D and Tables 25 through 28 show a seventh numerical embodiment of the high zoom-ratio zoom lens system according to the present invention. FIG. 37 shows a lens arrangement of the seventh numerical embodiment of the high zoom-ratio zoom lens system, according to the present invention, at the long focal length extremity when focused on an object at infinity. FIGS. 38A, 38B, 38C and 38D show various aberrations that occurred in the lens arrangement shown in FIG. 37. FIG. 39 shows a lens arrangement of the seventh numerical embodiment of the high zoom-ratio zoom lens system at an intermediate focal length when focused on an object at infinity. FIGS. 40A, 40B, 40C and 40D show various aberrations that occurred in the lens arrangement shown in FIG. 39. FIG. 41 shows a lens arrangement of the seventh numerical embodiment of the high zoom-ratio zoom lens system at the short focal length extremity when focused on an object at infinity. FIGS. 42A, 42B, 42C and 42D show various aberrations that occurred in the lens arrangement shown in FIG. 41. Table 25 shows the lens surface data, Table 26 shows various zoom lens system data, Table 27 shows the aspherical surface data, and Table 28 shows the lens group data.

The lens arrangement of the seventh numerical embodiment is the same as that of the first numerical embodiment except for the following aspects:

(1) The negative lens element 20 of the second lens group G2 is a negative meniscus lens element having a convex surface on the object side.

(2) The negative lens element 21 of the second lens group G2 is a biconcave negative lens element.

TABLE 25

LENS SURFACE DATA

| Surf. No. | r | d | N(d) | vd |
|---|---|---|---|---|
| 1 | 17.048 | 0.750 | 1.92286 | 20.9 |
| 2 | 13.734 | 0.453 | | |
| 3 | 15.892 | 2.731 | 1.59282 | 68.6 |
| 4 | -122.857 | d4 | | |
| 5 | 37.756 | 0.600 | 1.88300 | 40.8 |

TABLE 25-continued

LENS SURFACE DATA

| Surf. No. | r | d | N(d) | vd |
|---|---|---|---|---|
| 6 | 5.003 | 1.677 | | |
| 7 | -24.273 | 0.500 | 1.72916 | 54.7 |
| 8 | 5.384 | 0.100 | | |
| 9* | 4.424 | 1.338 | 1.82115 | 24.1 |
| 10* | 15.405 | d10 | | |
| 11 (Diaphragm) | ∞ | 0.600 | | |
| 12* | 4.028 | 1.250 | 1.49700 | 81.6 |
| 13* | -7.710 | 0.100 | | |
| 14 | 3.409 | 1.000 | 1.48749 | 70.4 |
| 15 | 7.666 | 0.580 | 1.90366 | 31.3 |
| 16 | 2.545 | d16 | | |
| 17* | 18.000 | 1.200 | 1.54358 | 55.7 |
| 18* | -31.576 | d18 | | |
| 19 | ∞ | 0.300 | 1.51680 | 64.2 |
| 20 | ∞ | 0.560 | | |
| 21 | ∞ | 0.500 | 1.51680 | 64.2 |
| 22 | ∞ | — | | |

The asterisk (*) designates an aspherical surface which is rotationally symmetrical with respect to the optical axis.

TABLE 26

ZOOM LENS SYSTEM DATA
Zoom Ratio 9.59

|  | Short Focal Length Extremity | Intermediate Focal Length | Long Focal Length Extremity |
|---|---|---|---|
| FNO. | 3.4 | 4.9 | 6.0 |
| f | 4.00 | 14.20 | 38.40 |
| W | 41.3 | 11.8 | 4.4 |
| Y | 3.04 | 3.04 | 3.04 |
| fB | 0.59 | 0.59 | 0.59 |
| L | 31.00 | 40.50 | 49.00 |
| d4 | 0.400 | 10.990 | 18.852 |

TABLE 26-continued

ZOOM LENS SYSTEM DATA
Zoom Ratio 9.59

|     | Short Focal Length Extremity | Intermediate Focal Length | Long Focal Length Extremity |
|-----|---|---|---|
| d10 | 10.135 | 3.728 | 1.200 |
| d16 | 3.636  | 6.707 | 11.619 |
| d18 | 2.000  | 4.250 | 2.500 |

TABLE 27

ASPHERICAL SURFACE DATA (aspherical surface coefficients not indicated are zero (0.00)):

| Surf. No. | K | A4 | A6 | A8 | A10 |
|---|---|---|---|---|---|
| 9  | 0.000  | $-0.9612 \times 10^{-3}$ | $-0.1088 \times 10^{-3}$ | $0.9351 \times 10^{-5}$  | $-0.1110 \times 10^{-5}$ |
| 10 | 0.000  | $0.9882 \times 10^{-5}$  | $0.3788 \times 10^{-4}$  | $-0.8101 \times 10^{-5}$ | |
| 12 | -1.000 | $-0.6722 \times 10^{-3}$ | $0.1249 \times 10^{-3}$  | $-0.3846 \times 10^{-4}$ | |
| 13 | 0.000  | $0.8586 \times 10^{-3}$  | $0.6848 \times 10^{-4}$  | $-0.3273 \times 10^{-4}$ | |
| 17 | 0.000  | $-0.8137 \times 10^{-3}$ | $-0.1130 \times 10^{-3}$ | $-0.2904 \times 10^{-4}$ | $0.1654 \times 10^{-5}$ |
| 18 | 0.000  | $-0.8264 \times 10^{-3}$ | $-0.1718 \times 10^{-3}$ | $-0.1885 \times 10^{-4}$ | $0.1181 \times 10^{-5}$ |

TABLE 28

LENS GROUP DATA

| Lens Group | 1st Surf. | Focal Length |
|---|---|---|
| 1 | 1  | 33.77 |
| 2 | 5  | -5.18 |
| 3 | 12 | 7.06 |
| 4 | 17 | 21.27 |

The numerical values of each condition for each numerical embodiment are shown in Table 29.

TABLE 29

|          | Embod. 1 | Embod. 2 | Embod. 3 | Embod. 4 |
|---|---|---|---|---|
| Cond. (1) | 1.362   | 1.372   | 1.207   | 1.443   |
| Cond. (2) | 5.295   | 5.312   | 4.426   | 3.521   |
| Cond. (3) | -6.211  | -6.200  | -5.952  | -5.812  |
| Cond. (4) | 3.257   | 3.147   | 3.568   | 4.534   |
| Cond. (5) | 1.92286 | 1.92286 | 1.92286 | 2.00069 |
| Cond. (6) | 76.000  | 76.000  | 76.000  | 64.950  |
| Cond. (7) | 0.411   | 0.411   | 0.411   | 0.340   |
| Cond. (8) | 20.9    | 20.9    | 20.9    | 25.5    |

|          | Embod. 5 | Embod. 6 | Embod. 7 |
|---|---|---|---|
| Cond. (1) | 0.947   | 1.430   | 1.137   |
| Cond. (2) | 5.566   | 3.240   | 4.498   |
| Cond. (3) | -6.900  | -6.031  | -6.520  |
| Cond. (4) | 2.711   | 5.422   | 3.627   |
| Cond. (5) | 2.00272 | 1.90366 | 1.92286 |
| Cond. (6) | 76.025  | 68.600  | 76.000  |
| Cond. (7) | 0.508   | 0.330   | 0.411   |
| Cond. (8) | 19.3    | 31.3    | 20.9    |

As can be understood from Table 29, the first through seventh numerical embodiments satisfy conditions (1) through (8). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A high zoom-ratio zoom lens system comprising a positive first lens group, a negative second lens group, a positive third lens group, and a positive fourth lens group, in that order from the object side,
wherein upon zooming from the short focal length extremity to the long focal length extremity, at least the first through third lens groups are moved along the optical axis direction, wherein an amount of movement of said first lens group along the optical axis direction is greater than that of said third lens group, and
wherein the following conditions (1), (2) and (3) are satisfied:

$$0.9 < FT/F1 < 2 \qquad (1),$$

$$3 < F1/FW < 7 \qquad (2), \text{ and}$$

$$-8 < F1/F2 < -5 \qquad (3), \text{ wherein}$$

FT designates the entire focal length of the zoom lens system at the long focal length extremity,
F1 designates the focal length of the first lens group,
FW designates the entire focal length of the zoom lens system at the short focal length extremity, and
F2 designates the focal length of the second lens group.

2. The high zoom-ratio zoom lens system according to claim 1, wherein the following condition (4) is satisfied:

$$2.5 < M2T/M2W < 6 \qquad (4), \text{ wherein}$$

M2T designates the magnification of the second lens group with respect to an object at infinity at the long focal length extremity, and
M2W designates the magnification of the second lens group with respect to an object at infinity at the short focal length extremity.

3. The high zoom-ratio zoom lens system according to claim 1, wherein a lens element that is provided closest to the object side within said first lens group comprises a negative lens element that satisfies the following condition (5):

$$1.9 < n1 \qquad (5), \text{ wherein}$$

n1 designates the refractive index at the d-line of the negative lens element that is provided closest to the object side within the first lens group.

4. The high zoom-ratio zoom lens system according to claim 1, wherein the following condition (6) is satisfied:

$$v3Pa > 64 \qquad (6), \text{ wherein}$$

ν3Pa designates the average Abbe number with respect to the d-line of the positive lens elements that are provided within the third lens group.

5. The high zoom-ratio zoom lens system according to claim 1, wherein the following condition (7) is satisfied:

$$0.3 < n3Na - n3Pa \qquad (7),$$ wherein n3Na designates the average refractive index at the d-line of each negative lens element that is provided within said third lens group, and n3Pa designates the average refractive index at the d-line of each positive lens element that is provided within said third lens group.

6. The high zoom-ratio zoom lens system according to claim 1, wherein said third lens group comprises a positive lens element, a positive lens element and a negative lens element, in that order from the object side.

7. The high zoom-ratio zoom lens system according to claim 6, wherein the positive lens element on the image side and said negative lens element within said third lens group are bonded together to constitute a cemented lens.

8. The high zoom-ratio zoom lens system according to claim 1, wherein said third lens group comprises a positive lens element, a positive lens element, a negative lens element and a negative lens element, in that order from the object side.

9. The high zoom-ratio zoom lens system according to claim 8, wherein the positive lens element on the image side and said negative lens element on the object side, within said third lens group, are bonded together to constitute a cemented lens.

10. The high zoom-ratio zoom lens system according to claim 1, wherein said first lens group comprises a negative lens element and a positive lens element, in that order from the object side, wherein the following condition (8) is satisfied:

$$\nu 1N < 23 \qquad (8),$$ wherein

ν1N designates the Abbe number with respect to the d-line of the negative lens element that is provided closest to the object side within said first lens group.

11. The high zoom-ratio zoom lens system according to claim 1, wherein said fourth lens group comprises a resin single lens element having a convex surface on the object side with at least said convex surface on the object side being formed as an aspherical surface that is formed so as to have an increasingly greater radius of curvature, compared to the paraxial convex spherical surface thereof, at an increasing distance toward the periphery thereof.

* * * * *